(12) United States Patent
Tanaka et al.

(10) Patent No.: US 7,260,721 B2
(45) Date of Patent: Aug. 21, 2007

(54) INFORMATION PROCESSING METHOD, INFORMATION PROCESSING APPARATUS AND RECORDING MEDIUM

(75) Inventors: Koichi Tanaka, Tokyo (JP); Itaru Kawakami, Kanagawa (JP); Yoshisuke Kuroda, Tokyo (JP); Ryuji Ishiguro, Tokyo (JP)

(73) Assignee: Sony Corporation (JP)

( * ) Notice: Subject to any disclaimer, the term of this patent is extended or adjusted under 35 U.S.C. 154(b) by 1028 days.

(21) Appl. No.: 10/072,109

(22) Filed: Feb. 8, 2002

(65) Prior Publication Data

US 2002/0114466 A1 Aug. 22, 2002

(30) Foreign Application Priority Data

Feb. 9, 2001 (JP) .......................... P2001-033114
Mar. 29, 2001 (JP) .......................... P2001-094803

(51) Int. Cl.
*H04N 7/167* (2006.01)
(52) U.S. Cl. ...................... 713/170; 380/232; 380/278; 380/281; 380/284; 705/59; 705/76; 713/155; 713/156; 713/194; 726/6; 726/7; 726/30
(58) Field of Classification Search ...................... None
See application file for complete search history.

(56) References Cited

U.S. PATENT DOCUMENTS 6,006,190 A 12/1999 Baena-Arnaiz et al.
6,389,538 B1 * 5/2002 Gruse et al. ................. 713/194
6,891,953 B1 * 5/2005 DeMello et al. ............. 380/277
6,920,436 B2 * 7/2005 Stefik et al. .................. 705/51

FOREIGN PATENT DOCUMENTS

| EP | 0 878 796 A2 | 11/1998 |
| JP | 09319571 A1 | 12/1997 |
| WO | WO-98/42098 A1 | 9/1998 |
| WO | WO-00/59151 A2 | 10/2000 |

OTHER PUBLICATIONS

Lee, J., et al, 'A DRM Framework for Distributing Digital Contents through the Internet', ETRI Journal, vol. 25, No. 6, Dec. 2003, pp. 423-436, http://etrij.etri.re.kr/Cyber/servlet/GetFile?fileid=SPF-1070442843432.*

* cited by examiner

*Primary Examiner*—Nasser Moazzami
*Assistant Examiner*—Ronald Baum
(74) *Attorney, Agent, or Firm*—Lerner, David, Littenberg, Krumholz & Mentlik, LLP

(57) ABSTRACT

A client receives encrypted content from content server. The header of the content includes license-identifying information for identifying a license required to utilize the content. The client requests a license server to transmit the license identified by the license-identifying information. When receiving the request for a license, the license server carries out a charging process before transmitting the license to the client. The client stores the license received from the license server. The stored license serves as a condition for encrypting and playing back the content. As a result, content can be distributed with a high degree of freedom and only an authorized user is capable of utilizing the content.

13 Claims, 44 Drawing Sheets

FIG.8

| LICENSE ID |
| --- |
| CREATION DATE AND TIME |
| VALIDITY TERM |
| USAGE CONDITION |
| LEAF ID |
| DIGITAL SIGNATURE |

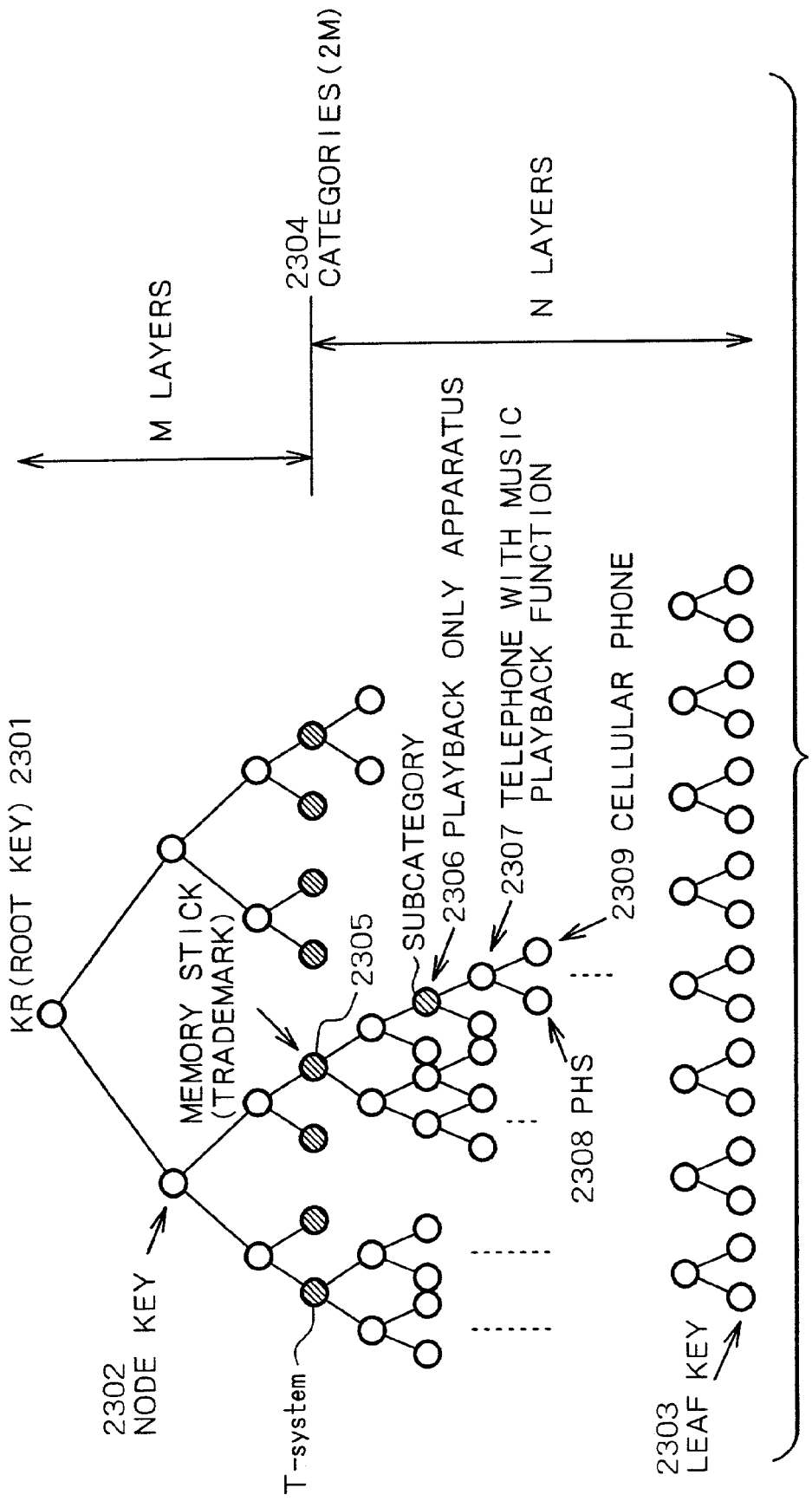

FIG. 15A

EKB (ENABLING KEY BLOCK)
TRANSMISSION OF NODE KEYS OF VERSION
t TO DEVICES 0, 1 AND 2

| VERSION : t | |
|---|---|
| INDEX | ENCRYPTION KEY |
| 0 | Enc(K(t)0, K(t)R) |
| 0 0 | Enc(K(t)00, K(t)0) |
| 0 0 0 | Enc(K000, K(t)00) |
| 0 0 1 | Enc(K(t)001, K(t)00) |
| 0 0 1 0 | Enc(K0010, K(t)001) |

FIG. 15B

EKB (ENABLING KEY BLOCK)
TRANSMIT NODE KEYS OF VERSION
t TO DEVICES 0, 1 AND 2

| VERSION : t | |
|---|---|
| INDEX | ENCRYPTION KEY |
| 0 0 0 | Enc(K000, K(t)00) |
| 0 0 1 | Enc(K(t)001, K(t)00) |
| 0 0 1 0 | Enc(K0010, K(t)001) |

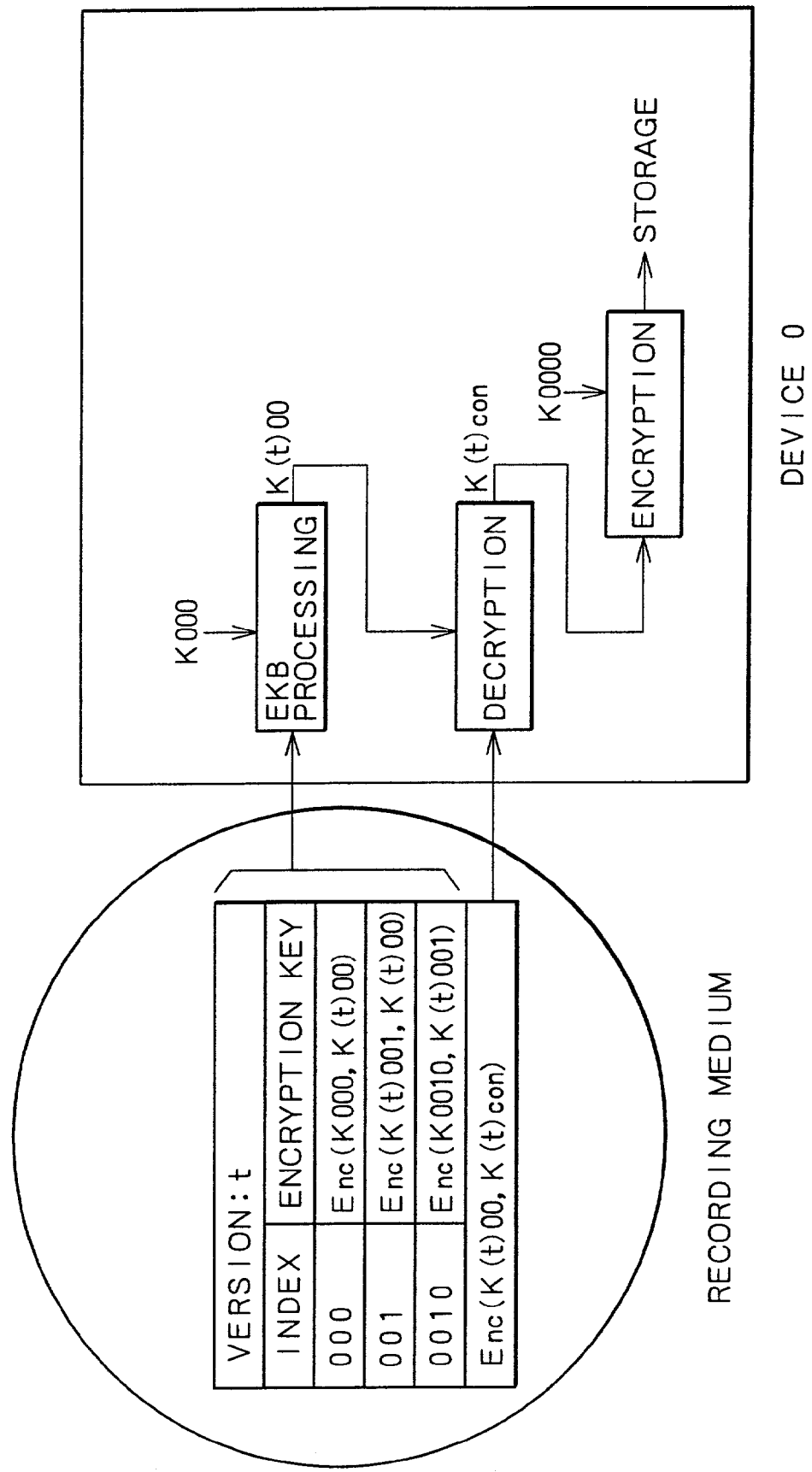

EKB

DATA PORTION AND TAGS OF EKB
(ENABLING KEY BLOCK)

| DATA (ENCRYPTED KEYS) | Enc(K0, K(t)R, Enc(K(t)1, K(t)R) <br> Enc(K(t)10, K(t)1), Enc(K11, K(t)1) <br> Enc(K(t)100, K(t)10), Enc(K101, K(t)10) <br> Enc(K1000, K(t)100) |
|---|---|
| TAGS | 0 : {0,0}, 1 : {1,1}, 2 : {0,0}, 3 : {0,0} <br> 4 : {1,1}, 5 : {0,1}, 6 : {1,1} |

{L TAG, R TAG}
L TAG AND R TAG ARE EACH 0 TO INDICATE
EXISTENCE OF DATA OR 1 OTHERWISE

Mark = {LeafID, Own, $Sig_S$(LeafID, Own)}

Enc(Kp11, Kc), Enc(Kp12, Kc), Enc(Kp13, Kc)

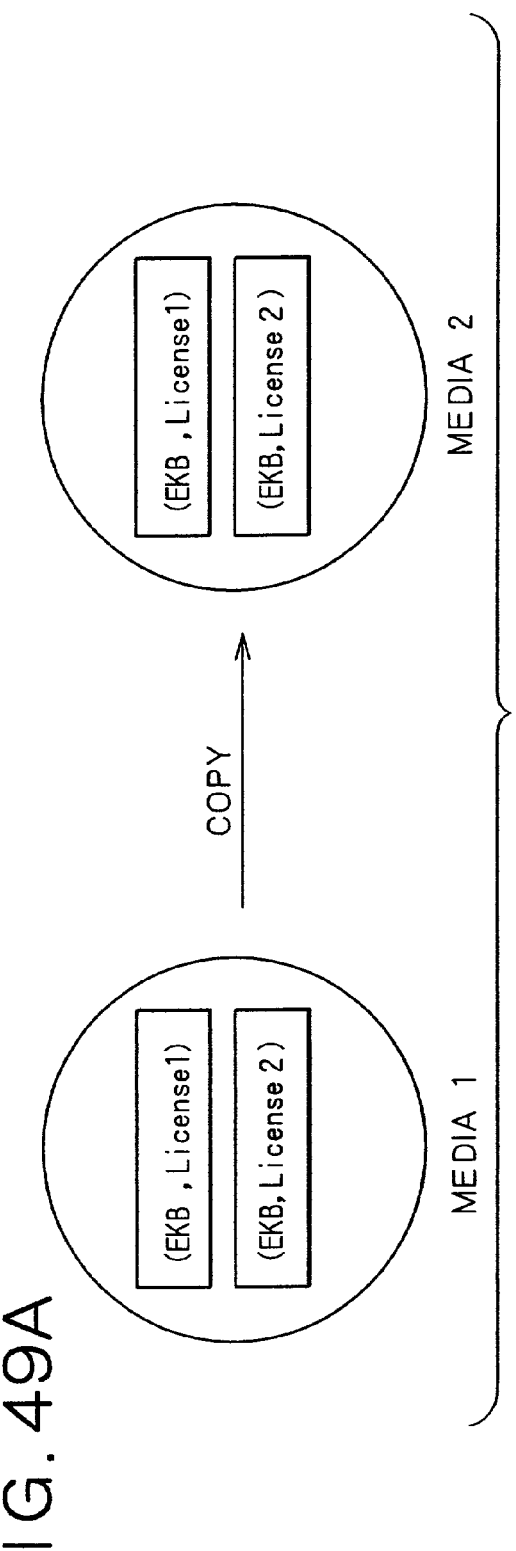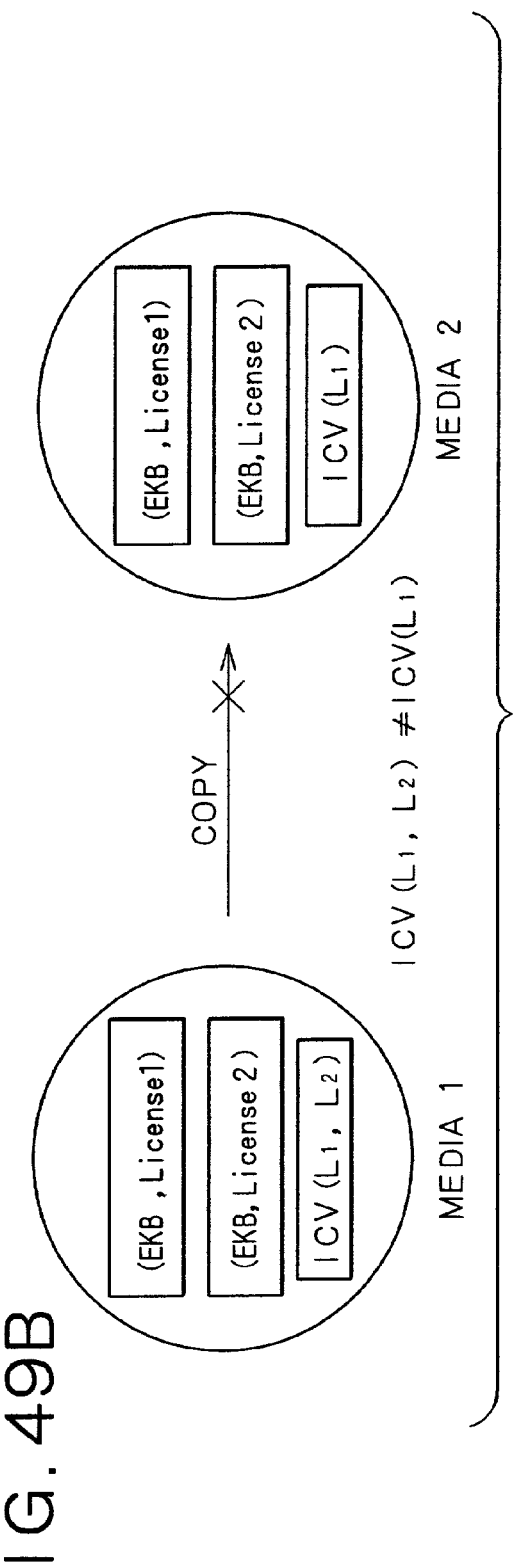

INFORMATION PROCESSING METHOD, INFORMATION PROCESSING APPARATUS AND RECORDING MEDIUM

CROSS-REFERENCE TO RELATED APPLICATIONS

The present application claims priority from Japanese application Nos. 2001-033114 filed Feb. 9, 2001 and 2001-094803 filed Mar. 29, 2001, the disclosures of which are hereby incorporated by reference herein.

BACKGROUND OF THE INVENTION

In general, the present invention relates to an information processing method, an information processing apparatus, a program storage medium and a program. More particularly, the present invention relates to an information processing method and an information processing apparatus which are used for preventing content from being copied and used illegally without a license from the owner of the copyright in the content, a program for implementing the information processing method and a program storage medium for storing the program.

In recent years, users have provided musical data they own to other users and have received musical data they do not own from other users through the Internet in content-exchanging system that allows a plurality of users to exchange musical data free of charge.

In such content-exchanging system, theoretically, music or another content owned by one user can thus be enjoyed by other users. Therefore, many users do not have to purchase such a piece of music or such content. As a result, since such a piece of music or such content does not sell well, the owner of the copyright in the content loses the opportunity to gain a royalty for the use of the piece of music or the content accompanying the sales of the piece of music or the content.

In society, there is thus a demand to prevent content from being copied and used illegally.

SUMMARY OF THE INVENTION

It is thus an object of the present invention addressing the problems described above to reliably prevent content from being used illegally.

In accordance with an aspect of the present invention, there is provided an information processing apparatus for allowing usage of content by requiring a license for using the content. The information processing apparatus includes a content storage unit operable to store license-identification information for specifying the license for using the content, encrypted data of the content and key information required for decrypting the encrypted data of the content; a license storage unit operable to store the license for using the content, including content-specifying information for specifying the content, the use of which is allowed by the license; a judgment unit operable to determine whether the license for using the content has been stored in the license storage unit; and a decryption unit operable to decrypt the encrypted data of the content if the license for using the content has been stored in the license storage unit.

The information processing apparatus further includes a transmitter operable to transmit a request for the license to a license server, the license request including the license-identification information; and a receiver operable to receive the license transmitted by the license server. The received license may be stored in the license storage unit.

The information processing apparatus further includes a reproducing unit operable to reproduce the data of the content decrypted by the decryption unit, wherein the data of the content is text data, image data, audio data, moving-picture data or combinations thereof.

The information processing apparatus further includes a device-node-key storage unit operable to store a device node key. The key information includes an EKB (Enabling Key Block). The decryption unit is operable to decrypt the EKB (Enabling Key Block) using the device node key to obtain a root key, and to decrypt the data of the content using the root key.

In the information processing apparatus, the key information further includes a content key encrypted using the root key. The data of the content is encrypted using the content key. The decryption unit is operable to decrypt the encrypted data of the content using the root key.

In the information processing apparatus, the license further includes usage-condition information showing a condition for using the content, the use of which is allowed by the license.

In the information processing apparatus, the license further includes an electronic signature signed by using a secret key of a license server.

The information processing apparatus further has a terminal-ID storage unit operable to store terminal-identification information identifying the information processing apparatus. The license request further includes the terminal identification information, and the received license includes a terminal ID. The judgment unit compares the terminal ID in the received license with the terminal-identification information stored in the terminal-ID storage unit and determines that the received license is the license for using the content only if the terminal ID in the received license matches the terminal-identification information stored in the terminal-ID storage unit.

In accordance with another aspect of the present invention, there is provided an information processing method for allowing a user to use content by requiring the user to have a license for using the content. The information processing method includes storing license-identification information for specifying the license for using the content, encrypted data of the content and key information required for decrypting the encrypted data of the content; storing the license for using the content in a license storage unit, the license including content-specifying information for specifying the content, the use of which is allowed by the license; determining whether the license for using the content has been stored in the license storage unit; and decrypting the encrypted data of the content if the license for using the content has been stored in the license storage unit.

In accordance with a further aspect of the present invention, there is provided a recording medium recorded with a program to be executed by a computer for carrying out processing to allow a user to use content by requiring the user to have a license for using the content. The program includes storing license-identification information for specifying the license for using the content, encrypted data of the content and key information required for decrypting the encrypted data of the content; storing the license for using the content in a license storage unit, the license including content-specifying information for specifying the content, the use of which is allowed by the license; determining whether the license for using the content has been stored in the license storage unit; and decrypting the encrypted data of the content if the license for using the content has been stored in the license storage unit.

The program or a portion of the program may be encrypted.

In accordance with a still further aspect of the present invention, there is provided a license server for issuing a license for allowing the use of content. The license server includes a license storage unit operable to store the license, the license including content-specifying information for specifying the content, the use of which is allowed by the license; and terminal-identification information for identifying an information processing apparatus; a receiver operable to receive a request for the license from the information processing apparatus, the license request including license-identification information for identifying the license; an extraction unit operable to extract the license identified by the license-identification information from the license storage unit; a processor operable to add the terminal-identification information to the extracted license; a signature unit operable to put a signature on the extracted license including the terminal-identification information using a secret key of the license server; and a transmitter operable to transmit the extracted license with the signature thereon to the information processing apparatus.

In accordance with a still further aspect of the present invention, there is provided a method for issuing a license for allowing the use of content. The method includes storing the license in a license storage unit, the license including content-specifying information for specifying the content, the use of which is allowed by the license, and terminal-identification information for identifying an information processing apparatus; receiving a request for the license from the information processing apparatus, the license request including license-identification information for identifying the license; extracting the license stored in the license storage unit and identified by the license-identification information; adding the terminal-identification information to the extracted license; putting a signature on the extracted license including the terminal-identification information using a secret key; and transmitting the extracted license with the signature thereon to the information processing apparatus.

In accordance with a still further aspect of the present invention, there is provided a recording medium recorded with a program to be executed by a computer for carrying out processing to issue a license for allowing the use of content. The program includes storing the license in a license storage unit, the license including content-identification information for specifying the content, the use of which is allowed by the license, and terminal-identification information for identifying an information processing apparatus; receiving a request for the license from the information processing apparatus, the license request including license-identification information for identifying the license; extracting the license stored in the license storage unit and identified by the license-identification information; adding the terminal-identification information to the extracted license; putting a signature on the extracted license including the terminal-identification information using a secret key; and transmitting the extracted license with the signature thereon to the information processing apparatus.

In the information processing method, the information processing apparatus and the recording medium recorded with the program which are provided by the present invention, content is decrypted and can be used on condition that the user has a license for using the content.

In the license server and the information processing method provided by the present invention, a valid license is issued only to a specific information processing apparatus.

BRIEF DESCRIPTION OF THE DRAWINGS

FIG. 8 is a diagram showing the configuration of a license;

FIG. 14 is a diagram concretely showing the typical association of nodes with devices;

FIGS. 15A and 15B are explanatory diagrams showing the configuration of an EKB (Enabling Key Block);

FIG. 16 is an explanatory diagram showing use of the EKB (Enabling Key Block);

FIGS. 49A and 49B are explanatory diagrams showing ICV-based management of operations to copy a license.

DETAILED DESCRIPTION

Figure 1:
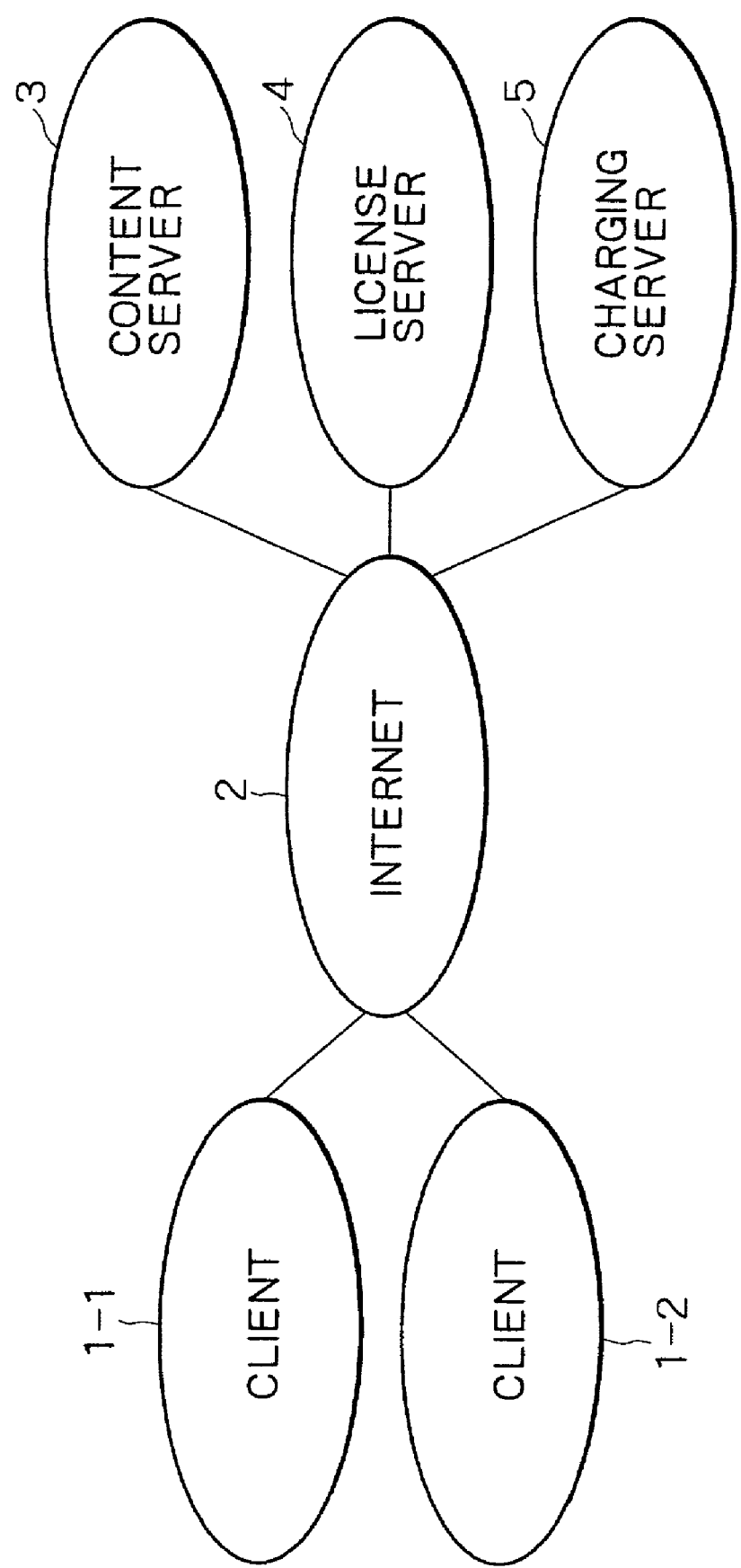
FIG. 1 is a schematic diagram showing the configuration of content-exchanging system to which the present invention is applied.

FIG. 1 is a block diagram showing the configuration of content-exchanging system to which the present invention is applied. Clients 1-1 and 1-2 are connected to the Internet 2. In the following description, the clients 1-1 and 1-2 are each denoted by generic reference numeral 1 if it is not necessary to distinguish the clients 1-1 and 1-2 from each other. In this example, only two clients are shown. However, any arbitrary number of clients can be connected to the Internet 2.

In addition, content server 3, a license server 4 and a charging server 5 are also connected to the Internet 2. The content server 3 provides contents to the client 1, and the license server 4 provides the client 1 with a license required for using content provided by the content server 3. The charging server 5 carries out a charging process for the client 1 when the client 1 receives a license from the license server 4.

Any arbitrary number of content servers 3, license servers 4 and charging servers 5 can be connected to the Internet 2.

Figure 2:
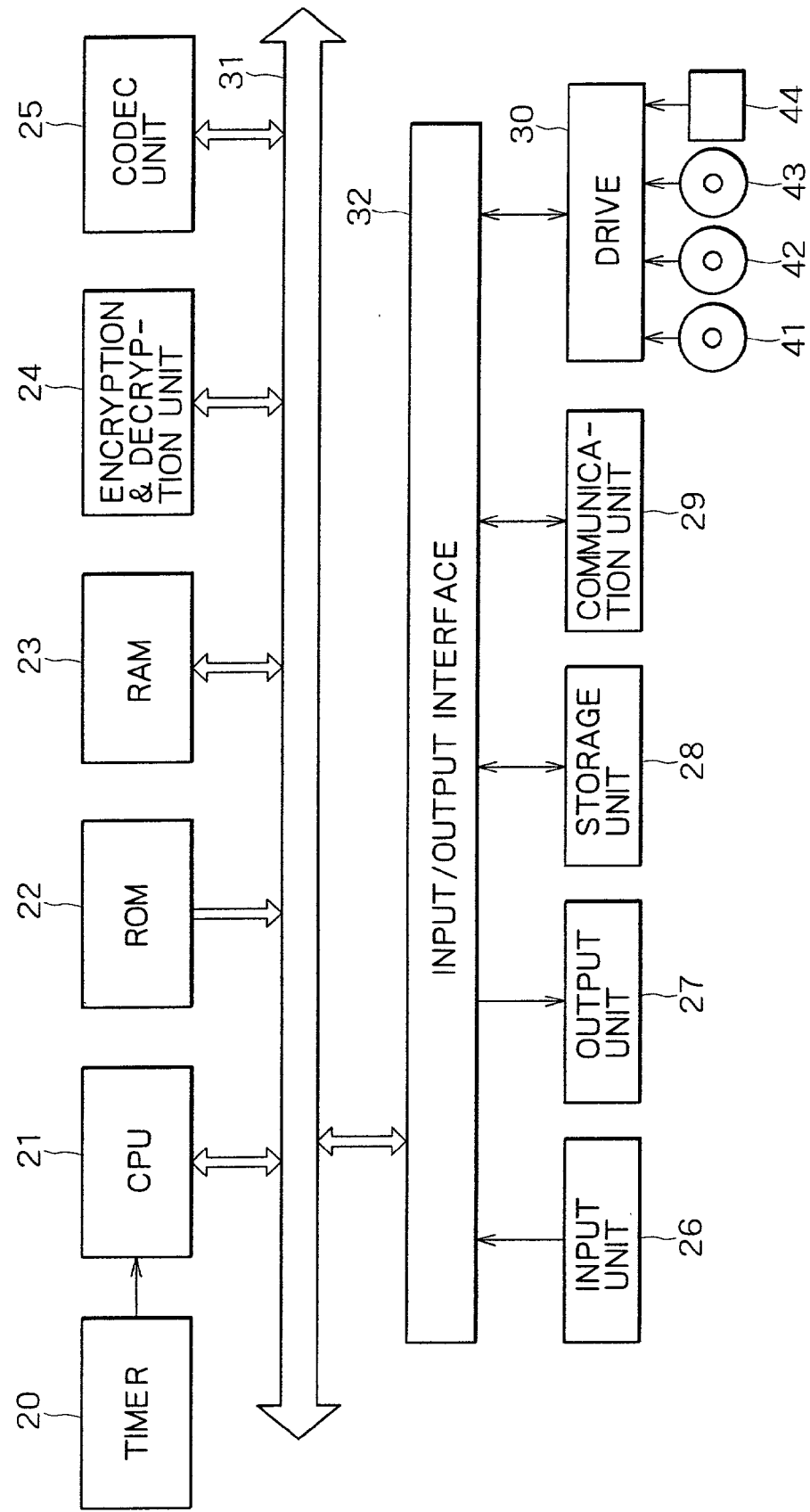
FIG. 2 is a block diagram showing the configuration of a client shown in FIG. 1.

FIG. 2 is a block diagram showing the configuration of the client 1. In the client 1 shown in FIG. 2, a CPU (Central Processing Unit) 21 carries out various kinds of processing in accordance with programs stored in a ROM (Read-Only Memory) 22 and programs loaded from a storage unit 28 into a RAM (Random-Access Memory) 23. A timer 20 measures the lapse of time and supplies a result of measurement to the CPU 21. The RAM 23 is also used for storing data required by the CPU 21 in the execution of the various kinds of processing.

An encryption and decryption unit 24 encrypts content and decrypts already encrypted content. A codec unit 25 encodes content in accordance with an ATRAC (Adaptive Transform Acoustic Coding)-3 system and supplies the encoded content to a semiconductor memory 44 to be stored therein. The semiconductor memory 44 is connected to a drive 30. An example of the semiconductor memory 44 is a Memory Stick (a trademark) In addition, the codec unit 25 decodes encoded data read out from the semiconductor memory 44 through the drive 30.

The CPU 21, the ROM 22, the RAM 23, the encryption and decryption unit 24, and the codec unit 25 are connected to each other by a bus 31. The bus 31 is also connected to an input/output interface 32.

The input/output interface 32 is connected to an input unit 26, an output unit 27, the storage unit 28 and a communication unit 29. The input unit 26 includes a keyboard and a mouse. The output unit 27 includes a speaker and a display unit such as a CRT or an LCD. The communication unit 29 includes a modem and a terminal adaptor. The communication unit 29 carries out communications through the Internet 2. To be more specific, the communication unit 29 exchanges analog and digital signals with other clients.

If necessary, the input/output interface 32 is also connected to the drive 30, on which a proper storage medium such as a magnetic disk 41, an optical disk 42, a magneto-optical disk 43 or the semiconductor memory 44 is mounted. If necessary, a computer program can thus be read out from the storage medium and installed in the storage unit 28.

The configurations of the content server 3, the license server 4 and the charging server 5 are not shown in the figures. However, the content server 3, the license server 4 and the charging server 5 are each a computer having a configuration basically identical with the client 1 shown in FIG. 2. For this reason, some of the reference numerals shown in the configuration of FIG. 2 are used for denoting identical components employed in the content server 3, the license server 4 and the charging server 5 in the following description.

Figure 3:
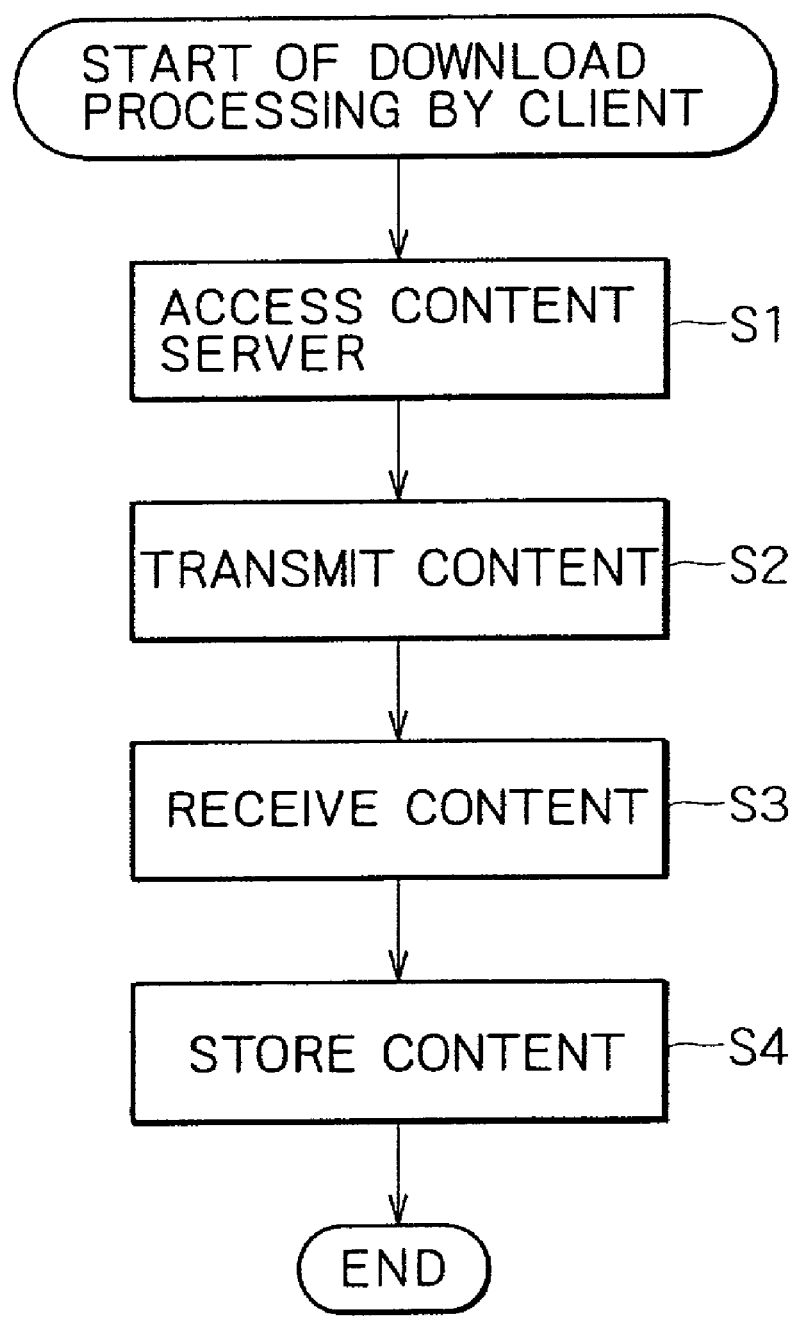
FIG. 3 is a flowchart used for explaining processing carried out by the client shown in FIG. 1 to download content.

By referring to the flowchart shown in FIG. 3, the following description explains the processing to provide content from the content server 3 to the client 1.

As shown in the figure, the flowchart begins with a step S1 at which the user enters a command to access the content server 3 by operating the input unit 26. In accordance with the command, the CPU 21 controls the communication unit 29 to access the content server 3 through the Internet 2. Then, at the next step S2, when the user specifies a desired content by operating the input unit 26, the CPU 21 accepts the specification. The communication unit 29 informs the content server 3 of the specified content through the Internet 2. Notified of the specified content, the content server 3 transmits encoded data of the content in a process represented by the flowchart shown in FIG. 4, as will be described later. Subsequently, at the next step S3, the CPU 21 receives the content through the communication unit 29. Then, at the next step S4, the encoded data of the content is stored in a hard disk of the storage unit 28.

Figure 4:
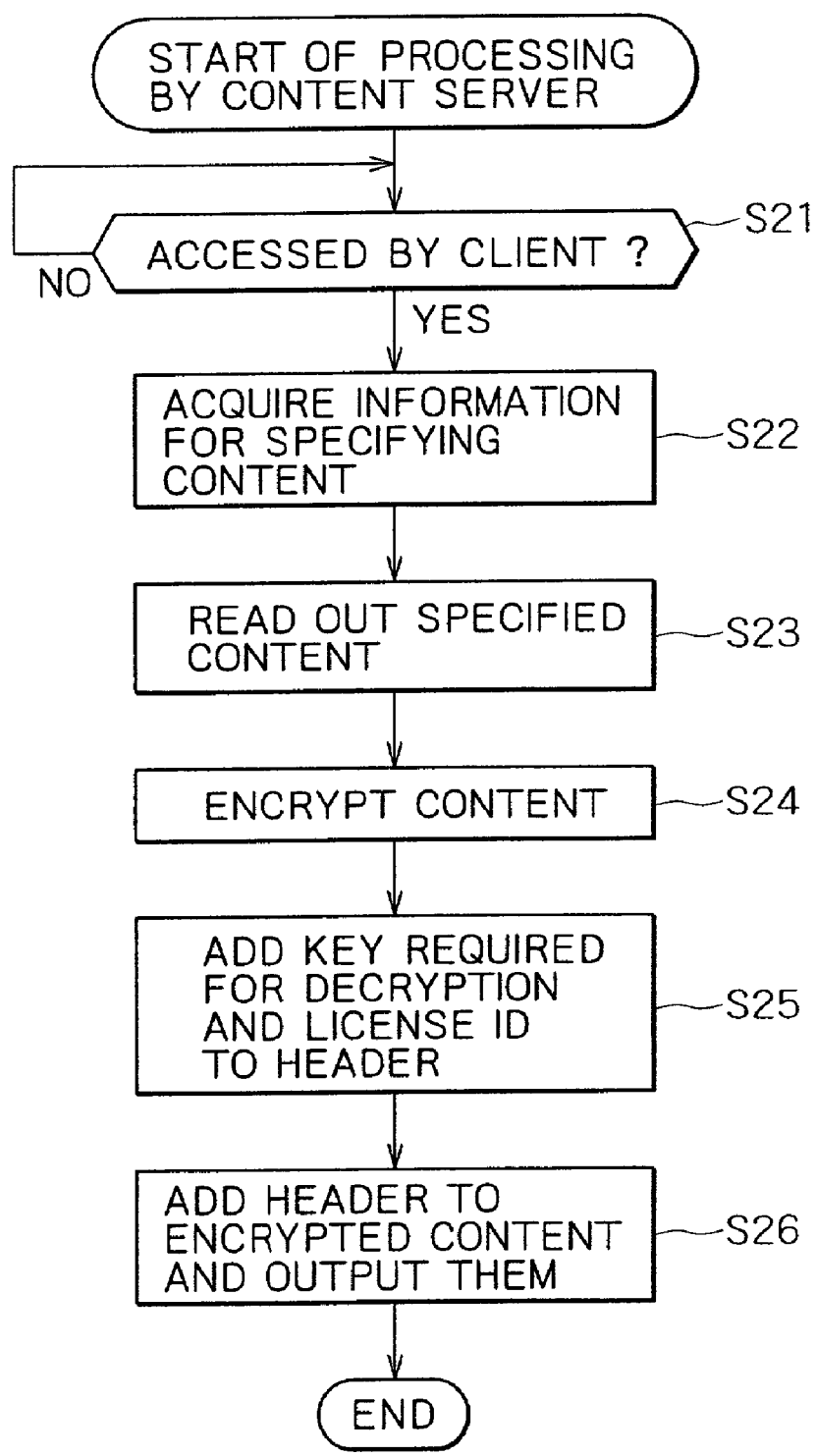
FIG. 4 is a flowchart used for explaining processing carried out by content server shown in FIG. 1 to provide a client with content.

With reference to the flowchart shown in FIG. 4, the following description explains the processing carried out by the content server 3 to transmit the content requested by the client 1 at the step S2. It should be noted that, since the content server 3 has a configuration comprising components identical with those employed in the client 1, the same reference numerals as those shown in FIG. 2 are used for denoting identical components in the following description.

As shown in FIG. 4, the flowchart begins with a step S21 at which the CPU 21 employed in the content server 3 is waiting for the content server 3 to be accessed by the communication unit 29 by way of the Internet 2. When access is determined to have been made, the flow of the processing goes on to a step S22 at which information transmitted by the client 1 to specify the content is acquired. The information specifying the content is transmitted by the client 1 at the step S2 of the flowchart shown in FIG. 3.

Then, at the next step S23, the CPU 21 employed in the content server 3 reads out the content specified by the information acquired at the step S22 from the storage unit 28. The content read out from the storage unit 28 is selected from among contents stored in the storage unit 28. Subsequently, at the next step S24, the CPU 21 supplies the content read out from the storage unit 28 to the encryption and decryption unit 24, which then encrypts the content by using content key Kc.

Since the contents stored in the storage unit 28 have been encoded by the codec unit 25 in accordance with the ATRAC3 system, the encryption and decryption unit 24 encrypts an encoded content received from the CPU 21.

It should be noted that the storage unit 28 can also be used for storing contents which have been encrypted in advance. In this case, the processing carried out at the step S24 can be eliminated.

Then, at the next step S25, the CPU 21 employed in the content server 3 adds keys and a license ID to the header of a format in which the encrypted content is to be transmitted. Required for decrypting the encrypted data, the keys are an EKB and a key $K_{EKBC}$ (Kc), which will be described later by referring to FIG. 5. The license ID is used to identify a license necessary for using the content. Subsequently, at the next step S26, the CPU 21 employed in the content server 3 transmits formatted data to the client 1 through the communication unit 29 and the Internet 2. The formatted data is a result of formatting the content encrypted at the step S24 and the header, including the key and the license ID which are added to the header at the step S25.

Figure 5:
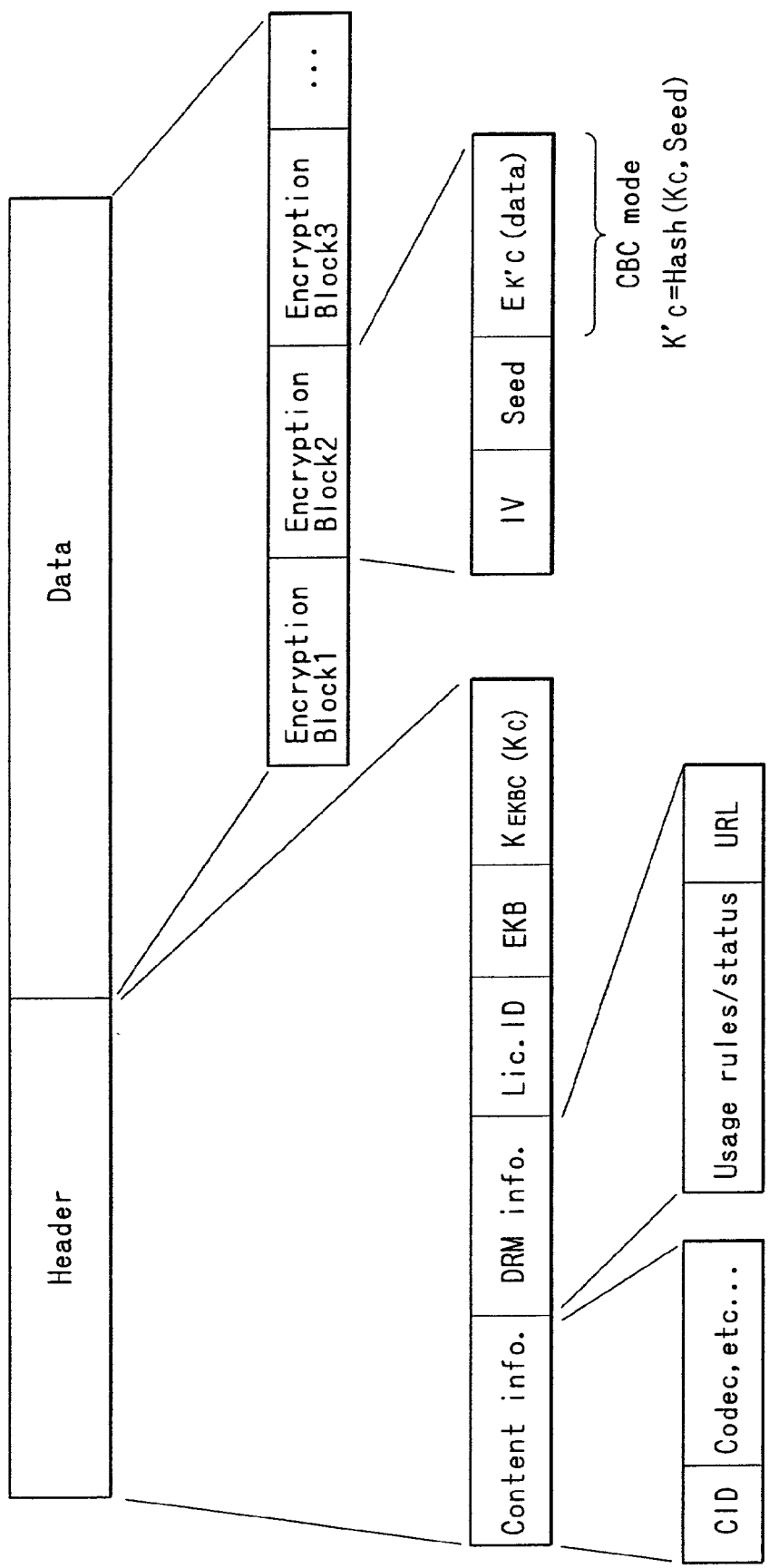
FIG. 5 is a diagram showing a typical format of data generated at step S26 of the flowchart shown in FIG. 4.

FIG. 5 is a diagram showing the format of the content received by the client 1 from the content server 3. As shown in the figure, the format comprises a header and a data portion.

The header comprises content information, DRM (Digital Right Management) information, a license ID, an EKB (Enabling Key Block) and a key $K_{EKBC}$ (Kc), which is content key Kc encrypted by a key $K_{EKBC}$ generated from the EKB. It should be noted that the EKB will be explained later by referring to FIG. 15.

The content information includes content ID CID and information on a codec system. The content ID CID is identification for identifying the formatted content in the data portion of the format.

The DRM information comprises the content's usage rules and status. The DRM information also includes a URL (Uniform Resource Locator). The usage rules and status typically include the number of times the content has been played back and the number of times the content has been copied.

The URL is an address which may be accessed in order to acquire a license prescribed by the license ID. More specifically, the URL is the address of the license server 4 for providing a required license in the case of the content-exchanging system shown in FIG. 1. The license ID is identification for identifying the license required to use the content recorded as the data portion of the format.

The data portion of the format comprises any arbitrary number of encrypted blocks. Each of the encrypted blocks comprises an initial vector IV, a seed and encrypted data Ek'c (data), which is a result of encrypting the content by using a key K'c.

As shown in the following formula, the key K'c is a result of processing carried out by applying the content key Kc and the seed to a hash function. The seed is a value set at random.

$$K'c = \text{Hash}(Kc, \text{Seed}) \qquad i.$$

The initial vector IV and the seed vary depending on the encrypted block.

The content is encrypted in 8-byte units. The 8 bytes at a current stage are encrypted by using the result of encryption of 8 bytes at the preceding stage in a CBC (Cypher Block Chaining) mode.

In the CBC mode, when the first 8 bytes of content are encrypted, no encryption of 8 bytes is carried out at the preceding stage so that the result of preceding-stage encryption is not available. Thus, the first 8 bytes of the content are encrypted by using the initial vector IV as an initial value.

Therefore, even if an encrypted block of content encrypted in the CBC mode can be decoded, the decoding result of the block may not necessarily make another encrypted block easy to decode.

It should be noted that the encryption process will be explained later in detail by referring to FIG. 46. The encryption system, however, is not limited thereto.

As described above, the client 1 is allowed to freely acquire content from the content server 3 free of charge. Thus, a large number of contents can be distributed.

When using acquired content, however, the client 1 needs to have a license. The following description explains the processing carried out by the client 1 to play back content with reference to the flowchart shown in FIG. 6.

As shown in the figure, the flowchart begins with a step S41 at which the user operates the input unit 26 to specify a desired content and the CPU 21 employed in the client 1 acquires the identification of the content (CID). The identification comprises the title of the content, a number assigned to the content and the like. It should be noted that a number is assigned to each stored content.

When content is desired, the CPU 21 reads out a license ID for the content. To be more specific, the license ID identifies a license required to utilize the content. As shown in FIG. 5, the license ID is included in the header of the encrypted content.

Then, at the next step S42, the CPU 21 forms a judgment as to whether the license indicated by the license ID obtained at the step S41 has been acquired by the client 1 and stored in the storage unit 28. If the license indicated by the license ID has not been acquired by the client 1, the flow of the processing goes on to a step S43 at which the CPU 21 carries out processing to acquire the license. Details of the processing to acquire the license will be explained later by referring to the flowchart shown in FIG. 7.

If the outcome of the judgment formed at the step S42 indicates that the license identified by the license ID has been acquired by the client 1 and stored in the storage unit 28, or if the license can be obtained as a result of the processing carried out at the step S43 to acquire the license, the flow of the processing goes on to a step S44 at which the CPU 21 forms a judgment as to whether the acquired license is still in its term of validity. It is possible to determine whether the acquired license is still in its term of validity by comparing a term of validity prescribed in the license (which will be described in FIG. 8) with the present date and time measured by the timer 20. If the term of validity of the license has already expired, the flow of the processing goes on to a step S45 at which the CPU 21 carries out processing to update the license. Details of the processing to update the license will be explained later by referring to the flowchart shown in FIG. 8.

If the outcome of the judgment formed at the step S44 indicates that the acquired license is still in its term of validity, or if the license can be updated at the step S45, the flow of the processing goes on to a step S46 at which the CPU 21 reads out the encrypted content from the storage unit 28 and stores the content into the RAM 23. Then, at the next step S47, the CPU 21 supplies the data of the encrypted content stored in the RAM 23 to the encryption and decryption unit 24 in encrypted-block units included in the data portion shown in FIG. 5. The encryption and decryption unit 24 then decrypts the encrypted content by using the content key Kc.

A typical method of acquiring the content key Kc will be described later by referring to FIG. 15. The key $K_{EKBC}$ included in the EKB shown in FIG. 5 can be obtained by using a device node key (DNK) shown in FIG. 8. The content key Kc is then obtained from the data $K_{EKBC}$ (Kc) by using the key $K_{EKBC}$.

Subsequently, at the next step S48, the CPU 21 supplies the content decrypted by the encryption and decryption unit 24 to the codec unit 25, which then decodes the content. Subsequently, the CPU 21 supplies data decoded by the codec unit 25 to the output unit 27 by way of the input/output interface 32. The data is subjected to D/A conversion before being output to a speaker.

Figure 6:
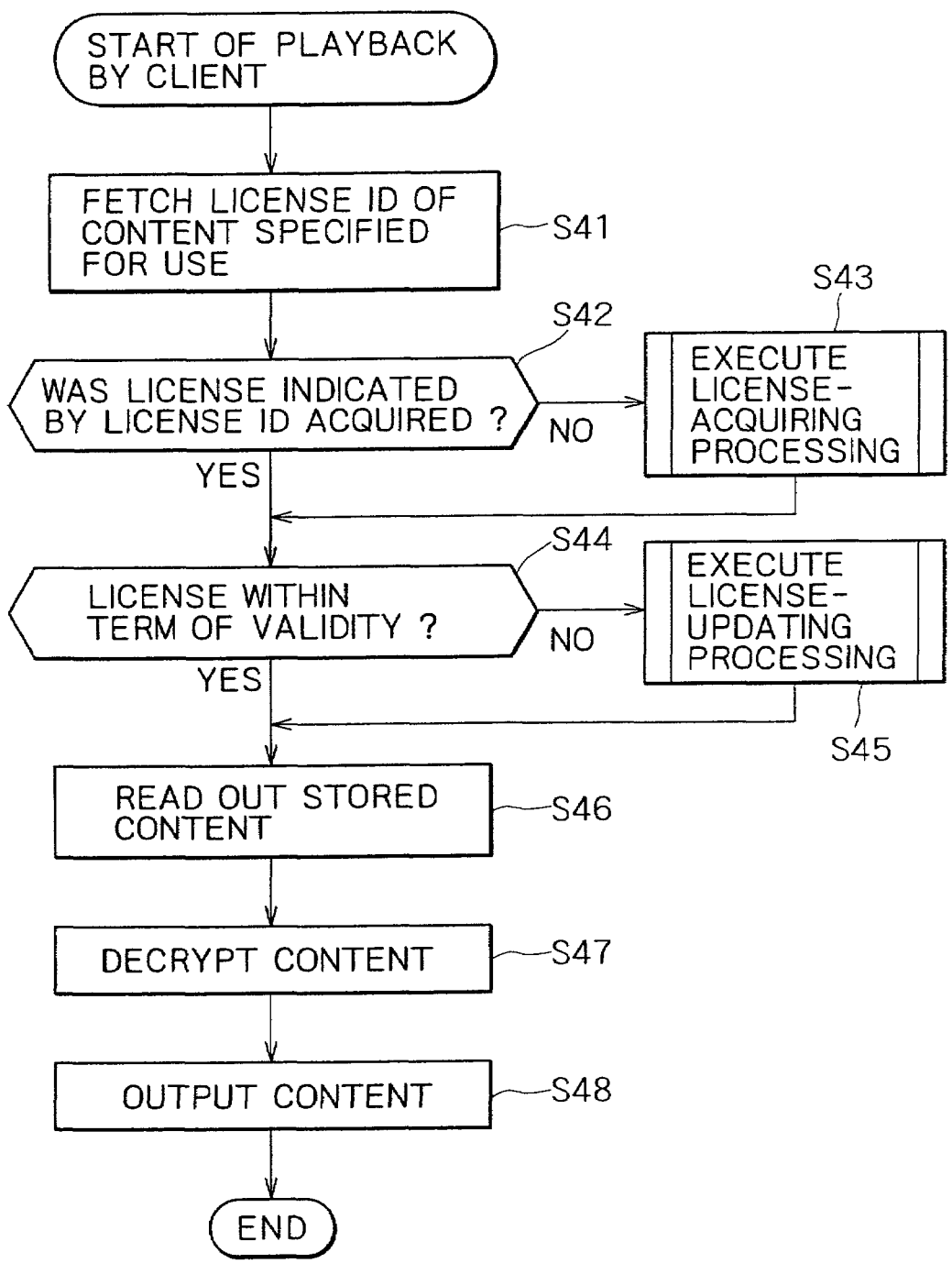
FIG. 6 is a flowchart used for explaining processing carried out by the client shown in FIG. 1 to play back content.
Figure 7:
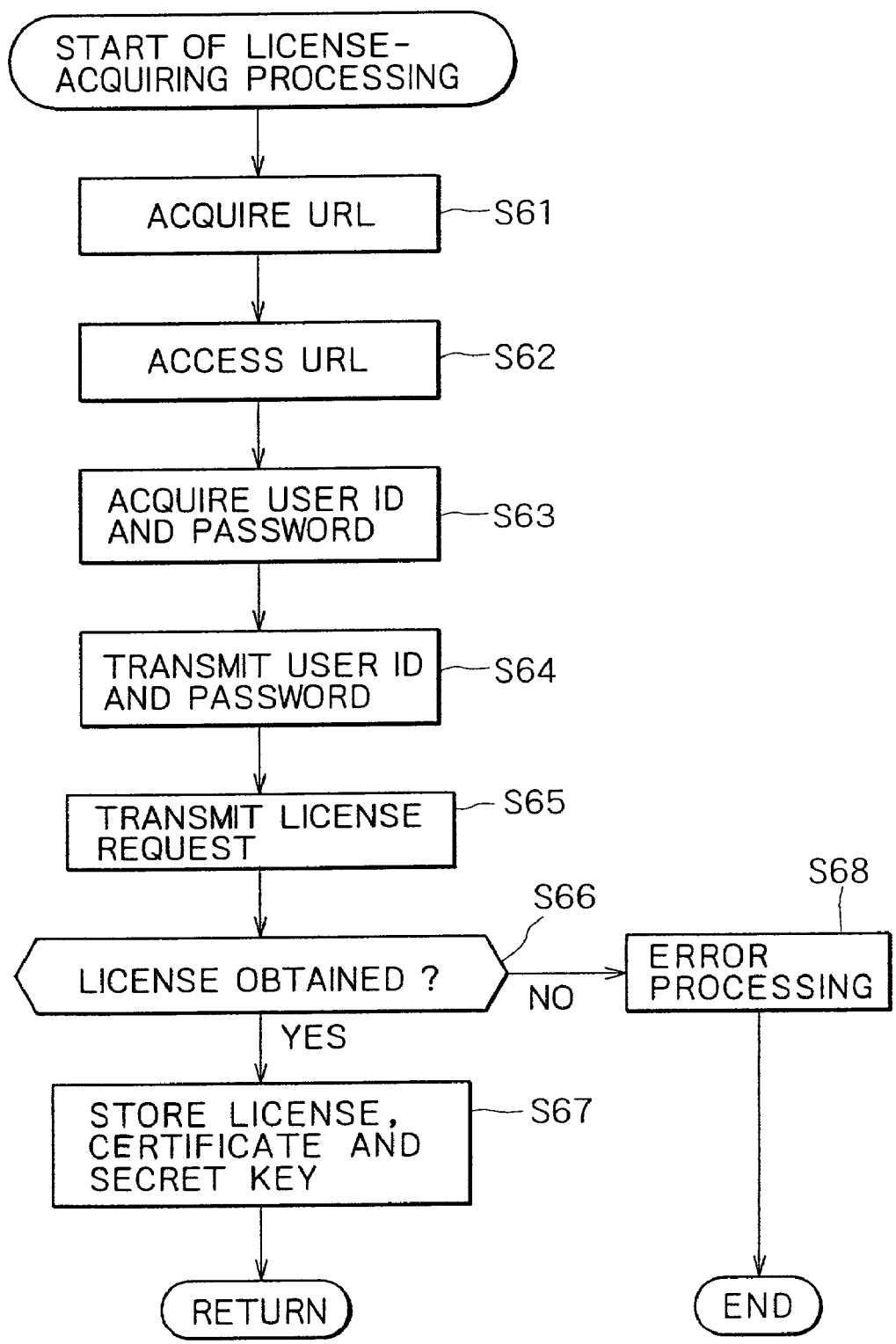
FIG. 7 is a flowchart used for explaining details of processing carried out at step S43 of the flowchart shown in FIG. 6 to acquire a license.

With reference to the flowchart shown in FIG. 7, the following description explains the processing carried out at the step S43 of the flowchart shown in FIG. 6 to acquire a license.

The client 1 acquires beforehand service data cataloged in advance in the license server 4. The service data includes a leaf ID, a DNK (Device Node Key), a pair of secret and disclosed keys pertaining to the client 1, a disclosed key of the license server 4 and certificates for the disclosed keys.

A leaf ID is an ID assigned uniquely to each client 1. A DNK (Device Node Key) is a key required for decrypting an encrypted content key Kc included in the EKB (Enabling Key Block) for the license, as will be described later by referring to FIG. 12.

As shown in FIG. 7, the flowchart begins with a step S61 at which the CPU 21 acquires a URL for the ID of the license being processed from the header shown in FIG. 5. As described earlier, this URL is an address which is to be accessed in order to acquire the license identified by the license ID included in the header. Then, at the next step S62, the CPU 21 accesses the URL acquired at the step S61. More specifically, the license server 4 is accessed through the communication unit 29 and the Internet 2. At that time, the license server 4 requests the client 1 to transmit a user ID, a password and license-specifying information specifying a license to be purchased. This license is required to utilize the content. This request is made at a step S102 of the flowchart shown in FIG. 9, as will be described later. The CPU 21 displays this request on the display device of the output unit 27. In response to this request, the user of the client 1 operates the input unit 26 to enter a user ID, a password and license-specifying information. It should be noted that the user obtained the user ID and the password previously by accessing the license server 4 through the Internet 2.

Subsequently, at the next steps S63 and S64, the CPU 21 receives the license-specifying information, the user ID and the password, which have been entered from the input unit 26 by the user. Then, at the next step S65, the CPU 21 controls the communication unit 29 to transmit a license request including the user ID, the password, the license-specifying information and a leaf ID to the license server 4 by way of the Internet 2. The leaf ID is information included in the service data to be described later.

As will be described later, at a step S109 of the flowchart shown in FIG. 9, the license server 4 transmits a license based on the user ID, the password and the license-specifying information. As an alternative, the license server 4 carries out error processing at a step S112 of the flowchart shown in FIG. 9 instead of transmitting a license in case a condition is not met.

The processing then goes on to a step S66 to form a judgment as to whether the license has been received from the license server 4. If the license has been received, the flow of the processing goes on to a step S67 at which the CPU 21 supplies the license to the storage unit 28 to be stored therein.

If the outcome of the judgment formed at the step S66 indicates that the license was not received, on the other hand, the flow of the processing goes on to a step S68 at which the CPU 21 carries out error processing. More particularly, the CPU 21 inhibits the processing to play back the content since the CPU 21 has failed to obtain the license for using the content.

As described above, the client 1 is capable of using content by obtaining a license indicated by a license ID included in the content.

It should be noted that the processing to acquire a license as represented by the flowchart shown in FIG. 7 can also be carried out in advance before the user acquires the content.

As shown in FIG. 8, the license supplied to the client 1 includes usage conditions and a leaf ID. The usage conditions are information including a deadline by which the content must be downloaded as allowed by the license, an upper limit of the number of times the content can be copied as allowed by the license or the maximum number of allowed copy operations, the number of checkouts, the maximum number of checkouts, a right to record the content on a CD-R, the number of times the content can be copied to a PD (Portable Device), a right to allow the license to use the content to be changed to license ownership status (or purchased-license status) and a duty of making a usage log.

Figure 9:
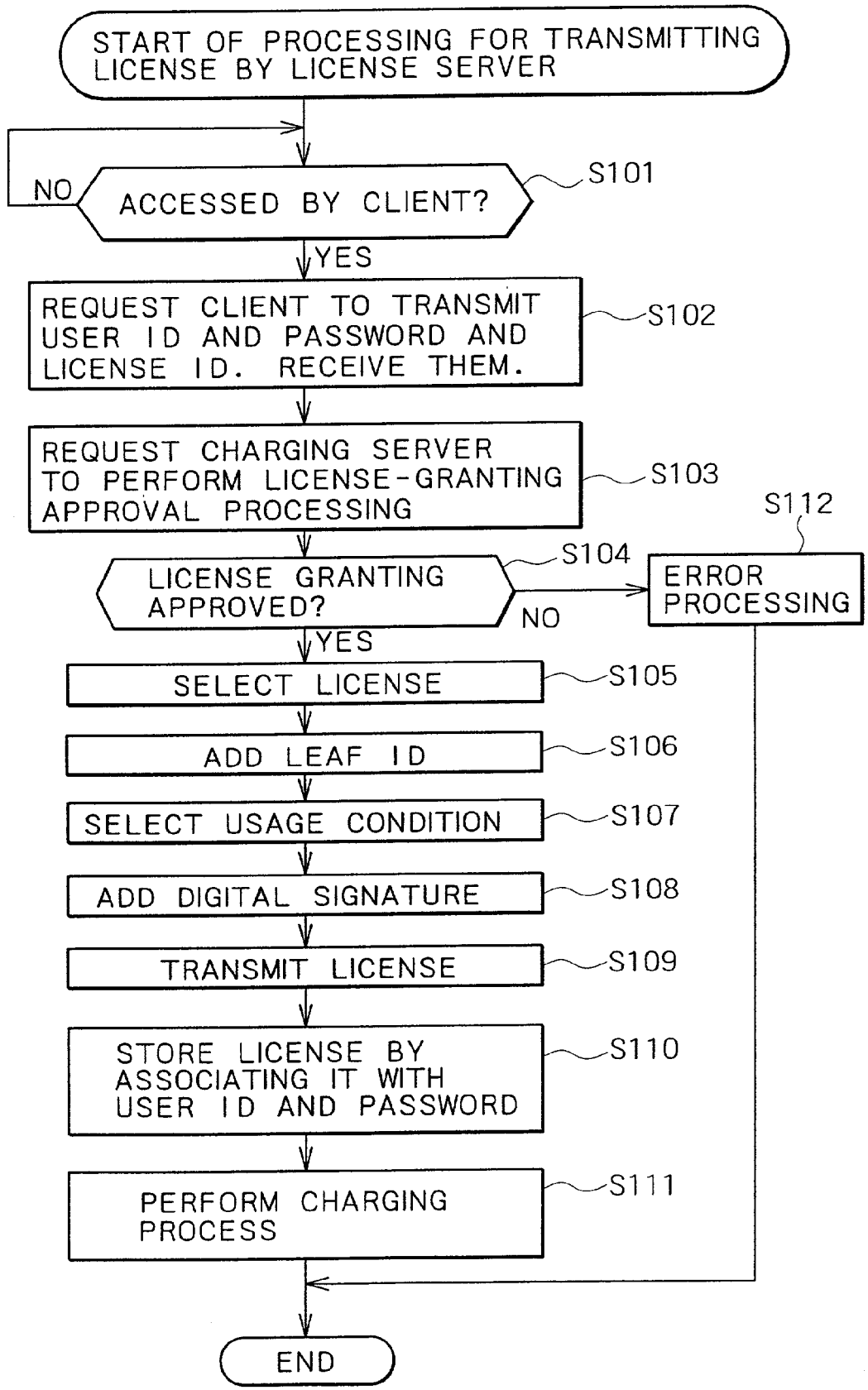
FIG. 9 is a flowchart used for explaining processing carried out by a license server shown in FIG. 1 to issue a license.

By referring to the flowchart shown in FIG. 9, the following description explains processing carried out by the license server 4 to transmit a license to the client 1 in response to the processing carried out by the client 1 to acquire the license as represented by the flowchart shown in FIG. 7. It should be noted that, also in this case, since the license server 4 has a configuration comprising components identical with those employed in the client 1, the same reference numerals as those shown in FIG. 2 are used for denoting identical components in the following description.

As shown in the figure, the flowchart begins with a step S101 at which the CPU 21 employed in the license server 4 waits for the license server 4 to be accessed by the client 1. As the client 1 accesses the license server 4, the flow of the processing goes on to a step S102 at which the license server 4 requests the client 1 to transmit license-specifying information (a license ID), a user ID and a password. Then, the CPU 21 employed in the license server 4 receives the user ID, the password, the leaf ID and the license ID from the client 1 through the communication unit 29 at the step S65 of the flowchart shown in FIG. 7, and carries out processing to accept them.

Then, at the next step S103, the CPU 21 employed in the license server 4 accesses the charging server 5 through the communication unit 29 in order to make a request for processing to examine the user identified by the user ID and the password. When receiving the request for such an examination from the license server 4 through the Internet 2, the charging server 5 checks the past payment history of the user identified by the user ID and the password in order to determine whether there is a record indicating that the user did not pay for requested licenses in the past. If there is no record indicating that the user did not pay for requested licenses in the past, the charging server 5 transmits an examination result indicating that the granting of a license is approved. If, on the other hand, there is a record indicating that the user did not pay for requested licenses in the past or another bad record, the charging server 5 transmits an examination result indicating that the granting of a license is not approved.

Subsequently, at the next step S104, the CPU 21 employed in the license server 4 forms a judgment as to whether the examination result received from the charging server 5 indicates that the granting of a license is approved or disapproved. If the granting of a license is approved, the flow of the processing goes on to a step S105 at which the CPU 21 selects the license specified by the license-specifying information received in the processing carried out at the step S102 from among licenses stored in the storage unit 28, and reads out the selected license from the storage unit 28. Each license stored in the storage unit 28 includes information including the license ID, a version, a creation date and time and a term of validity. Then, at the next step S106, the CPU 21 adds the received leaf ID to the license. Furthermore, at the next step S107, the CPU 21 selects a usage condition associated with the license selected at the step S105. If a usage condition was found at the step S102 to have been specified by the user, if necessary, the usage condition specified by the user is added to a usage condition prepared in advance. The CPU 21 then adds the selected usage condition to the license.

Then, at the next step S108, the CPU 21 puts a digital signature on the license by using a secret key of the license server 4 to produce a license with a configuration like the one shown in FIG. 8.

Subsequently, at the next step S109, the CPU 21 employed in the license server 4 transmits the license with a configuration like the one shown in FIG. 8 from the communication unit 29 to the client 1 by way of the Internet 2.

Then, at the next step S110, the CPU 21 employed in the license server 4 stores the license transmitted in the processing carried out at the step S109 in the storage unit 28 by associating the license with the user ID and the password, which were acquired in the processing carried out at the step S102. As described above, the license includes a usage condition and a leaf ID. Subsequently, at the next step S111, the CPU 21 carries out a charging process. More particularly, the CPU 21 requests the charging server 5 through the communication unit 29 to carry out a charging process for the user identified by the user ID and the password. The charging server 5 carries out the charging process based on the request. The processing carried out by the license server 4 is then finished.

If the user does not pay the amount of money determined by the charging process, the user will not be granted a license in the future, even if the granting of a license is requested as described above. That is to say, in the case of such a user, the charging server 5 will not approve the granting of a license as a result of examining whether to grant a license to the user. In other words, the flow of the processing will go from the step S104 to a step S112 at which the CPU 21 employed in the license server 4 carries out an error-handling process. More specifically, the CPU 21 controls the communication unit 29 to output a message informing the client 1 accessing the license server 4 that a license cannot be granted. The processing carried out by the license server 4 is then finished.

In this case, the client 1 cannot use the content or is not capable of decrypting the encrypted data of the content because the client 1 has failed to obtain a license as described above.

Figure 10:
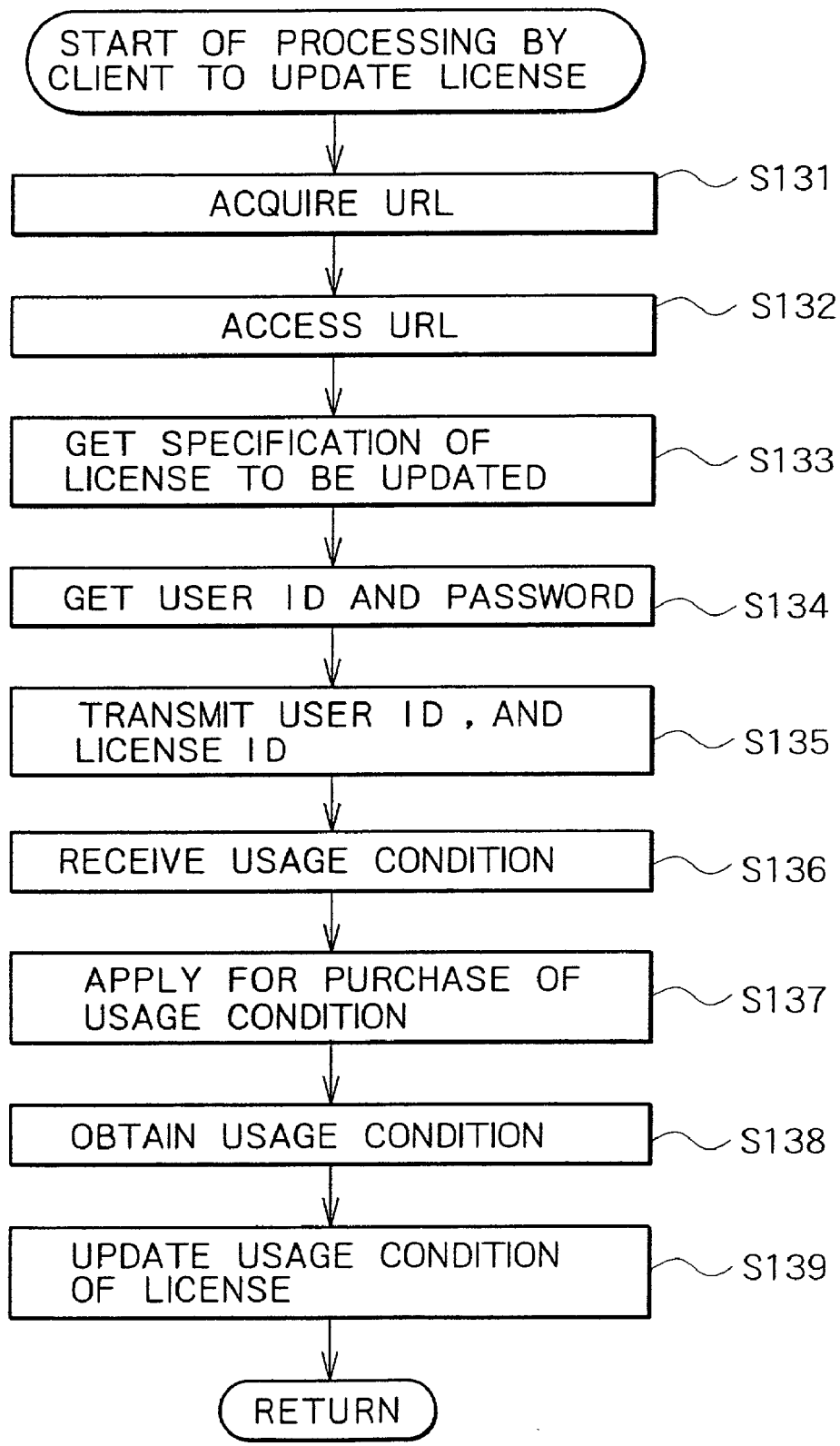
FIG. 10 is a flowchart used for explaining details of processing carried out at step S45 of the flowchart shown in FIG. 6 to update a license.

FIG. 10 is a flowchart used for explaining details of the processing carried out at the step S45 of the flowchart shown in FIG. 6 to update a license. The processing carried out at steps S131 to S135 is basically the same as the processing carried out at the respective steps S61 to S65 of the flowchart shown in FIG. 7. At the step S133, however, the CPU 21 acquires the license ID of a license to be updated instead of the license ID of a purchased license. Then, at the step S135, the CPU 21 transmits a user ID and a password along with the license ID of the license to be updated to the license server 4.

In response to what is transmitted in the processing carried out at the step S135, the license server 4 presents usage conditions at a step S153 of a flowchart shown in FIG. 11, as will be described later. Then, at the next step S136, the CPU 21 employed in the client 1 receives the presented usage conditions from the license server 4 and displays them on the output unit 27. The user operates the input unit 26 to select one of the displayed usage conditions and/or newly add a predetermined usage condition. Subsequently, at the next step S137, the CPU 21 transmits an application to purchase a usage condition selected as described above or a condition to update a license to the license server 4. In response to the application, the license server 4 transmits an eventual usage condition at a step S154 of the flowchart shown in FIG. 11, as will be described later. Then, at the next step S138, the CPU 21 employed in the client 1 receives the eventual usage condition from the license server 4. Subsequently, at the next step S139, the received eventual usage condition is used as an update of the license's usage condition already stored in the storage unit 28.

Figure 11:
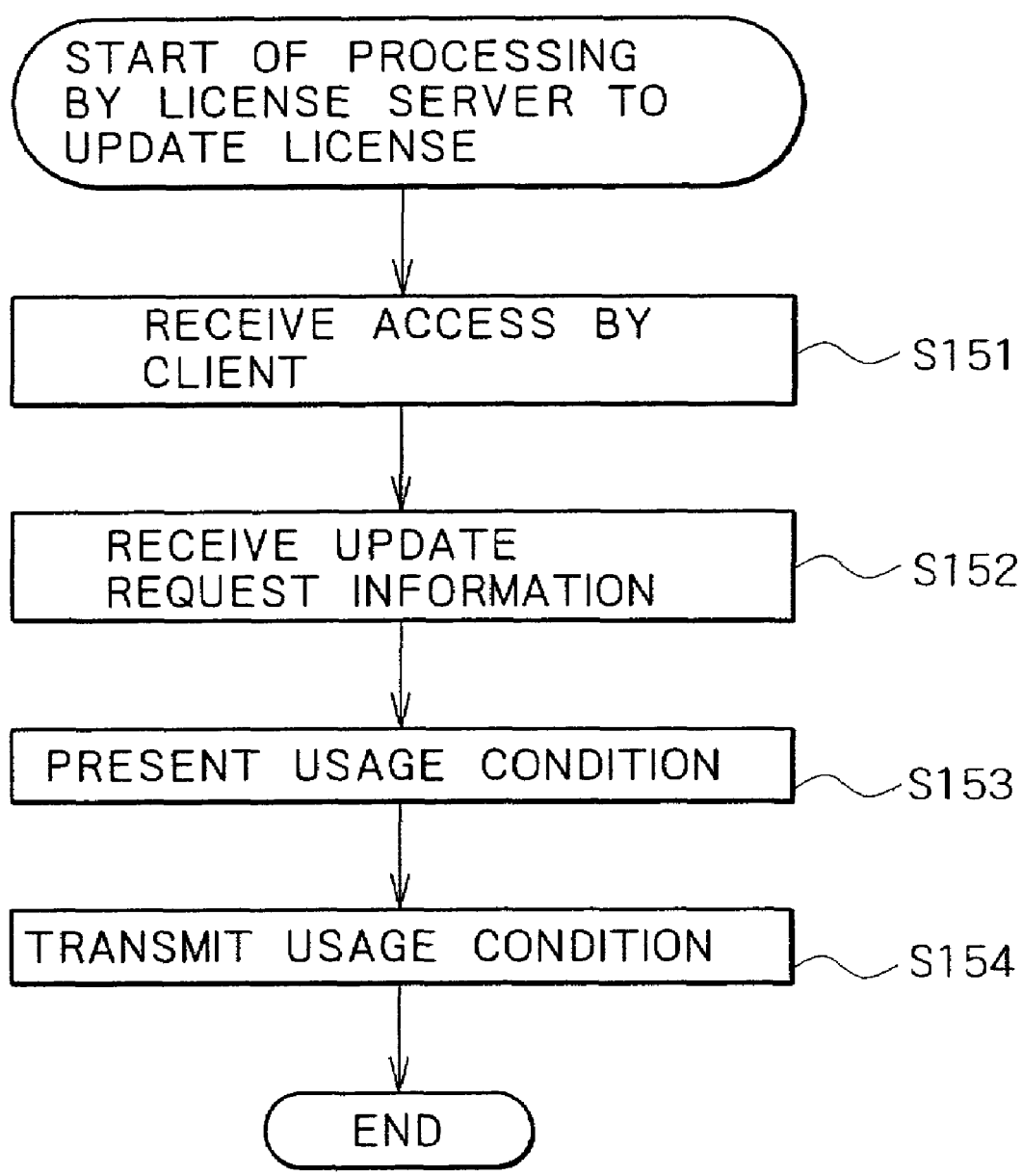
FIG. 11 is a flowchart used for explaining processing carried out by the license server shown in FIG. 1 to update a license.

FIG. 11 is a flowchart used for explaining the processing carried out by the license server 4 to update a license in conjunction with the processing carried out by the client 1 to request that the license be updated.

As shown in the figure, the flowchart begins with a step S151 at which the license server 4 is accessed by the client 1. Then, at the next step S152, the CPU 21 employed in the license server 4 receives a request to update a license from the client 1 along with the license-specifying information transmitted by the client 1 at the step S135.

Subsequently, at the next step S153, the CPU 21 reads out a usage condition for the license to be updated in accordance with the request to update the license, or reads out a condition for updating the license, from the storage unit 28. The CPU 21 then transmits the condition to the client 1.

In response to the transmitted condition, assume that the user of the client 1 enters an application to purchase the usage condition in processing carried out at the step S137 of the flowchart shown in FIG. 10. In this case, at the next step S154, the CPU 21 employed in the license server 4 generates data for the applied usage condition and transmits the data to the client 1. As described above, the client 1 uses the received usage condition as an update of the already cataloged usage condition of the license. As described above, the usage condition was updated in the processing carried out at the step S139.

Figure 12:
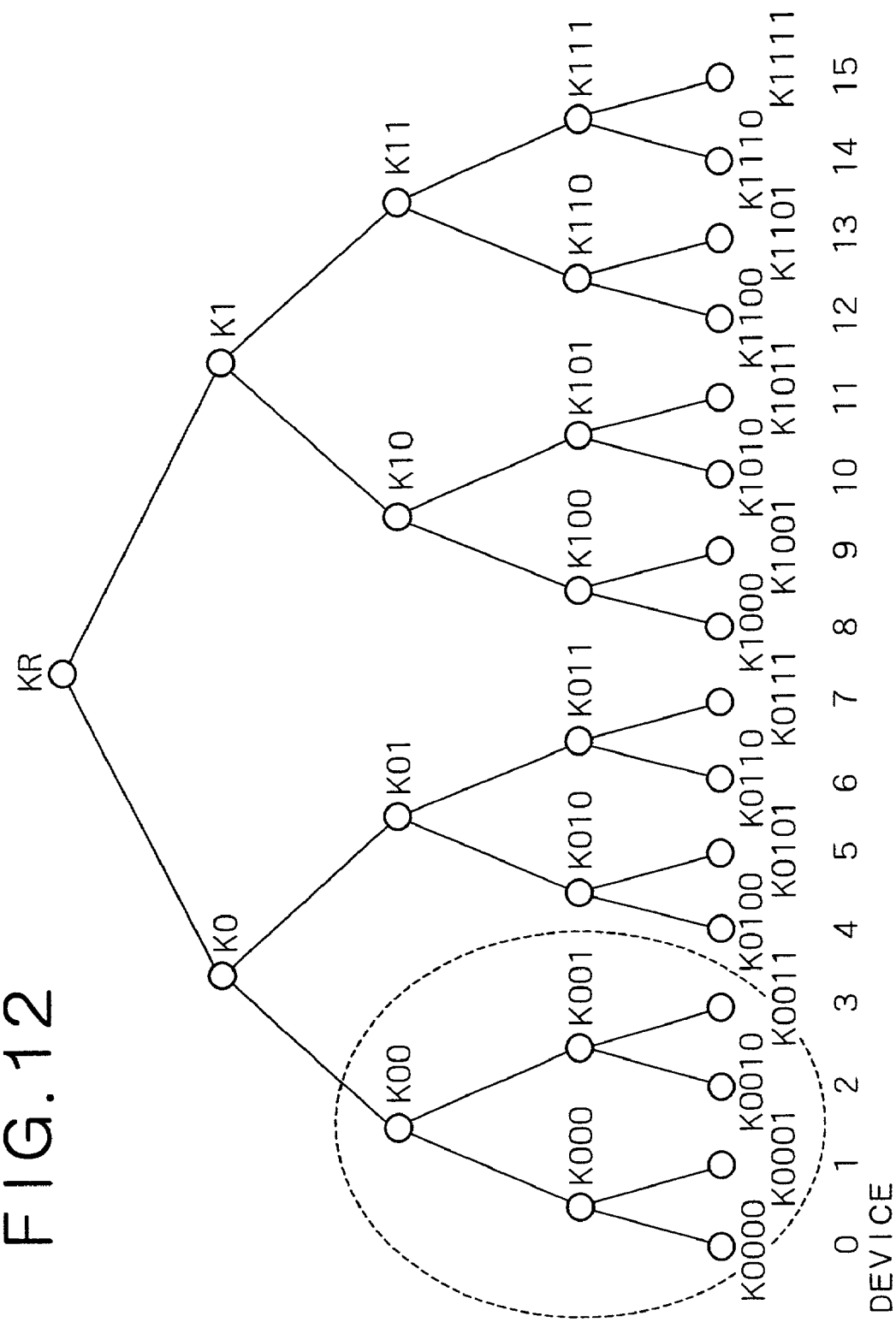
FIG. 12 is an explanatory diagram showing an organization of keys.

In the present invention, keys of devices and keys of licenses are managed on the basis of the principle of a broadcast-encryption system as shown in FIG. 12. The keys are organized into a hierarchical tree structure. Leaves, which are at the bottom hierarchical layer, each correspond to keys of each device. In the typical structure shown in FIG. 12, 16 keys 0 to 15 corresponding to 16 devices or 16 licenses are generated.

Each key denoted by a circular mark is placed at a node of the tree structure. A root key KR is placed at a root node on the top of the tree structure. At the nodes on the second hierarchical layer, keys K0 and K1 are provided. At the nodes on the third hierarchical layer, keys K00 to K11 are placed. At the nodes on the fourth hierarchical layer, keys K000 to K111 are provided. The leaves at the nodes on the bottom hierarchical layer or device nodes are keys K0000 to K1111.

In the hierarchical tree structure, for example, keys K0010 and K0011 are each a subordinate of key K001. In the same way, keys K000 and K001 are each a subordinate of key K00. By the same token, on the higher hierarchical layers, keys K00 and K01 are each a subordinate of key K0. Likewise, keys K0 and K1 are each a subordinate of the root key KR.

Keys required for using content comprise a leaf at a device node of the bottom hierarchical layer and keys at the nodes on higher hierarchical layers including the root key KR. The leaf and the keys on the higher hierarchical layers including the root key KR form a path. For example, keys required for using Content 3 are managed by each key of the path including keys K0011, K001, K00, K0 and KR, which form a path starting with the leaf K0011 and ending with the root key KR on the basis of the license corresponding to the leaf ID.

Figure 13:
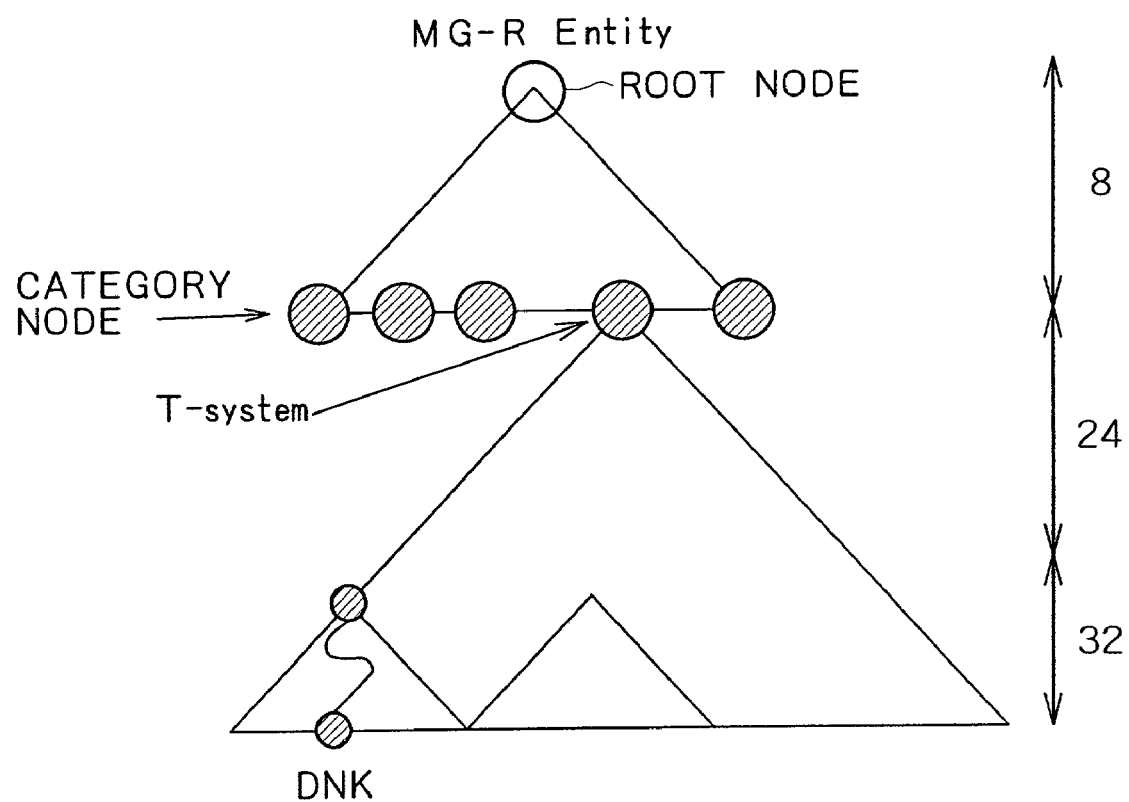
FIG. 13 is an explanatory diagram showing category nodes.

The content-exchanging system provided by the present invention typically adopts the principle shown in FIG. 12 to manage keys of devices and licenses placed at nodes laid out to form an 8+24+32-layer structure shown in FIG. 13. In the structure shown in FIG. 13, there are eight subordinate hierarchical layers below the root node. A key at each node of the eight hierarchical layers is associated with a category. Examples of categories are a category of equipment using a semiconductor memory such as a Memory Stick (trademark) and a category of equipment for receiving digital broadcasts.

One of the category nodes is the root node of a system called a T system provided by the present invention for managing licenses.

To put it in detail, subordinates of the root node of the T system are nodes on 24 hierarchical layers. A key at each of the subordinate nodes is associated with a license. Thus, it is possible to prescribe $2^{24}$ licenses or about 16 mega or about 1.6 million licenses. Further subordinates on the lower side are 32 hierarchical layers, which allow $2^{32}$ users (or clients 1) or about 4 giga or about 4 billion users (or clients 1) to be prescribed. Keys placed at nodes on the 32 hierarchical layers are each a DNK (Device Node Key).

Keys for a device or keys for a license are placed along a path passing through nodes at the 64 (=8+24+32) hierarchical layers. Thus, such a path is associated with a device or a license. More particularly, content keys used for encrypting content are encrypted by keys placed at nodes passed through by a path associated with a license for the content. A key at an upper hierarchical layer is encrypted by using its direct subordinate key on a hierarchical layer directly below and put in an EKB to be described later by referring to FIG. 15. A DNK on the bottom hierarchical layer is not put in the EKB, but included in service data to be granted to the client 1 of the user. The client 1 uses a DNK included in the license to decrypt a key, which is placed on a hierarchical layer directly above the DNK and included in the EKB shown in FIG. 15. The EKB is distributed along with the data of the content. The client 1 then uses the decrypted key to decrypt a key, which is placed on a hierarchical layer directly above the decrypted key and included in the EKB. This decryption process is carried out repeatedly until the client 1 is capable of obtaining all keys placed at nodes passed through by the path associated with the license.

FIG. 14 is a diagram showing the typical classification of categories each associated with a key of a hierarchical tree structure. As shown in FIG. 14, on the top of the hierarchical tree structure, a root key KR2301 is set. On an intermediate hierarchical layer under the root key KR2301, a node key 2302 is set. On the bottom hierarchical layer, a leaf key 2303 is set. Each device has a leaf key, node keys and the root key. The nodes keys owned by the device are provided along a path which is associated with the device and connects the leaf key to the root key.

A predetermined node on an Mth hierarchical layer from the root key is set as a category node 2304. In the example shown in FIG. 13, let M be 8. Each node on the Mth hierarchical layer is used as a node for setting a root key for a device pertaining to a specific category. That is to say, a device of a category is associated with a path starting at a node on the Mth hierarchical layer, passing through nodes on (M+1)th and lower hierarchical layers, and ending at a leaf on the bottom hierarchical layer.

Assume that, at a node 2305 on the Mth hierarchical layer of the hierarchical tree structure shown in FIG. 14, a category of a Memory Stick (trademark) is set. In this case, linked nodes and leaves below this node 2305 are used as nodes and leaves provided specially for the category including a variety of devices each using the Memory Stick. That is to say, nodes and a leaf under the node 2305 are defined as a set of nodes and a leaf which are related to a device defined in the category of the Memory Stick.

In addition, a node on a hierarchical layer several levels below the Mth hierarchical layer can be set as a subcategory node 2306. In the hierarchical tree structure shown in FIG. 14, a node on a hierarchical layer two levels below the Memory Stick category hierarchical layer, on which the node 2305 is provided, is set as a subcategory node, that is, a node for a subcategory included in the category of devices each using a Memory Stick. Furthermore, on a hierarchical layer under the node 2306 for a subcategory of playback-only equipment, a node 2307 for a telephone with a function to play back music is set. Such a telephone is included in the category of playback-only equipment. Moreover, on a hierarchical layer under the node 2307, a PHS node 2308 and a cellular-phone node 2309 are provided. A PHS and a cellular phone are included in the category of a telephone with a function to play back music.

In addition, categories and subcategories are provided not only for devices but also for nodes controlled by a manufacturer, content provider and a charging institution independently or any arbitrary units, which can be processing units, control units, presentation service units or the like. These units are each referred to as an entity, which is a generic technical term. Assume that a category node is set as a root node provided specially for a game machine XYZ sold by a game machine manufacturer. In this case, the game machine manufacturer is capable of selling the game machine XYZ by storing node keys and a leaf key, which are provided on hierarchical layers below the root node, in the game machine XYZ. Then, encrypted contents or a variety of keys are distributed, or the keys are updated by generating an EKB. The EKB consists of node keys and a leaf key which are provided on hierarchical layers below the root node. In this way, it is possible to distribute data usable only by a device under the root node.

As described above, a node is used as a root node and nodes on hierarchical layers below the root node are each set as a category-related node or a subcategory-related node. In this way, an institution such as a manufacturer or content provider, which manages a root node on a category hierarchical layer or a subcategory hierarchical layer, is capable of generating an EKB (Enabling Key Block) with a key at the root node used as the root key thereof by itself and distributing the EKB to devices pertaining to hierarchical layers below the root node. Thus, it is possible to update the keys of the EKB without no effects at all on devices pertaining to a category node not serving as a subordinate to the root node.

Assume that, in the tree structure shown in FIG. 12, four devices 0, 1, 2 and 3 pertaining to a group share common keys K00, K0 and KR as node keys. By using this nodekey-sharing configuration, a common content key can be provided only to devices 0, 1, 2 and 3. For example, node key K00 itself, which is shared by devices 0, 1, 2 and 3, is set as the common content key. In this way, it is possible to set content key common to devices 0, 1, 2 and 3 without transmitting a new key. As an alternative, a new content key Kcon is encrypted by using the node key K00 to result in an encrypted value Enc(K00, Kcon), which is then distributed to devices 0, 1, 2 and 3 by way of a network or by storing the value Enc(K00, Kcon) in a storage medium distributed to devices 0, 1, 2 and 3. In this way, only devices 0, 1, 2 and 3 are capable of decrypting the value Enc(K00, Kcon) by using the common node key K00 shared by devices 0, 1, 2 and 3 to produce the content key Kcon. It should be noted that notation Enc(Ka, Kb) denotes data obtained as a result of encryption of a key Kb by using a key Ka.

In addition, assume that it is discovered at a point time t that keys K0011, K001, K00, K0 and KR owned by device 3 have been analyzed and identified by a hacker. In this case, in order to protect data exchanged thereafter in a system (or a group of devices 0, 1, 2 and 3), device 3 needs to be detached from the system. In addition, node keys K001, K00, K0 and KR need to be updated to respectively new keys K(t)001, K(t)00, K(t)0 and K(t)R to be transmitted to devices 0, 1 and 2. It should be noted that notation K(t)aaa is an updated key of generation of time point t and is obtained by updating a key Kaaa.

Processing to distribute an updated key is explained below. For example, keys are updated as follows. In the case of the processing to update keys for devices 0, 1 and 2 as described above, a table is supplied to devices 0, 1 and 2 by way of a network or by storing the table in a storage unit and supplying the storage unit to devices 0, 1 and 2. The table is block data called an EKB (Enabling Key Block) shown in FIG. 15A. It should be noted that the EKB (Enabling Key Block) comprises encrypted keys for distributing newly updated keys to devices associated with leaves at the nodes on the bottom hierarchical layer of a tree structure like the one shown in FIG. 12. The EKB (Enabling Key Block) is also called a KRB (Key Renewal Block).

The EKB (Enabling Key Block) shown in FIG. 15A is structured as block data that can be updated only by a device requiring node keys thereof to be updated. The typical EKB shown in FIG. 15A is block data created with the objective of distributing updated node keys of generation of time point t to devices 0, 1 and 2 of the tree structure shown in FIG. 12. As is obvious from FIG. 12, devices 0 and 1 each require K(t)00, K(t)0 and K(t)R as updated node keys. On the other hand, device 2 requires K(t)001, K(t)00, K(t)0 and K(t)R as updated node keys.

As shown in FIG. 15A, the EKB includes a plurality of encrypted keys. An encrypted key of the fifth row of the table from the top shown in FIG. 15A is Enc(K0010, K(t)001), which is an updated node key K(t)001 encrypted by using a leaf key K0010 owned by the device 2. The device 2 is thus capable of obtaining the updated node key K(t)001 by decryption of the encrypted key Enc(K0010, K(t)001) by using the leaf key K0010 owned by device 2 itself. In addition, by using the updated node key K(t)001 obtained as a result of the decryption, it is possible to decrypt an encrypted key Enc(K(t)001, K(t)00) of the fourth row of the table shown in FIG. 15A to result in an updated node key K(t)00.

Thereafter, in such a sequential decryption process, an encrypted key Enc(K(t)00, K(t)0) of the second row of the table shown in FIG. 15A is decrypted to result in the updated node key K(t)0, which is then used for decrypting an encrypted key Enc(K(t)0, K(t)R) of the first row to result in the updated node key K(t)R.

On the other hand, a node key K000 is not a key to be updated. Updated node keys required by devices 0 and 1 associated with nodes 0 and 1 respectively are K(t)00, K(t)0 and K(t)R. Devices 0 and 1 associated with nodes 0 and 1 respectively each use device keys K0000 and K0001 to decrypt an encrypted key Enc(K000, K(t)00) of the third row of the table shown in FIG. 15A to obtain an updated node key K(t)00. Thereafter, in the sequential decryption process, an encrypted key Enc(K(t)00, K(t)0) of the second row of the table shown in FIG. 15A is decrypted to result in the updated node key K(t)0, which is then used for decrypting an encrypted key Enc(K(t)0, K(t)R) of the first row to result in the updated node key K(t)R. In this way, devices 0, 1 and 2 are each capable of obtaining the updated node key K(t)R.

It should be noted that indices shown in FIG. 15A are absolute addresses of node keys and leaf keys. The node keys and leaf keys are each used as a decryption key for decrypting an encrypted key on the right side of the figure.

When it is not necessary to update a node key K(t)0 on an upper hierarchical layer of the tree structure shown in FIG. 12 and the root key K(t)R, while it is necessary to carry out processing to update only a node key K00, an updated node key K(t)00 can be distributed to devices 0, 1 and 2 by using an EKB (Enabling Key Block) shown in FIG. 15B.

The EKB shown in FIG. 15B can be used for distributing typically new content keys common to devices pertaining to a specific group. Assume that devices 0, 1, 2 and 3 pertaining to a group enclosed by a dotted line in FIG. 12 each use a recording medium and require a new common content key K(t)con. In this case, data Enc(K(t)00, K(t)con) is distributed to devices 0, 1, 2 and 3 along with the EKB shown in FIG. 15B. The data Enc(K(t)00, K(t)con) is a result of encryption of the newly updated content key K(t)con common to devices 0, 1, 2 and 3. The newly updated content key K(t)con is encrypted by using K(t)00 which is a result of encryption of a node key K00 common to devices 0, 1, 2 and 3. By this, the encrypted data Enc(K(t)00, K(t)con) can be distributed so that equipment of other groups such as device 4 cannot decrypt the encrypted data.

That is to say, devices 0, 1 and 2 are each capable of decrypting encrypted data by using the key K(t)00 obtained as a result of EKB processing in order to obtain the content key K(t)con of generation of time point t.

FIG. 16 is a diagram showing the typical processing carried out by device 0, which has received the data Enc(K(t)00, K(t)con) and the EKB shown in FIG. 15B through a recording medium, to obtain the content key K(t)con of generation of time point t. As described earlier, the data Enc(K(t)00, K(t)con) is a result of encryption of the newly updated content key K(t)con common to devices 0, 1, 2 and 3. That is to say, in this typical processing, encrypted message data distributed using the EKB is the content key K(t)con.

As shown in FIG. 16, in the same EKB processing as that described above, device 0 generates a node key K(t)00 by using an EKB of generation of time point t and a node key K000 stored in advance in the recording medium by itself. The EKB has been stored in the recording medium. Then, device 0 uses the updated node key K(t)00 obtained as a result of decryption to decrypt the updated content key K(t)con. Device 0 then encrypts it by using a leaf key K0000 owned only by device 0 for later use.

Figure 17:
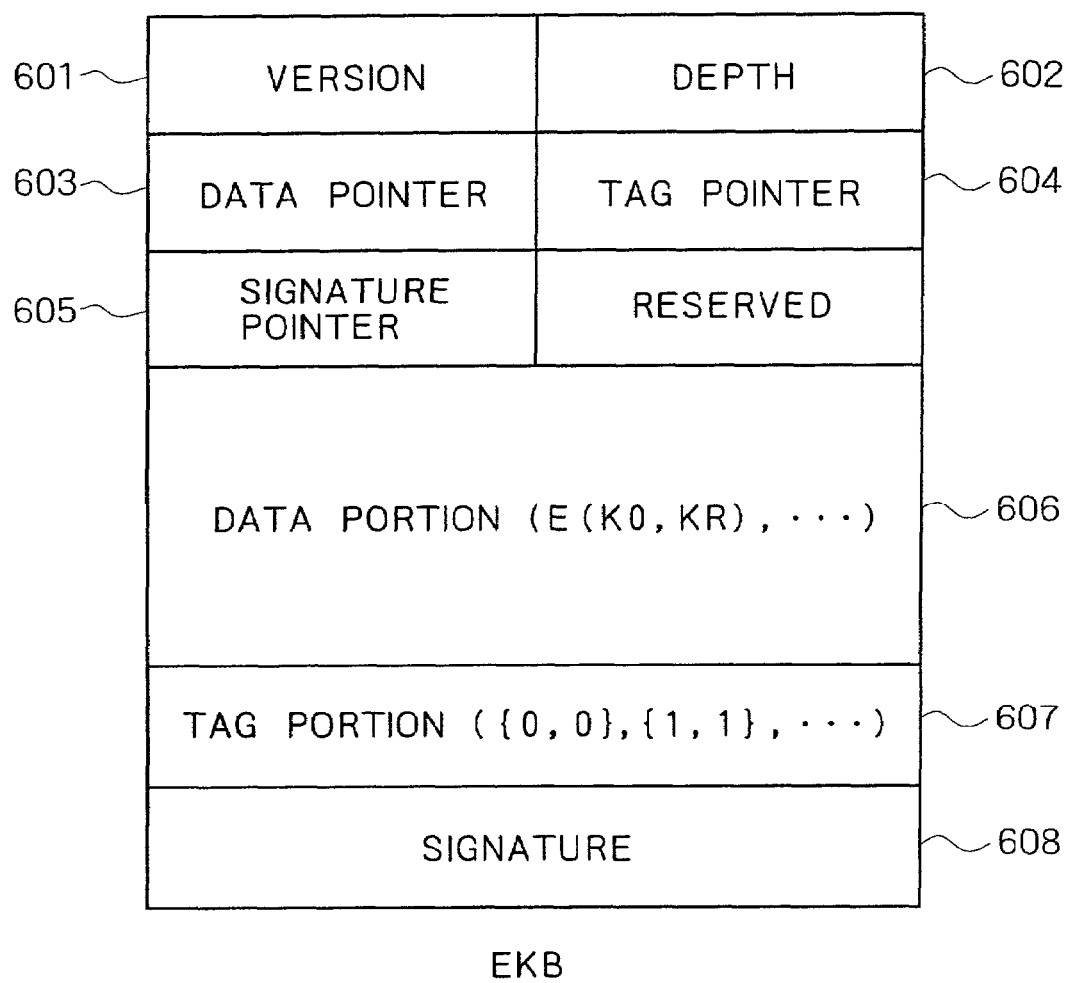
FIG. 17 is an explanatory diagram showing a typical format of the EKB (Enabling Key Block)

FIG. 17 is a diagram showing a typical format of an EKB (Enabling Key Block). A version 601 is an identifier indicating a version of the EKB (Enabling Key Block). It should be noted that the version 601 has the functions of determining the most recent EKB and of indicating the relation with contents. A depth 602 is the number of hierarchical layers in a hierarchical-tree structure for a device serving as a destination of the EKB (Enabling Key Block). A data pointer 603 is a pointer pointing to a position in a data portion 606 of the EKB (Enabling Key Block). A tag pointer 604 is a pointer pointing to the position of a tag 607, and a signature pointer 605 is a pointer pointing to the position of a signature 608.

The data portion 606 is typically encrypted updated node keys, that is, encrypted keys obtained as a result of encryption of updated node keys as shown in FIG. 16.

The tag 607 is a tag showing the positional relationship between encrypted node keys and encrypted leaf keys. The encrypted node keys and the encrypted leaf keys are included in the data portion 606. A rule of providing a tag is explained by referring to FIG. 18.

Figure 18:
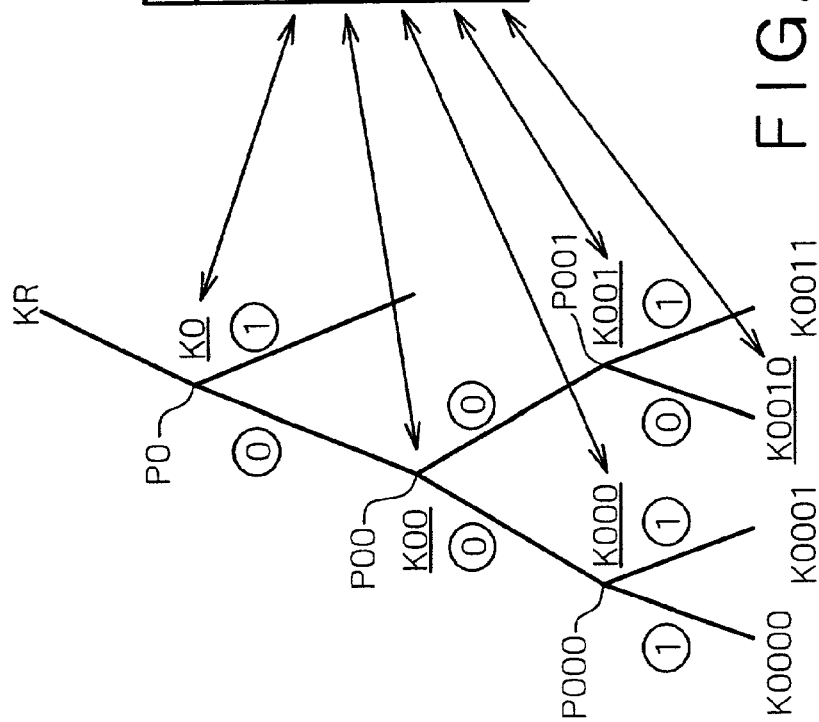
FIGS. 18A to 18C are explanatory diagrams showing the configuration of tags in an EKB (Enabling Key Block)

FIG. 18 is a diagram showing an example of transmitting an EKB (Enabling Key Block) explained earlier by referring to FIG. 15A. Data in this case is shown in FIG. 18B. The address of a top node included in an encrypted key at that time is referred to as a top-node address. In this example, since an updated root key K(t)R is included, the top-node address is KR. In this case, for example, data Enc(K(t)0, K(t)R) of the first row corresponds to a position P0 in a hierarchical tree structure shown in FIG. 18A. Data Enc(K(t)00, K(t)0) of the second row corresponds to a position P00 on the lower left side of the position P0 in the hierarchical tree structure. If there is data on a hierarchical layer below a predetermined position of the hierarchical tree structure, the tag is set at 0. If, on the other hand, there is no data on a hierarchical layer below a predetermined position of the hierarchical tree structure, the tag is set at 1. Tags are set in the following format: {left (L) tag, Right (R) tag} explained below. At the position P00 on the lower left side of the position P0 corresponding to the data Enc(K(t)0, K(t)R) of the first row shown in FIG. 18B, there is data. Thus, the L tag is set at 0. At a position on the lower right side of the position P0, on the other hand, there is no data. In this case, the R tag is set at 1. In this way, for each data, tags are set. FIG. 18C is a diagram showing a configuration including a typical array of pieces of data and an array of tags.

A tag is set to indicate which position in the tree structure the corresponding data Enc(Kxxx, Kyyy) is located at. The key data Enc(Kxxx, Kyyy) and so on stored in the data portion 606 is no more than an array of keys, which have been encrypted in a simple way. With the tag described above, however, it is possible to identify the position of an encrypted key, which is stored as data, in the tree structure. Without the tag described above, it is also possible to construct data by using node indices associated with pieces of encrypted data as is the case with the configuration explained earlier by referring to FIG. 15. An example of the data construction is given as follows:

0: Enc(K(t)0, K(t)R)

00: Enc(K(t)00, K(t)0)

000: Enc(K(t)000, K(t)00)

A configuration using such indices, however, results in redundant data and the amount of data thus increases. As a result, such a configuration is not desirable for distribution through a network or for other purposes. By using tags as index data showing the positions of keys, however, the positions of keys can be recognized by using only a small amount of data.

The EKB format is further explained by referring back to FIG. 17. The signature 608 is an electronic signature of the institution issuing the EKB (Enabling Key Block) Examples of such an institution are a key management center (the license server 4), content provider (the content server 3) and a charging institution (the charging server 5). A device receiving the EKB confirms that the EKB is a valid EKB issued by an authorized EKB issuer by signature authentication.

It is possible to summarize processing to utilize content supplied by the content server 3 on the basis of a license issued by the license server 4 as described above into what is shown in FIG. 19.

As shown in the figure, when the content server 3 provides content to the client 1, the license server 4 issues a license to the client 1. The content is Enc(Kc, Content), which is a notation indicating that the content has been encrypted by content key Kc. The content key Kc is encrypted by using a root key KR to produce Enc(KR, Kc). The root key KR is obtained from the EKB and corresponds to the key $K_{EKBC}$ shown in FIG. 5. The content key Enc(KR, Kc) and the EKB are then added to the encrypted content. The content key Enc(KR, Kc), the EKB and the encrypted content are finally supplied to the client 1.

Figure 19:
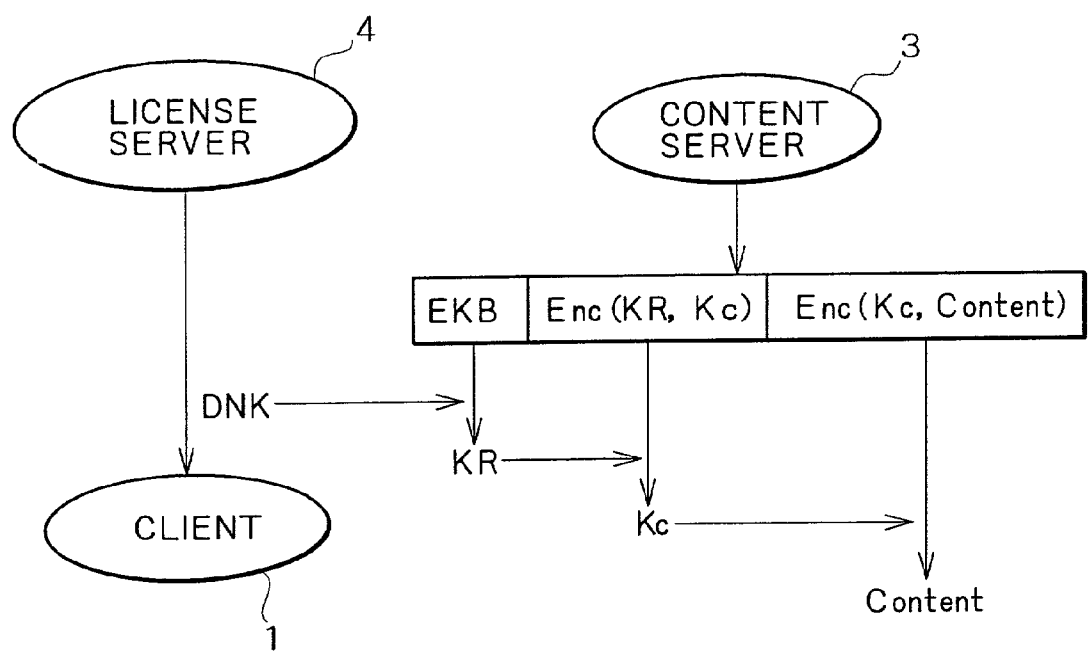
FIG. 19 is an explanatory diagram showing processing to decrypt content by using a DNK (Device Node Key)
Figure 20:
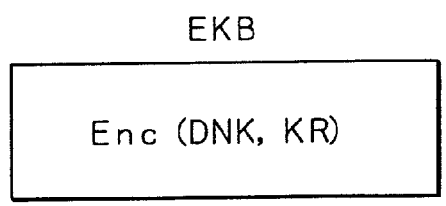
FIG. 20 is a diagram showing a typical EKB (Enabling Key Block)

As shown in FIG. 20, the EKB in the example shown in FIG. 19 typically includes Enc (DNK, KR), which is a notation indicating that the root key KR has been encrypted by a DNK. Thus, by using a DNK included in service data, the client 1 is capable of obtaining the root key KR from the EKB. Then, it is possible to obtain the content key KC by decryption of Enc(KR, Kc) using the root key KR. Finally, it is possible to obtain the content by decryption of Enc(Kc, Content) using the content key Kc.

By assigning a DNK to each client 1 in this way, it is also possible to individually revoke a client 1 in accordance with the principles shown in FIGS. 12 and 15.

In addition, by including an additional license leaf ID as a part of data in the distribution, service data is associated with a license so that it is possible to avoid an illegal copy operation in the client 1.

Furthermore, by distributing a secret key and a certificate for each client as service data, it is possible to create content for which the secret key and the certificate for use by the client 1 are used to prevent the end user from carrying out an illegal operation to copy the content. The use of the secret key and the certificate will be described later by referring to the flowchart shown in FIG. 28.

As described earlier by referring to FIG. 13, in accordance with the present invention, a T system for managing licenses at a category node is associated with a category of devices each used for using contents. Thus, a plurality of DNKs can be owned by the same device. As a result, contents pertaining to different categories can be managed using one device.

Figure 21:
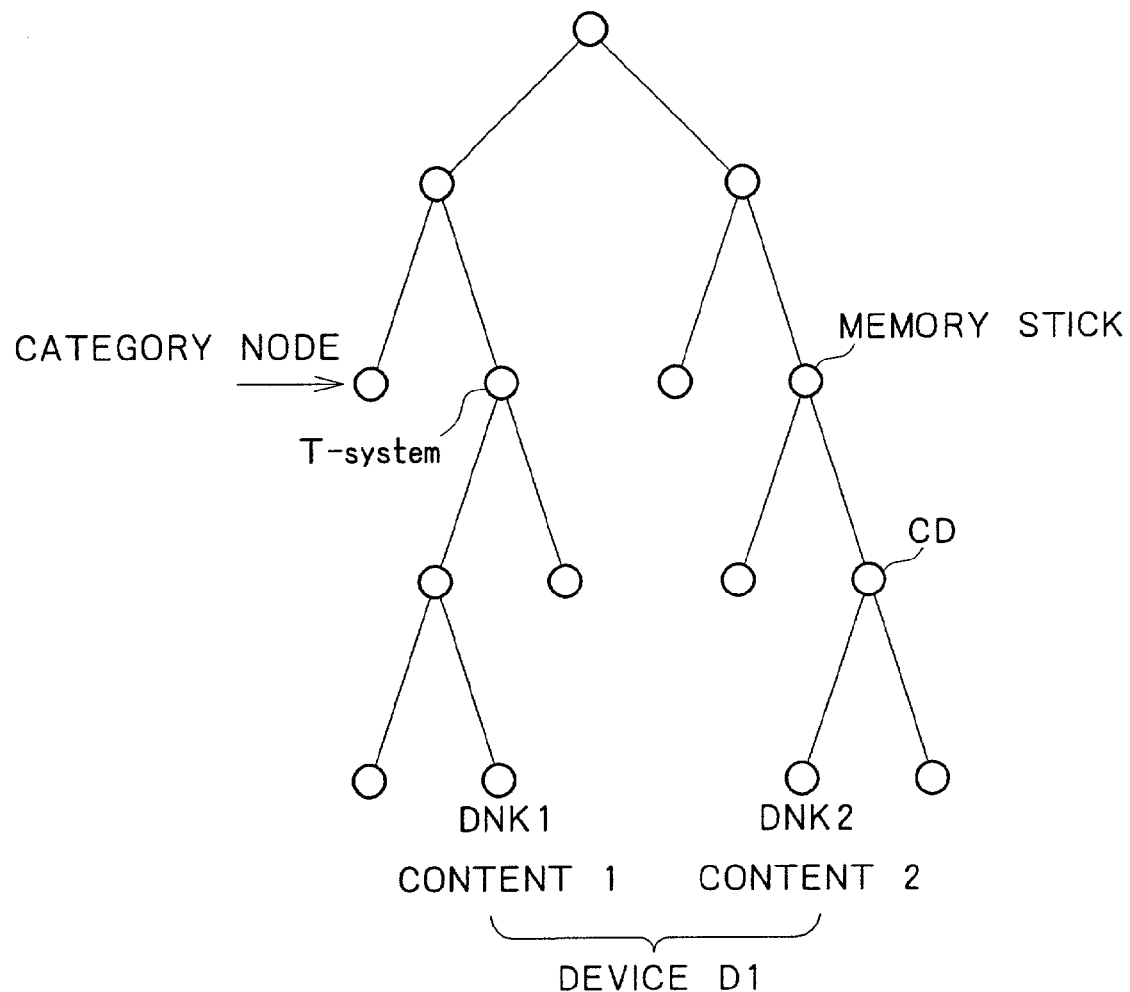
FIG. 21 is an explanatory diagram showing assignment of a plurality of contents to a device.

FIG. 21 is an explanatory diagram showing the assignment of plural contents to one device. To be more specific, a license for using content 1, to which DNK 1 is assigned, is recorded in a device D1 on the basis of the T system. By the same token, content 2, to which DNK 2 is assigned, can be recorded in the device D1 by transferring content 2 from a CD to a Memory Stick. In this way, the device D1 is capable of simultaneously handling two contents, namely, contents 1 and 2, which are distributed by different systems, namely, the T system and a device management system. This feature cannot be implemented in a case where only one DNK is assigned to a device. An example of such a case is a case in which an already assigned DNK is deleted when a new DNK is assigned.

Figure 22:
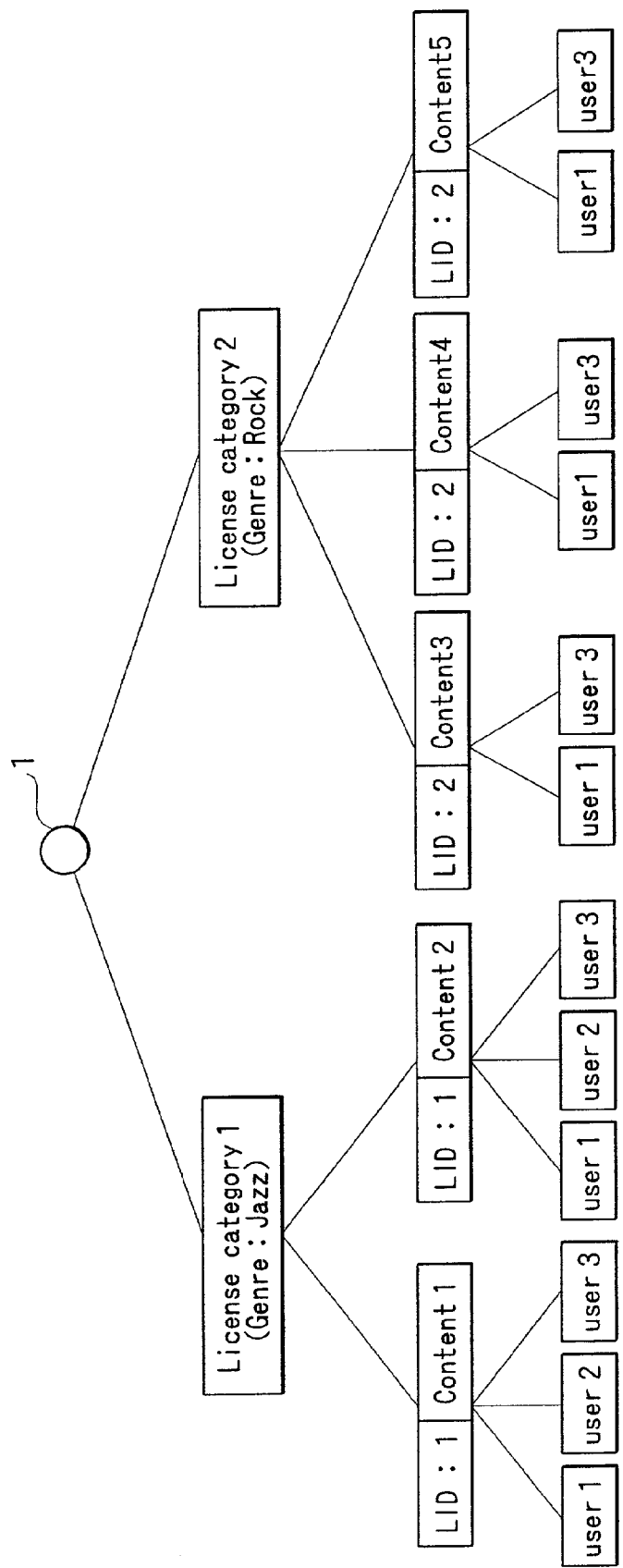
FIG. 22 is an explanatory diagram showing license categories.

In addition, for example, license categories 1 and 2 shown in FIG. 22 are assigned to each triangle of the 32 lower-side hierarchical layers shown in FIG. 13. By such assignment, a category is classified into subcategories for managing smaller groups such as genres of the content, levels of the content, retail stores of the content and distribution services of the content.

In the typical assignment shown in FIG. 22, for instance, license categories 1 and 2 pertain to a jazz genre and a rock genre, respectively. License category 1 is associated with contents 1 and 2, each of which has a license ID of 1 and is distributed to users 1, 2 and 3. License category 2 includes contents 3, 4 and 5, each of which has a license ID of 2 and is distributed to users 1 and 3.

As described above, in accordance with the present invention, independent key management can be executed for each category.

In addition, instead of having a DNK embedded in equipment and/or media, a DNK can also be downloaded to each equipment and/or each media in catalog processing carried out by the license server 4 so as to implement a system allowing a user to purchase the key.

It is desirable to provide content that can be used in all applications by adopting any technique of using the content after creation of the content without regard to what technique is adopted. For example, it is desirable to provide content that can be used in domains with different content distribution services or different usage conditions. In order to provide such content, according to the present invention, the license server 4 functioning as an authenticating station distributes secret keys and certificates of disclosed keys for the secret keys to users (clients 1) as described above. Then, the users each use a secret key to create a signature to be put on the content in order to assure the integrity of the content and, thus, to prevent the content from being falsified.

Figure 23:
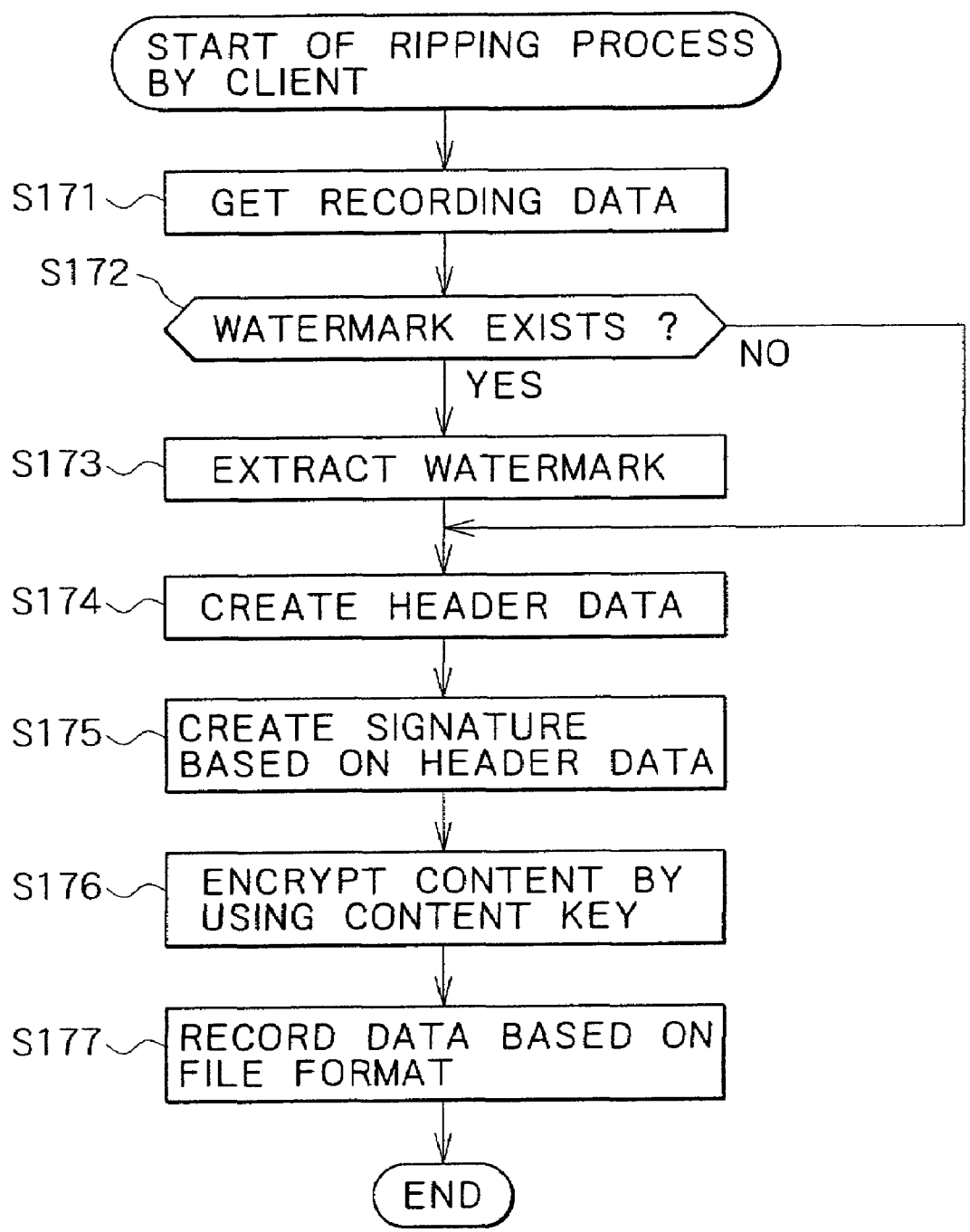
FIG. 23 is a flowchart used for explaining a ripping process carried out by a client.

Typical processing of the case described above is explained by referring to the flowchart shown in FIG. 23. To be more specific, the processing is a ripping process carried out by the user to record data played back from a CD in the storage unit 28.

As shown in the figure, the flowchart begins with a step S171 at which the CPU 21 employed in the client 1 receives input recorded data played back from a CD from the communication unit 29. Then, at the next step S172, the CPU 21 forms a judgment as to whether the recorded data input at the step S171 includes a watermark embedded in the data of the content. The watermark comprises 3-bit CCI (Copy Control Information) and a 1-bit trigger. If a watermark is detected, the flow of the processing goes on to a step S173 at which the CPU 21 carries out a process to extract the watermark. If, on the other hand, no watermark is detected, the watermark-extracting process is skipped.

Then, at the next step S174, the CPU 21 creates data of a header to be recorded for the content. The data of the header comprises content ID, a license ID, a URL representing an access target for acquiring a license and a watermark.

Subsequently, at the next step S175, by using the secret key of the CPU 21 itself, the CPU 21 creates a digital signature based on the data of the header created in the processing carried out at the step S174. The secret key has been obtained from the license server 4 at the step S67 of the flowchart shown in FIG. 7.

Then, at the next step S176, the CPU 21 controls the encryption and decryption unit 24 to encrypt the content by using content key. The content key has been acquired at the same time as the content (See FIG. 5 or 9).

Subsequently, at the next step S177, CPU 21 records the data onto a magneto-optical disk 43 in a file format. Typically, the magneto-optical disk 43 is a mini disc.

It should be noted that, in the case of a mini disk used as the recording medium, the CPU 21 supplies the content to the codec unit 25 at the step S176. The codec unit 25 encodes the content, typically in accordance with the ATRAC3 system. The encoded content is further encrypted by the encryption and decryption unit 24.

Figure 24:
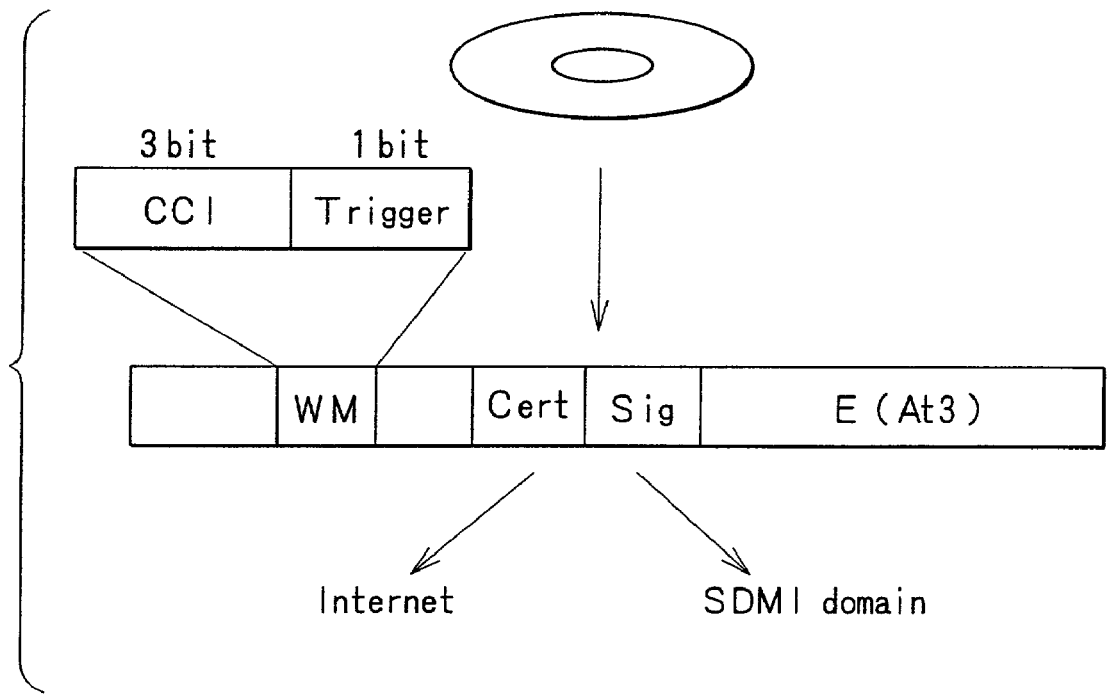
FIG. 24 is an explanatory diagram showing the configuration of a watermark.

FIG. 24 is a diagram showing a model of content recorded on the recording medium. A watermark WM extracted from the encrypted content (E(At3)) is recorded in a header outside the content.

Figure 25:
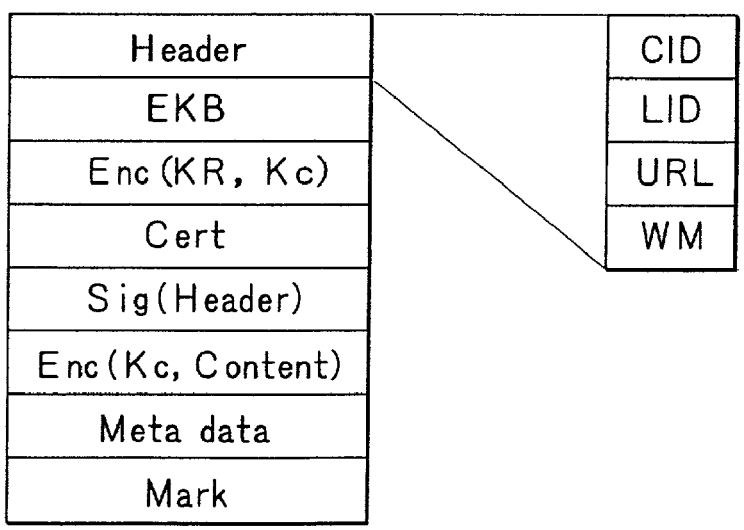
FIG. 25 is an explanatory diagram showing a typical format of content.

FIG. 25 is a diagram showing a more detailed configuration of the file format in which the content is recorded onto the recording medium. As is obvious from the typical configuration, a header including content ID (CID), a license ID (LID), a URL and a watermark (WM) is recorded. In addition, an EKB, data Enc(KR, Kc), a certificate (Cert), a digital header (Sig(Header)), data Enc(Kc, Content), meta data and a mark are recorded. The data Enc(Kr, Kc) is a result of encryption of content key Kc by using a root key KR, whereas the data Enc(Kc, Content) is a result of encryption of the content by using the content key Kc. The digital header Sig(Header) has been generated on the basis of the header.

The watermark is embedded in the content. As shown in FIGS. 24 and 25, in addition to within the content, the watermark is also placed in the header so that information embedded in the content as the watermark can be detected fast and with ease. Thus, it is possible to quickly form a judgment as to whether the content can be copied.

It should noted that the meta data typically represents a jacket, pictures, a libretto and other information. The mark will be described later by referring to FIG. 31.

Figure 26:
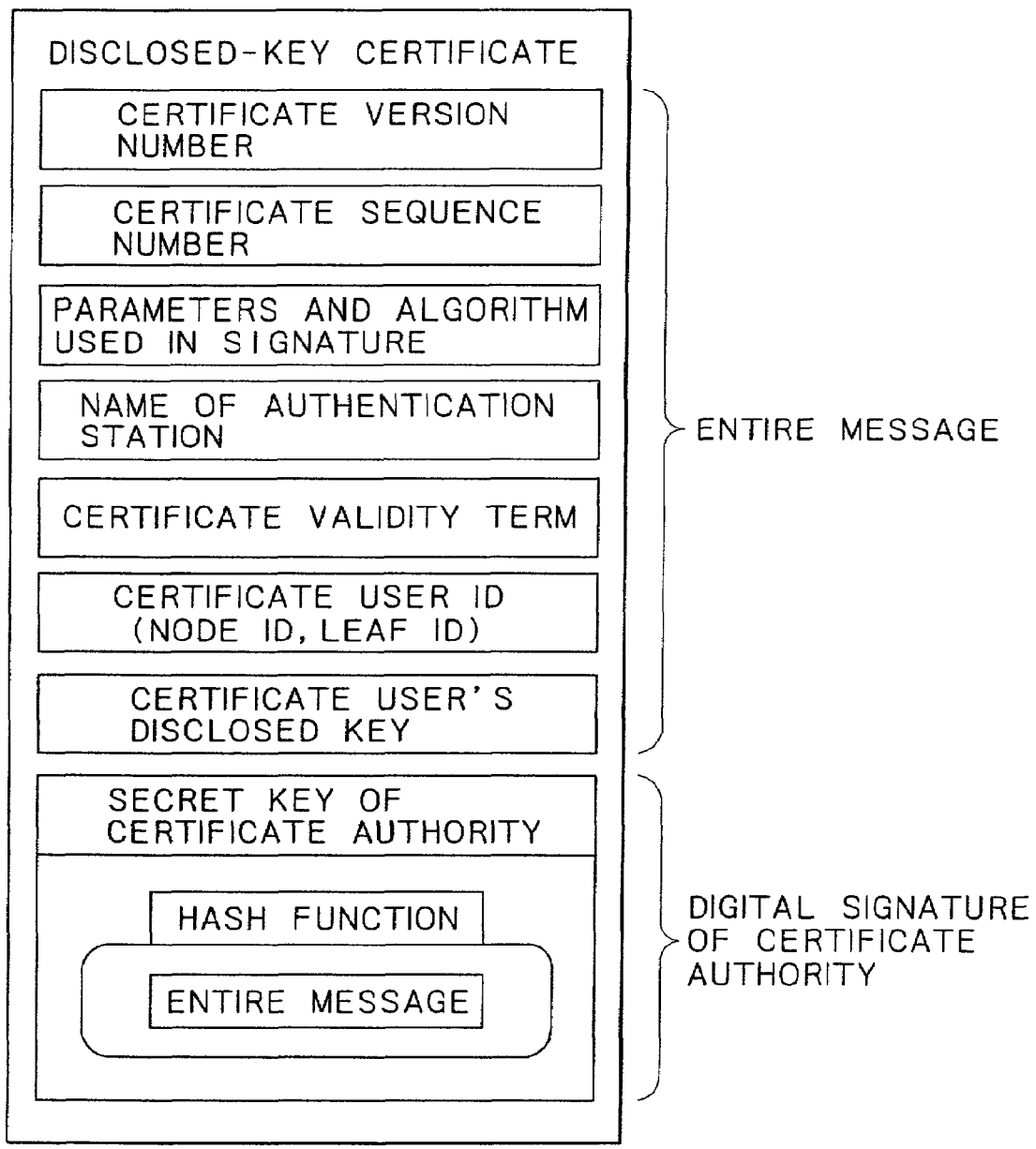
FIG. 26 is a diagram showing a typical certificate of a disclosed key.

FIG. 26 is a diagram showing a typical disclosed-key certificate used as the certificate of a disclosed key. Normally, a disclosed-key certificate is a certificate issued by a CA (Certificate Authority) in a disclosed-key encryption system. A disclosed-key certificate is issued by the Certificate Authority by adding information such as a term of validity to a disclosed key and a user ID supplied to the Certificate Authority, as well as by putting a digital signature of the Certificate Authority thereon. In accordance with the present invention, the license server 4 or the content server 3 issues a certificate and a secret key and, thus, also a disclosed key. Therefore, by presenting information such as a user ID and a password to the license server 4 to be cataloged therein, the user is able to obtain a disclosed-key certificate.

The disclosed-key certificate shown in FIG. 26 includes a message. The message includes a version number of the certificate, a serial number issued for the user of the certificate by the license server 4, an algorithm and parameters which are used for a digital signature, the name of the Certificate Authority, the term of validity of the certificate, an ID assigned to the user of the certificate and a disclosed key of the certificate user. In this case, the Certificate Authority is the license server 4. The ID assigned to the user is a node ID or a leaf ID. A digital signature created by the license server 4 serving as the Certificate Authority is added to the message. The digital signature is data created by using a secret key of the license server 4 on the basis of a hash value generated by application of a hash function to the message.

In the case of the typical key organization shown in FIG. 12, for example, the node ID or the leaf ID is '0000' for device 0, '0001' for device 1 or '1111' for device 15. On the basis of such an ID, it is thus possible to determine at which position in the tree structure, that is, at which leaf or which node of the tree structure, a device (entity) identified by the ID is located.

By distributing a license required to use content separately from the content in this way, the content can be distributed with a higher degree of freedom. Content obtained by adopting an arbitrary method or obtained through an arbitrary route can thus be handled unitarily.

In addition, by constructing a file format as shown in FIG. 25, it is needless to say that the copyright of the content with such a format can be managed when the content is distributed through the Internet or even when the content is presented to SDMI (Secure Digital Music Initiative) equipment.

Figure 27:
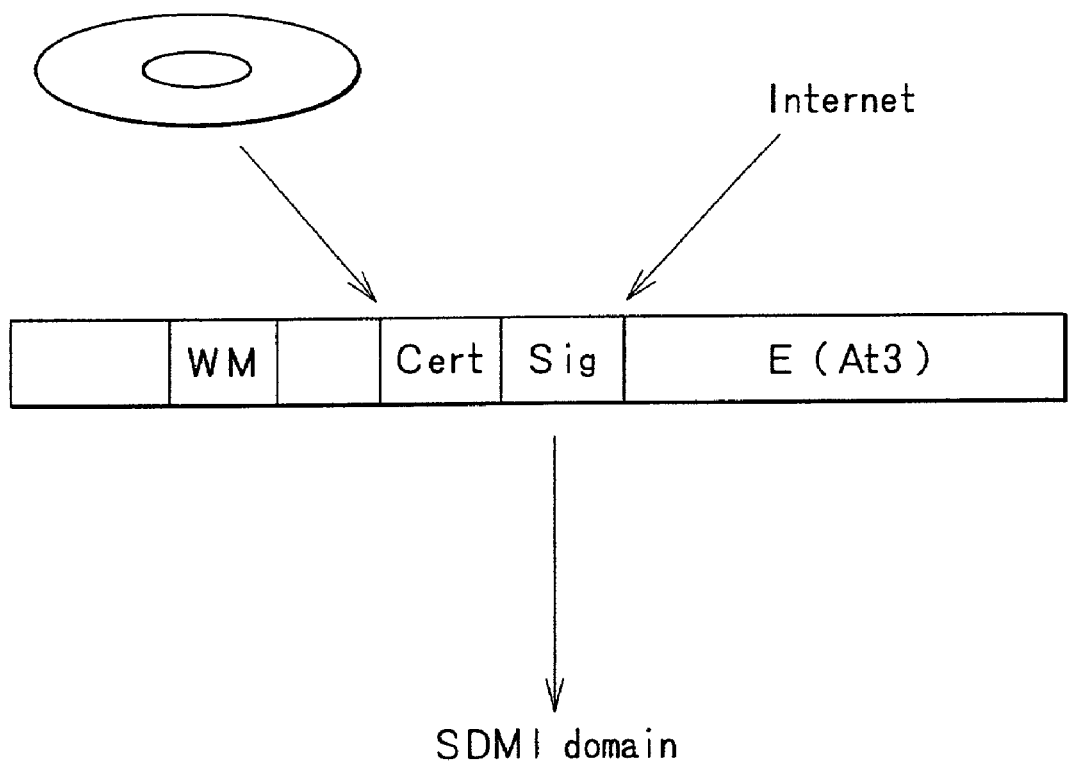
FIG. 27 is an explanatory diagram showing distribution of content.

Furthermore, even if content is presented by recording the content in a recording medium or presented through the Internet 2 as shown in FIG. 27, for example, by carrying out the same processing, it is possible to check out the content typically for a predetermined PD (Portable Device) used as SDMI (Secure Digital Music Initiative) equipment.

Figure 28:
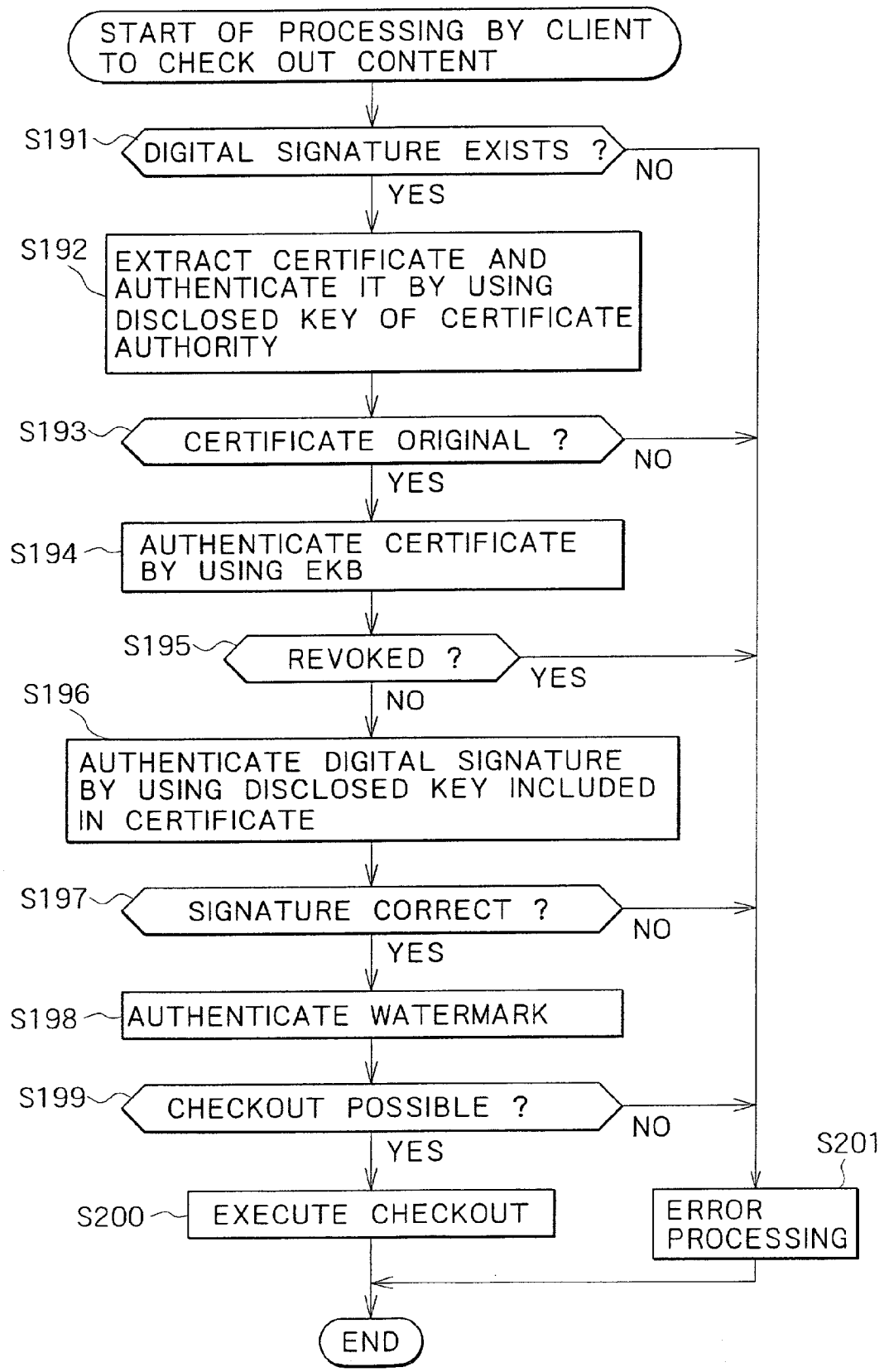
FIG. 28 is a flowchart used for explaining processing carried out by a client to check out content.

By referring to the flowchart shown in FIG. 28, the following description explains the processing to check out content for a client such as a PD other than the client 1.

As shown in the figure, the flowchart begins with a step S191 at which the CPU 21 forms a judgment as to whether a digital signature has been put on the content. If the outcome of the judgment indicates that a digital signature has been put on the content, the flow of the processing goes on to a step S192 at which the CPU 21 extracts a disclosed-key certificate and carries out processing to authenticate the certificate by using the disclosed key of the license server 4 serving as the Certificate Authority. More particularly, the client 1 acquires a disclosed key for a secret key of the license server 4 from the license server 4, and uses the disclosed key to decrypt the digital signature put on the disclosed-key certificate. As described earlier by referring to FIG. 26, the digital signature is generated on the basis of the secret key of the license server 4 serving as the Certificate Authority, and can be decrypted by using the disclosed key of the license server 4. Furthermore, the CPU 21 applies a hash function to the whole message of the certificate to generate a hash value. Then, the CPU 21 compares the generated hash value with a hash value obtained as a result of decryption of the digital signature. If the generated hash value matches the hash value obtained as a result of decryption of the digital signature, the certificate is determined to be not a false certificate. If, on the other hand, the generated hash value does not match the hash value obtained as a result of decryption of the digital signature, this certificate is determined to be a false one.

Thus, at the next step S193, the CPU 21 forms a judgment as to whether the certificate has been falsified. If the outcome of the judgment indicates that the certificate has not been falsified, the flow of the processing goes on to a step S194 at which the CPU 21 carries out processing to authenticate the certificate by using an EKB. The certificate is authenticated by examining whether the EKB can be traced on the basis of a leaf ID included in the certificate. For more information on the leaf ID, refer to FIG. 26. The authentication is explained by referring to FIGS. 29 and 30 as follows.

Figure 29:
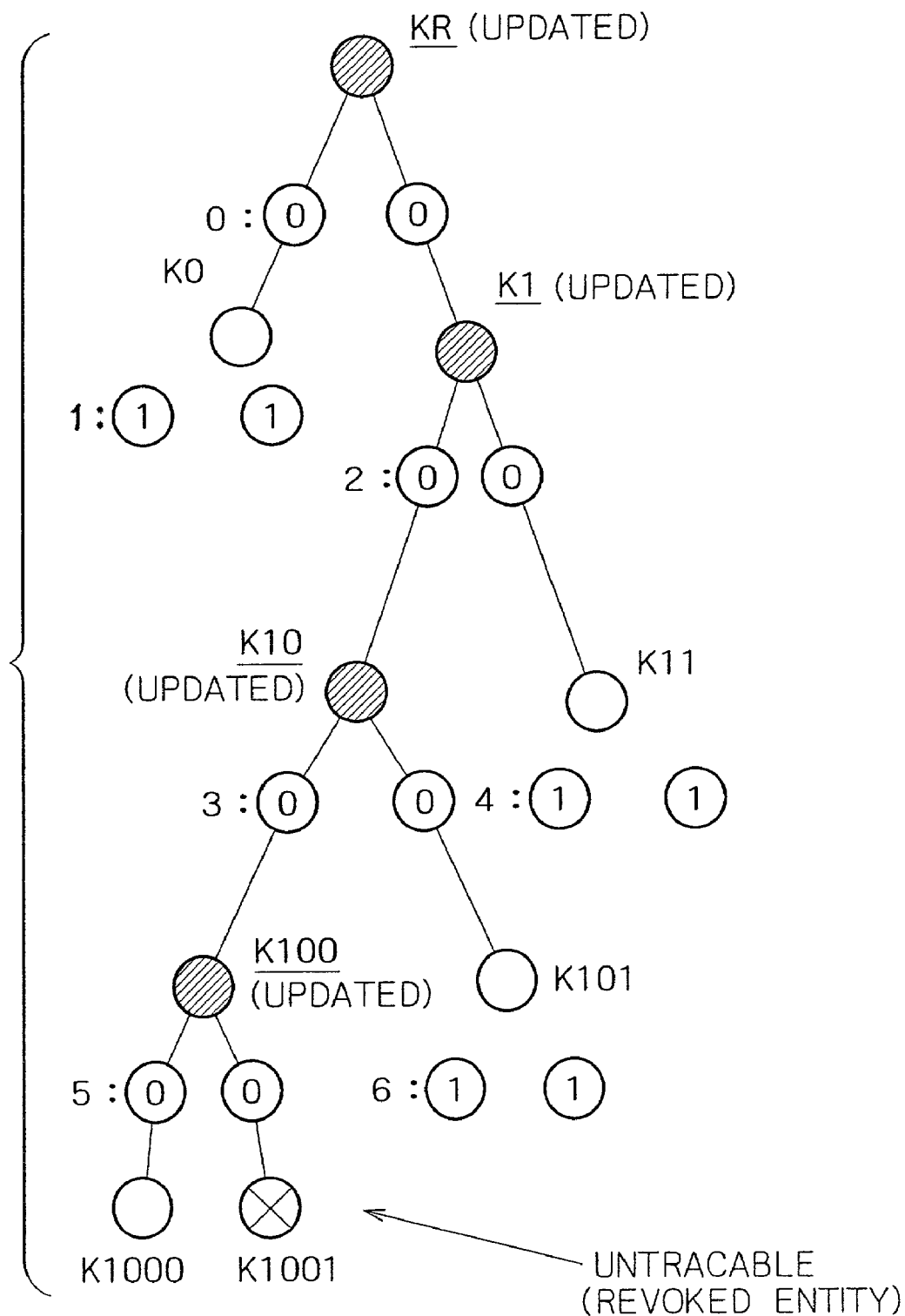
FIG. 29 is an explanatory diagram showing typical tracing of an EKB (Enabling Key Block) by using tags.
Figure 30:
FIG. 30 is a diagram showing a typical configuration of the EKB (Enabling Key Block)

As shown in FIG. 29, assume that a device owning a leaf key K1001 is a revoked device. In this case, an EKB having a tag and data (an encrypted key) like the one shown in FIG. 30 are distributed to devices each corresponding to a leaf. In order to revoke device '1001' shown in FIG. 29, this EKB is an EKB for updating keys KR, K1, K10 and K100.

All leaves other than a leaf corresponding to the revoked device '1001' are capable of acquiring the updated root key K(t)R. That is to say, since any of those leaves on a hierarchical layer below the node key K0 has the unupdated node key K0 inside the device, the leaf is capable of obtaining the updated root key K(t)R by decrypting the encrypted key Enc(K0, K(t)R) using the key K0.

In addition, a leaf on a hierarchical layer under the node key K11 is capable of obtaining the updated node key K(t)1 by decryption of Enc(K11, K(t)1) using the unupdated node key K11. Furthermore, the updated root key K(t)R can be obtained by decryption of Enc(K(t)1, K(t)R) using the updated node key K(t)1. By the same token, a leaf on a hierarchical layer under the node key K101 is also capable of obtaining the updated root key K(t)R.

In addition, a device '1000' owning an unrevoked leaf key K1000 is capable of obtaining a node key K(t)100 by decryption of Enc(K1000, K(t)100) using its own leaf key K1000. The device then uses the node key K(t)100 to decrypt node keys on upper hierarchical layers sequentially, one key after another, to eventually obtain the updated root key K(t)R.

On the other hand, since the revoked device '1001' is not capable of obtaining an updated node key K(t)100 on an upper hierarchical layer one level above its own leaf by carrying out the EKB processing, the device is incapable of obtaining the updated root key K(t)R.

An authorized device, that is, the client 1, which was not revoked, receives an EKB with tags and data shown in FIG. 30 from the license server 4 and stores them therein.

Thus, each client is capable of carrying out an EKB tracing process by using the tags. The EKB tracing process is a process to form a judgment as to whether the key distribution tree can be traced from the root key at the top.

Assume that a leaf ID of '1001' assigned to a leaf '1001' shown in FIG. 29 is grasped as 4 bits, namely, '1', '0', '0' and '1'. The EKB tracing process is carried out to form a judgment as to whether the tree can be traced by examining bits starting with the most significant bit down through least significant bits sequentially, one bit after another. To be more specific, a '1' bit indicates that the tracing should go to the right side while a '0' bit indicates that the tracing should go to the left side.

Since the most significant bit of the ID '1001' is '1', the tracing goes on from the root key KR shown in FIG. 29 to the right side. The first tag of the EKB, that is, the tag having a number of 0, is 0: {0, 0}, which indicates that data exists at both the branches. In this case, since the tracing is capable of going on to the right side, it is possible to reach the node key K1.

Next, the tracing goes on to a node on a hierarchical layer below the node key K1. Since the second bit of the ID '1001' is '0', the tracing goes on to the left side. The tag with a number of 1 indicates whether data exists on a hierarchical layer below a node key K0 on the left side. A tag indicating whether data exists on a hierarchical layer below the node key K1 is a tag with a number of 2. As shown in FIG. 30, the tag with a number of 2 is 2: {0, 0}, which indicates that data exists at both the branches. Thus, the tracing goes on to the left side and is capable of reaching a node key K10.

Furthermore, since the third bit of the ID '1001' is 0, the tracing goes on to the left side. At that time, a tag indicating whether data exists on a hierarchical layer below the node key K10 is a tag with a number of 3. The tag with a number of 3 is 3: {0, 0}, which indicates that data exists at both the branches. Thus, the tracing goes on to the left side and is capable of reaching a node key K100.

Furthermore, since the least significant bit of the ID '1001' is 1, the tracing goes on to the right side. A tag with a number of 4 corresponds to the node key K11. A tag indicating whether data exists on a hierarchical layer below the node key K100 is a tag with a number of 5. The tag with a number of 5 is 5: {0, 1}, which indicates that no data exists on the right side. As a result, since the node '1001' can not be reached, the device with the ID of '1001' is determined to be a device incapable of acquiring the updated root key by using the EKB, or a revoked device.

On the other hand, for example, a device ID having a leaf key K1000 is '1000'. Thus, when the EKB tracing process based on tags in the EKB is carried out as described above, it is possible to reach the node '1000'. As a result, the device with the ID of '1000' is determined to be an authorized device.

Refer back to FIG. 28. At the next step S195, the CPU 21 forms a judgment as to whether the certificate has been revoked on the basis of the result of the authentication processing carried out at the step S194. If the certificate has not been revoked, the flow of the processing goes on to a step S196 at which processing is carried out to authenticate the digital signature by using a disclosed key included in the certificate.

That is to say, as shown in FIG. 26, the certificate includes a disclosed key of the certificate user (or the content author). The disclosed key is used for authenticating a digital signature Sig(Header) shown in FIG. 25. More particularly, the disclosed key is used for decrypting the digital signature Sig(Header) in order to produce a hash value. This hash value is compared with a hash value obtained by application of a hash function to a header shown in FIG. 25. If both the hash values match each other, the header is confirmed as a header which has not been falsified. Otherwise, the header is determined to have been falsified.

Then, at the next step S197, the CPU 21 forms a judgment as to whether the header has been falsified. If the header has not been falsified, the flow of the processing goes on to a step S198 at which the watermark is authenticated. Subsequently, at the next step S199, the CPU 21 forms a judgment as to whether a result of the authentication of the watermark indicates that a check-out is possible. If a checkout is possible, the flow of the processing goes on to a step S200 at which the CPU 21 carries out the check out. That is, the CPU 21 transfers the content to the client 1 serving as a check-out destination to be copied thereby.

If, on the other hand, the outcome of the judgment formed at the step S191 indicates that the digital signature does not exist, the outcome of the judgment formed at the step S193 indicates that the certificate has been falsified, the outcome of the judgment formed at the step S195 indicates that the certificate cannot be authenticated by using the EKB, the outcome of the judgment formed at the step S197 indicates that the header has been falsified, or the outcome of the judgment formed at the step S199 indicates that the watermark includes a description inhibiting the check-out, the flow of the processing goes on to a step S201 at which an error-handling process is carried out. That is to say, in this case, the check-out is prohibited.

As described above, a certificate and a secret key are distributed from the license server 4 to the user. By adding a digital signature at the creation of content, the genuineness of the author of the content can be assured. As a result, illegal distribution of the content can be avoided.

In addition, by detecting a watermark at the creation of the content and adding the watermark to the digital signature, falsification of the watermark can be avoided. Thus, the genuineness of the content can be assured.

As a result, once created, the genuineness of the original content can be assured without regard to what format the content is distributed in.

In addition, the content does not have usage conditions. Instead, usage conditions are added to a license for the content. Thus, by changing usage conditions included in the license, conditions for using the content are also modified as well.

Next, a method of using a mark is explained. In accordance with the present invention, usage conditions are added not to content but to a license for the content as described above. However, usage circumstances may vary from content to content. In order to solve this problem, a mark is added to content in accordance with the present invention as shown in FIG. 25.

Since a license is associated with a plurality of contents, it is difficult to describe usage circumstances of each content in only usage conditions included in the license. In order to solve this problem, by adding usage circumstances to the content, it is possible to manage the individual contents while managing the license.

Figure 31:
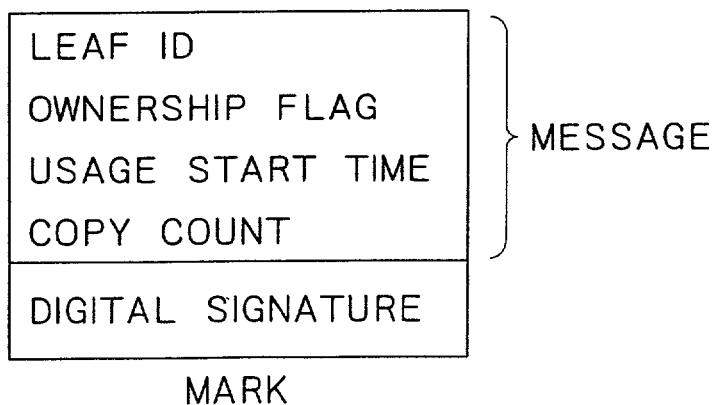
FIG. 31 is an explanatory diagram showing the configuration of a mark.

As shown in FIG. 31, the mark typically includes an ID (leaf ID) assigned to the user, an ownership flag, a usage start time and a copy count.

In addition, the mark also includes an additional digital signature created on the basis of a message such as the leaf ID, the ownership flag, the usage start time and the copy count.

The ownership flag is added, for example, when the user buys a license which allows the content to be used only for a predetermined period of time, as it is, or when the usage period is changed to a permanent usage period. The usage start time is described when the use of the content is started within a predetermined period of time. Assume that the period to download the content is limited. In this case, if the content is downloaded within the limited period of time, the date and time at which the content is actually downloaded are recorded as the usage start time. In this way, legal use of the content within a period of time is proven.

Recorded as a log, the copy count is the number of operations carried out so far to copy the contents.

Figure 32:
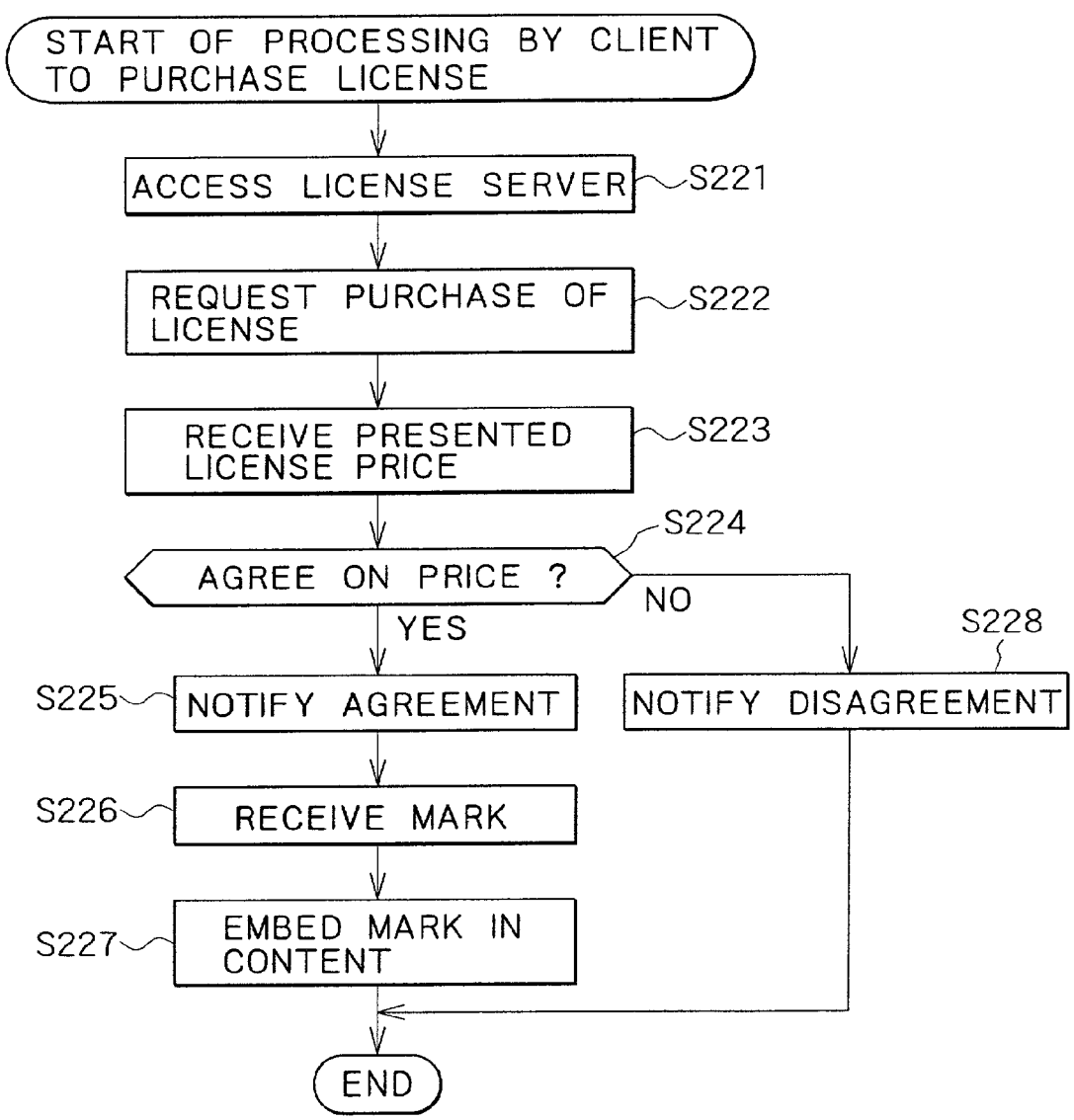
FIG. 32 is a flowchart used for explaining processing carried out by a client to purchase a license.

By referring to the flowchart shown in FIG. 32, the following description explains processing carried out to add a mark to content when the user purchases a license.

As shown in the figure, the flowchart begins with a step S221 at which the CPU 21 accesses the license server 4 through the Internet 2 in accordance with a command entered by the user via the input unit 26.

Then, at the next step S222, the CPU 21 retrieves an input entered by the user through the input unit 26 and transmits to the license server 4 a request to purchase a license according to the input.

In response to this request, the license server 4 presents a price to purchase the license at a step S242 of the flowchart shown in FIG. 33 as will be described later. Subsequently, at the next step S223, the CPU 21 employed in the client 1 receives the price transmitted by the license server 4, and displays the price on the output unit 27.

On the basis of the displayed price, the user forms a judgment as to whether to agree or disagree on the price. The user enters the outcome of the judgment to the input unit 26.

Then, at the next step S224, on the basis of the judgment outcome entered to the input unit 26, the CPU 21 forms a judgment as to whether the price has been agreed on. If the price has been agreed on, the flow of the processing goes on to a step S225 at which the CPU 21 carries out processing to notify the license server 4 that the price has been agreed on.

Figure 33:
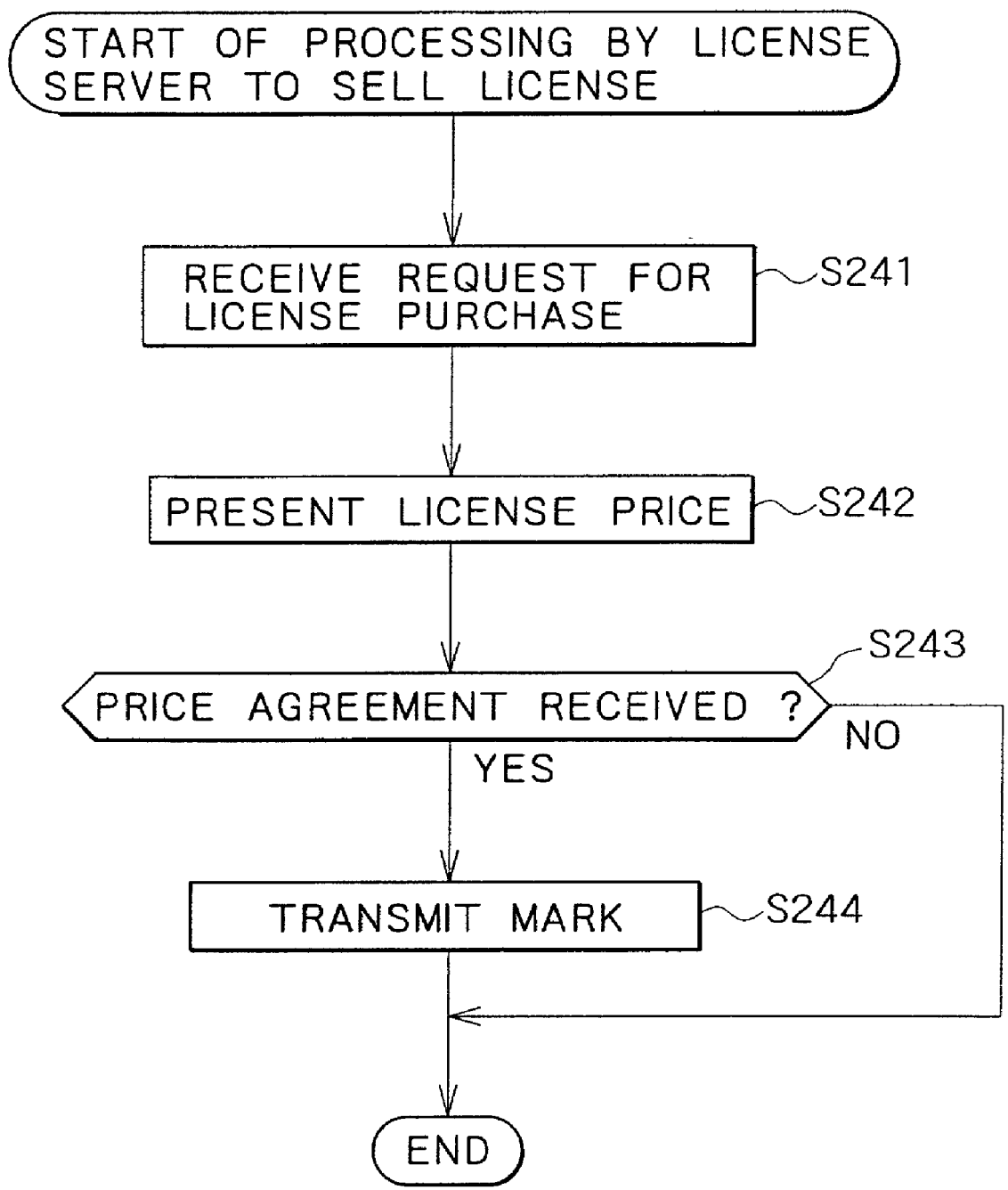
FIG. 33 is a flowchart used for explaining processing carried out by a license server to purchase a license.

Receiving this notification, the license server 4 transmits information representing a license purchase at the price, that is, a mark including a described ownership flag at a step S244 of the flowchart shown in FIG. 33. Subsequently, at the next step S226, the CPU 21 employed in the client 1 receives the mark transmitted by the license server 4. Then, at the next step S227, the CPU 21 carries out processing to embed the mark in the content. Thus, the mark, including a described ownership flag as shown in FIG. 31, is recorded in the content associated with the purchased license as a mark for the content. In addition, since the message is updated at that time, the CPU 21 also updates the digital signature shown in FIG. 25 and stores the updated digital signature in the recording medium.

If, on the other hand, the outcome of the judgment formed at the step S224 indicates that the price presented by the license server 4 has not been agreed on, the flow of the processing goes on to a step S228 at which the CPU 21 notifies the license server 4 that the price has not been agreed on.

For the processing carried out by the client 1 as described above, the license server 4 performs processing represented by the flowchart shown in FIG. 33.

As shown in the figure, the flowchart begins with a step S241 at which the CPU 21 employed in the license server 4 receives a request for the purchase of a license from the client 1. As described above, such a request is transmitted by the client 1 at the step S222 of the flowchart shown in FIG. 32. Then, at the next step S242, the CPU 21 reads out the price of the license to be purchased by the user from the storage unit 28, and transmits the price to the client 1.

As described above, in response to the disclosed price, the client 1 transmits the outcome of the judgment as to whether the price is agreed or disagreed on.

Subsequently, at the next step S243, the CPU 21 employed in the license server 4 determines whether the price is agreed on by the client 1 on the basis of the judgment outcome received from the client 1. If the price is agreed on, the flow of the processing goes on to a step S244 to generate a mark including a message representing the purchase of a license for the content, put a digital signature on the mark by using a secret key of its own and transmit the mark to the client 1. As described above, the mark transmitted in this way is recorded on the content in the storage unit 28 employed in the client 1 at the step S227 of FIG. 32.

If, on the other hand, the CPU 21 employed in the license server 4 determines that the price is not agreed on by the client 1 at the step S243, the processing of the step S244 is skipped. That is to say, in this case, the processing to purchase a license is not concluded. Thus, no mark is transmitted to the client 1.

Figures 34, 35:
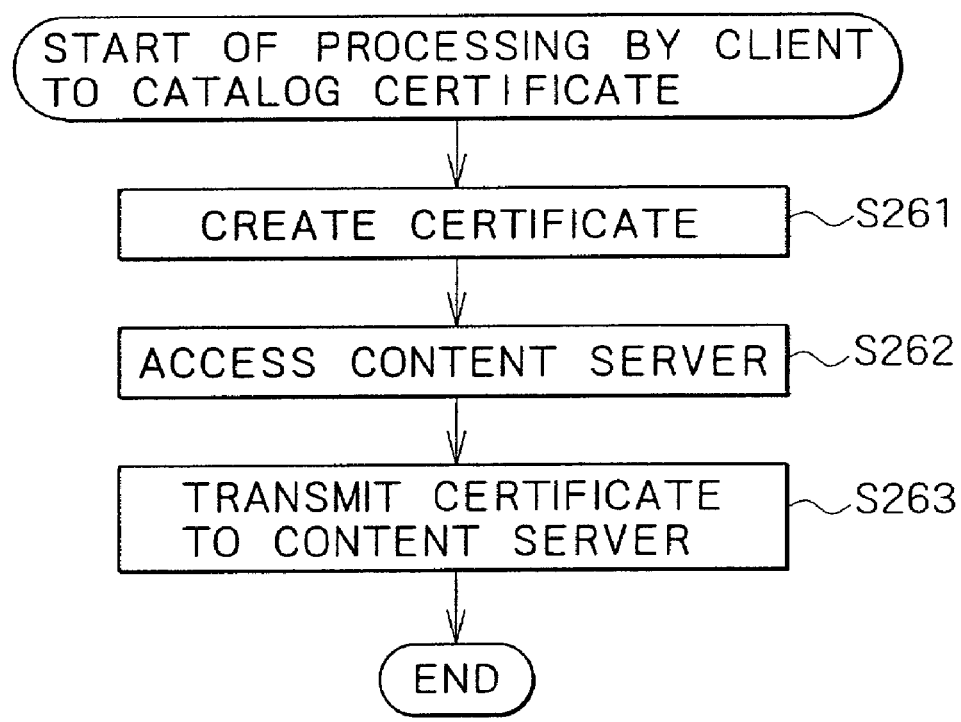
FIG. 34 is an explanatory diagram showing the configuration of a mark.
FIG. 35 is a flowchart used for explaining processing carried out by a client to catalog a certificate of the client.

FIG. 34 is a diagram showing a typical configuration of the mark transmitted from the license server 4 to the client 1 at the step S244. In this typical configuration, the mark comprises the leaf ID of the user, an ownership flag (Own) and a digital signature $Sig_s$(Leaf ID, Own), which is generated from the leaf ID and the ownership flag on the basis of a secret key S of the license server 4.

It should be noted that the mark is valid only for specific content issued to a specific user. Thus, if the specific content is copied, the mark in the copied content is invalid. In this way, even if content is separated from a license and usage conditions are associated with the license, it is possible to render services according to usage circumstances for individual contents.

Next, grouping is explained. A plurality of apparatuses and mediums are collected in a group in which content can be exchanged with a high degree of freedom. The formation of such a group is referred to as grouping. Normally, grouping forms a group comprising apparatuses and mediums which are owned by an individual. Conventionally, grouping also includes an operation to set a group key for each group. By associating a plurality of apparatuses and mediums collected in a group with a common license, however, grouping can be done with ease.

In addition, grouping can be carried out by cataloging the apparatuses in advance. This kind of grouping is explained as follows.

In this case, the user needs to catalog certificates of apparatuses to be grouped in a server in advance. The processing to catalog such certificates is explained by referring to the flowcharts shown in FIGS. 35 and 36.

First of all, the processing to catalog the certificate of a client, that is, an apparatus to be grouped, is explained by referring to the flowchart shown in FIG. 35. As shown in the figure, the flowchart begins with a step S261 at which the CPU 21 employed in the client 1 creates its own certificate as a certificate of an apparatus to be grouped. This certificate includes its own disclosed key.

Then, at the next step S262, the CPU 21 accesses the content server 3 based on an input entered by the user to the input unit 26. Subsequently, at the next step S263, the certificate created at the step S261 is transmitted to the content server 3.

It should be noted that a certificate received from the license server 4 can also be used without change as the certificate described above.

The processing described above is carried out by all apparatuses to be grouped.

Figure 36:
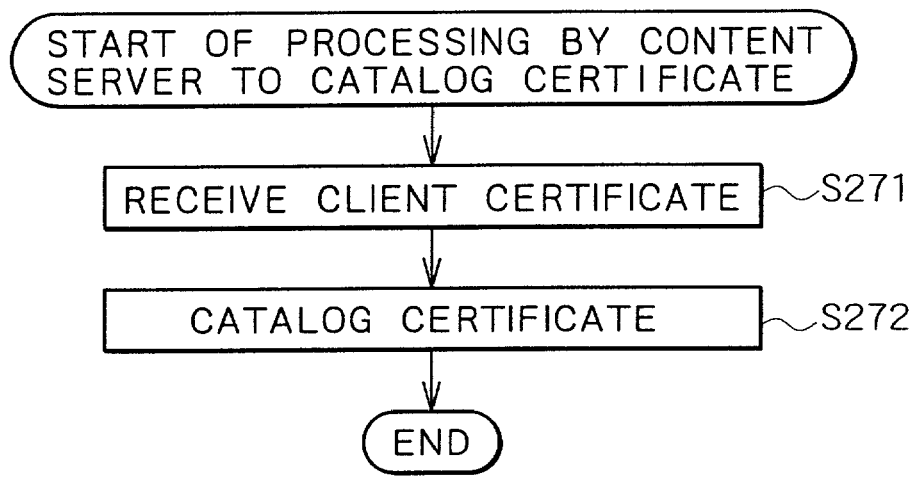
FIG. 36 is a flowchart used for explaining processing carried out by content server to catalog the certificate.

By referring to the flowchart shown in FIG. 36, the following description explains the processing carried out by the content server 3 to catalog the certificate created by the client 1 in the process represented by the flowchart shown in FIG. 35.

As shown in the figure, the flowchart begins with a step S271 at which the CPU 21 employed in the content server 3 receives a certificate from the client 1. Then, at the next step S272, the certificate is cataloged in the storage unit 28.

The processing described above is carried out for each apparatus to be grouped. As a result, certificates of devices composing each group are cataloged in the storage unit 28 employed in the content server 3, as shown in FIG. 37.

Figure 37:
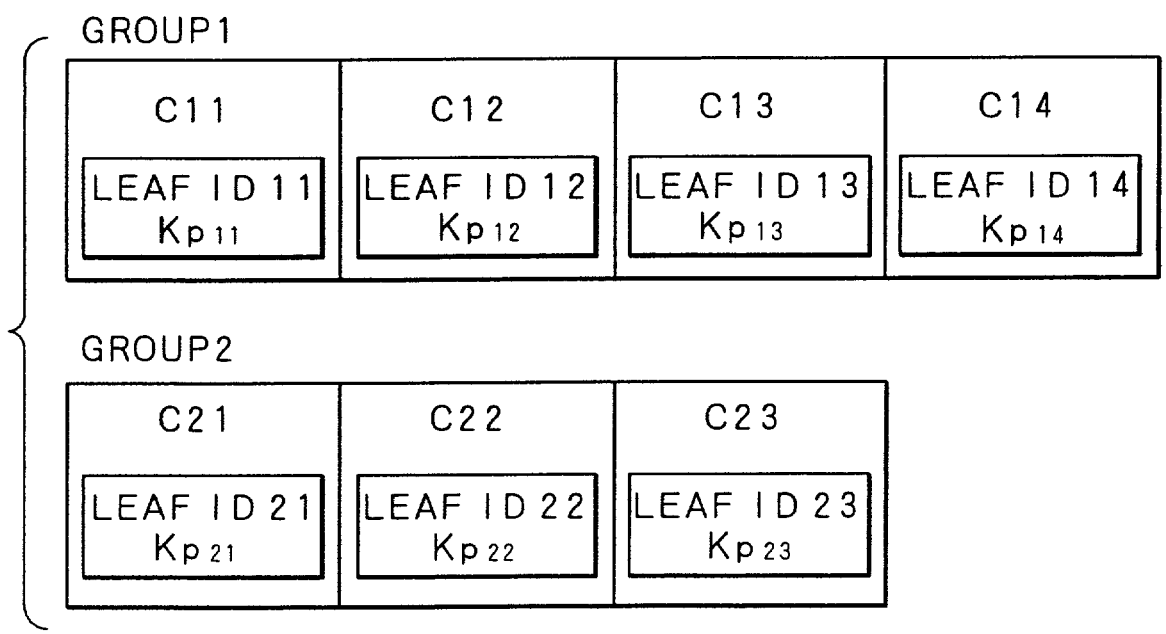
FIG. 37 is a diagram showing a typical certificate of a group.

In the example shown in FIG. 37, certificates C11 to C14 are cataloged as certificates of group 1. These certificates C11 to C14 include corresponding disclosed keys $K_{P11}$, to $K_{P14}$, respectively.

By the same token, certificates C21 to C23 are cataloged as certificates of group 2. These certificates C21 to C23 include corresponding disclosed keys $K_{P21}$ to $K_{P23}$, respectively.

Figures 38, 39:
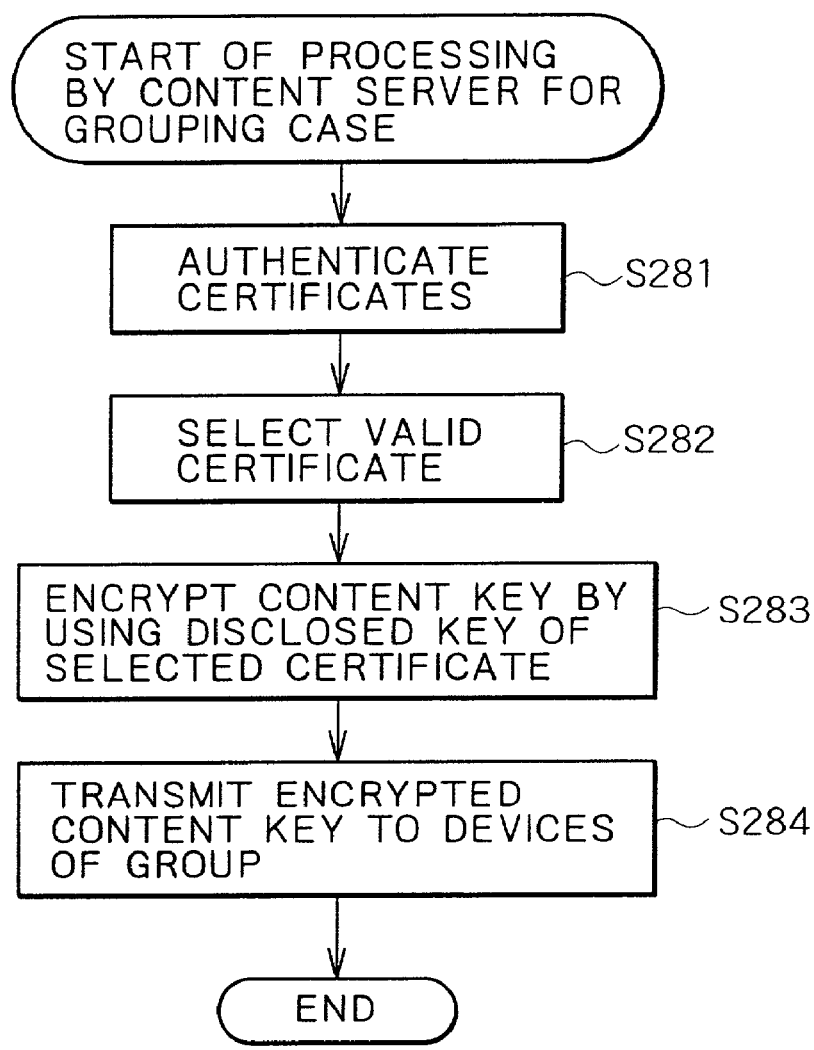
FIG. 38 is a flowchart used for explaining processing carried out by content server to form a group.
FIG. 39 is a diagram showing typical processing to encrypt content key.

With a certificate cataloged for each apparatus composing such a group, the content server 3 carries out the processing represented by the flowchart shown in FIG. 38 when the user of an apparatus pertaining to a group makes a request for the presentation of content.

As shown in the figure, the flowchart begins with a step S281 at which the CPU 21 employed in the content server 3 carries out processing to authenticate the group's certificate selected from among the ones cataloged in the storage unit 28.

As explained earlier by referring to FIGS. 29 and 30, in this authentication processing, an EKB is traced by using tags on the basis of the apparatus' leaf ID included in the certificate. The EKB has been distributed by the license server 4 to the content server 3. The authentication processing eliminates a revoked certificate.

Then, at the next step S282, the CPU 21 employed in the content server 3 selects a certificate determined to be valid as a result of the authentication processing carried out at the step S281. Subsequently, at the next step S283, the CPU 21 encrypts a content key using a disclosed key of the apparatus' certificate selected in the processing carried out at the step S282. Then, at the next step S284, the CPU 21 transmits the content key encrypted in the processing carried out at the step S283 along with its content to the apparatus in the group making the request for the presentation of the content.

Assume that the certificate C14 of one of the groups shown in FIG. 37 has been revoked. In this case, in the processing carried out at the step S283, encrypted data shown in FIG. 39 is typically generated. In the encrypted data shown in FIG. 39, content key Kc has been encrypted by using a disclosed key $K_{P11}$ of the certificate C11, a disclosed key $K_{P12}$ of the certificate C12 or a disclosed key $K_{P13}$ of the certificate C13.

Figure 40:
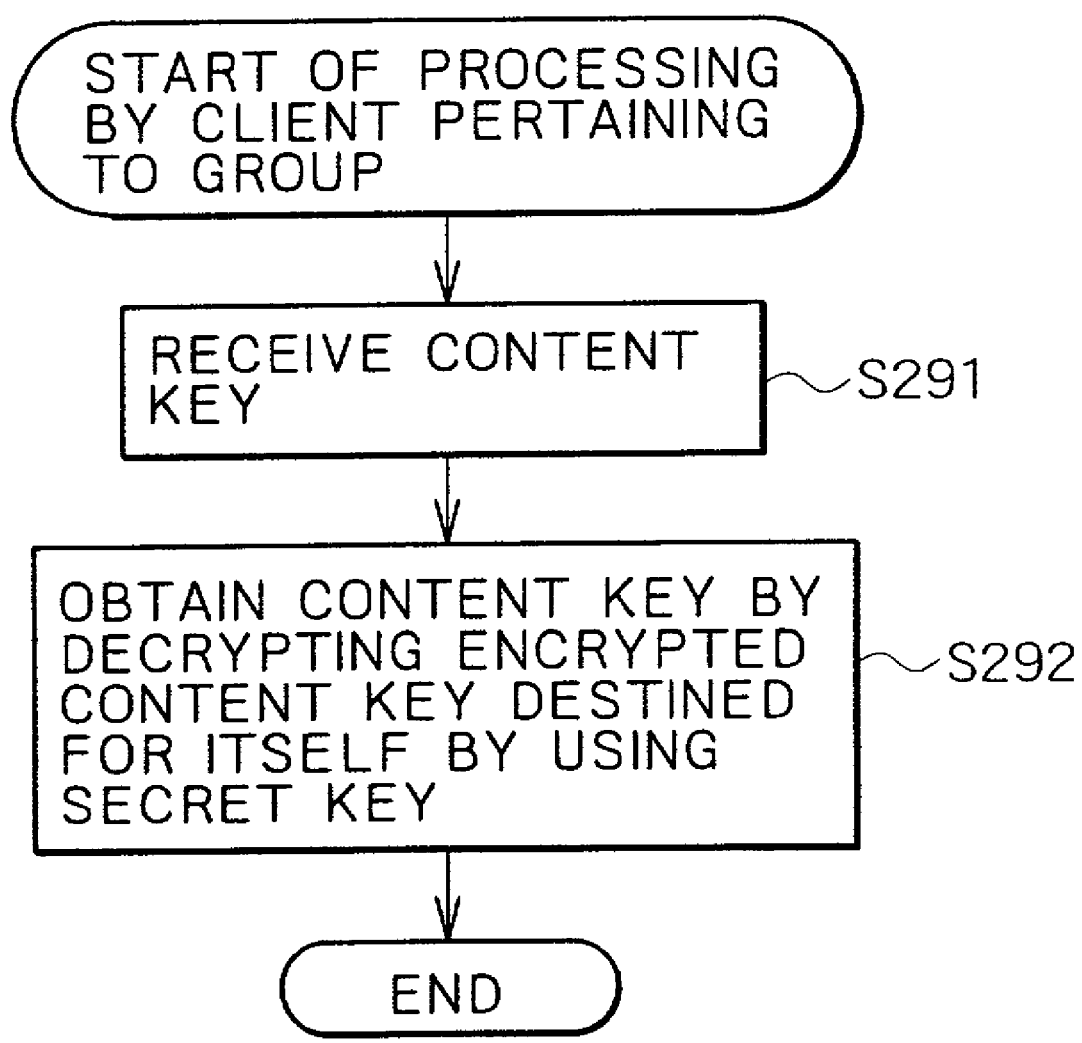
FIG. 40 is a flowchart used for explaining processing carried out by a client pertaining to a group.

When receiving the content from the license server 3 as a result of the processing represented by the flowchart shown in FIG. 38, the apparatus or the client pertaining to the group carries out processing represented by a flowchart shown in FIG. 40.

As shown in FIG. 40, the flowchart begins with a step S291 at which the CPU 21 employed in the client 1 receives the content key Kc and the content which are transmitted by the content server 3 in the processing carried out at the step S284 of the flowchart shown in FIG. 38. The content has been encrypted by using the content key Kc, which has been encrypted by using a disclosed key held by the apparatus as described above. (Refer to FIG. 39).

Then, at the next step S292, the CPU 21 decrypts the content key Kc, which has been received in the processing carried out at the step S291 and is destined for the client 1, using a secret key owned by the client 1. The CPU 21 then uses the decrypted content key to decrypt the content.

For instance, take the apparatus corresponding to the certificate C11 shown in FIG. 39 as an example. The apparatus decrypts the content key Kc by using its own secret key corresponding to the disclosed key $K_{P11}$. The apparatus then uses the decrypted content key Kc to decrypt the content.

The same processing is carried out for apparatuses associated with the certificates C12 and C13. An apparatus associated with the revoked certificate C14 does not receive the content key Kc encrypted by its disclosed key attached to the content. Thus, the apparatus is not capable of decrypting the content key Kc by using its own secret key and thus is incapable of decrypting the content by using the decrypted content key Kc.

As described above, apparatuses are grouped with respect to content keys, that is, contents. However, apparatuses may be grouped with respect to license keys, that is, licenses.

As described above, apparatuses can be grouped without using special group keys or ICVs (Integrity Check Values) to be described later. This kind of grouping is suitable for a group with a small scale.

In accordance with the present invention, a license can be checked out, checked in, moved and copied. However, these operations must be based on rules determined by the SDMI.

Figure 41:
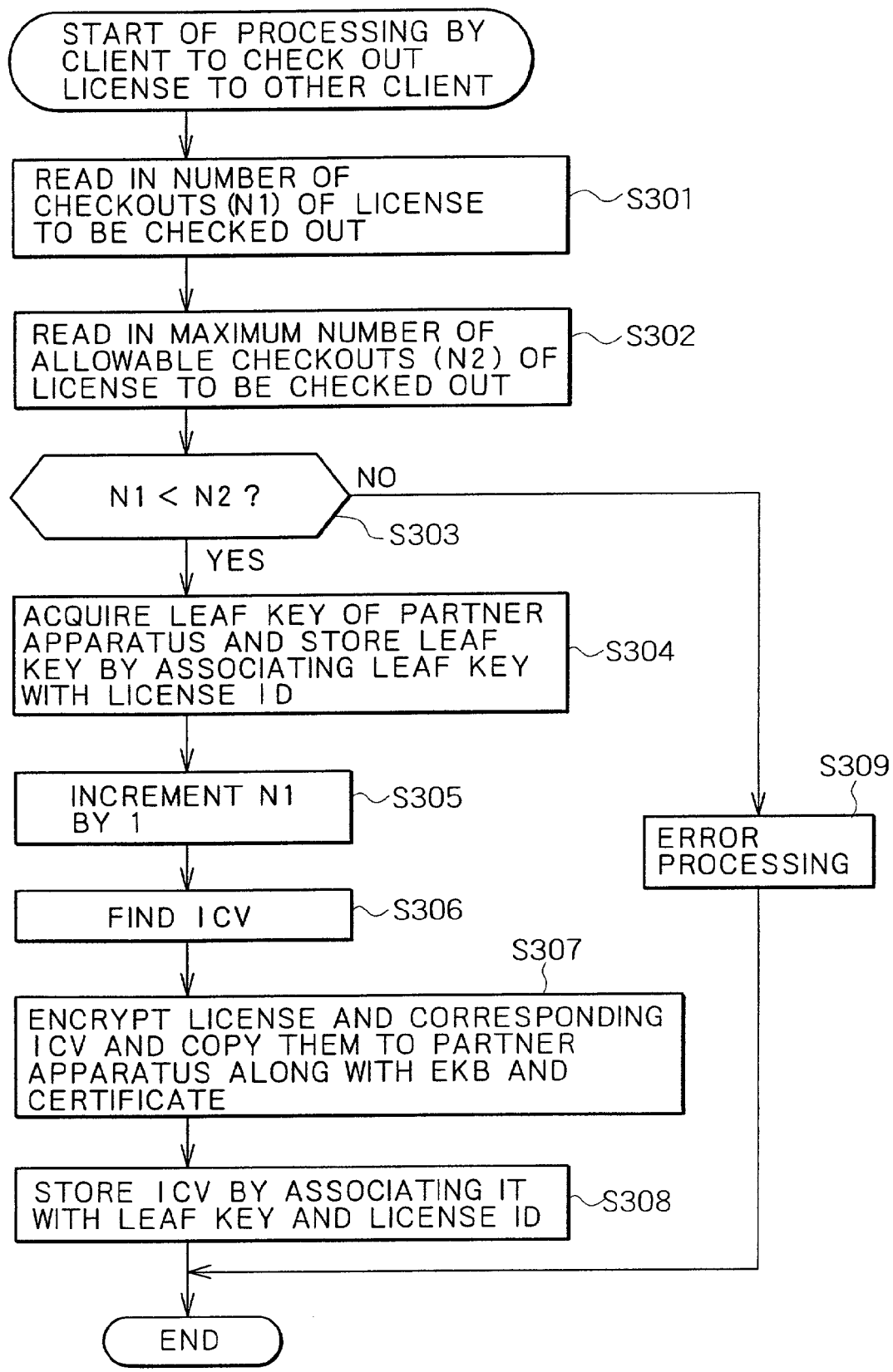
FIG. 41 is a flowchart used for explaining processing carried out by a client to check out a license to another client.
Figure 42:
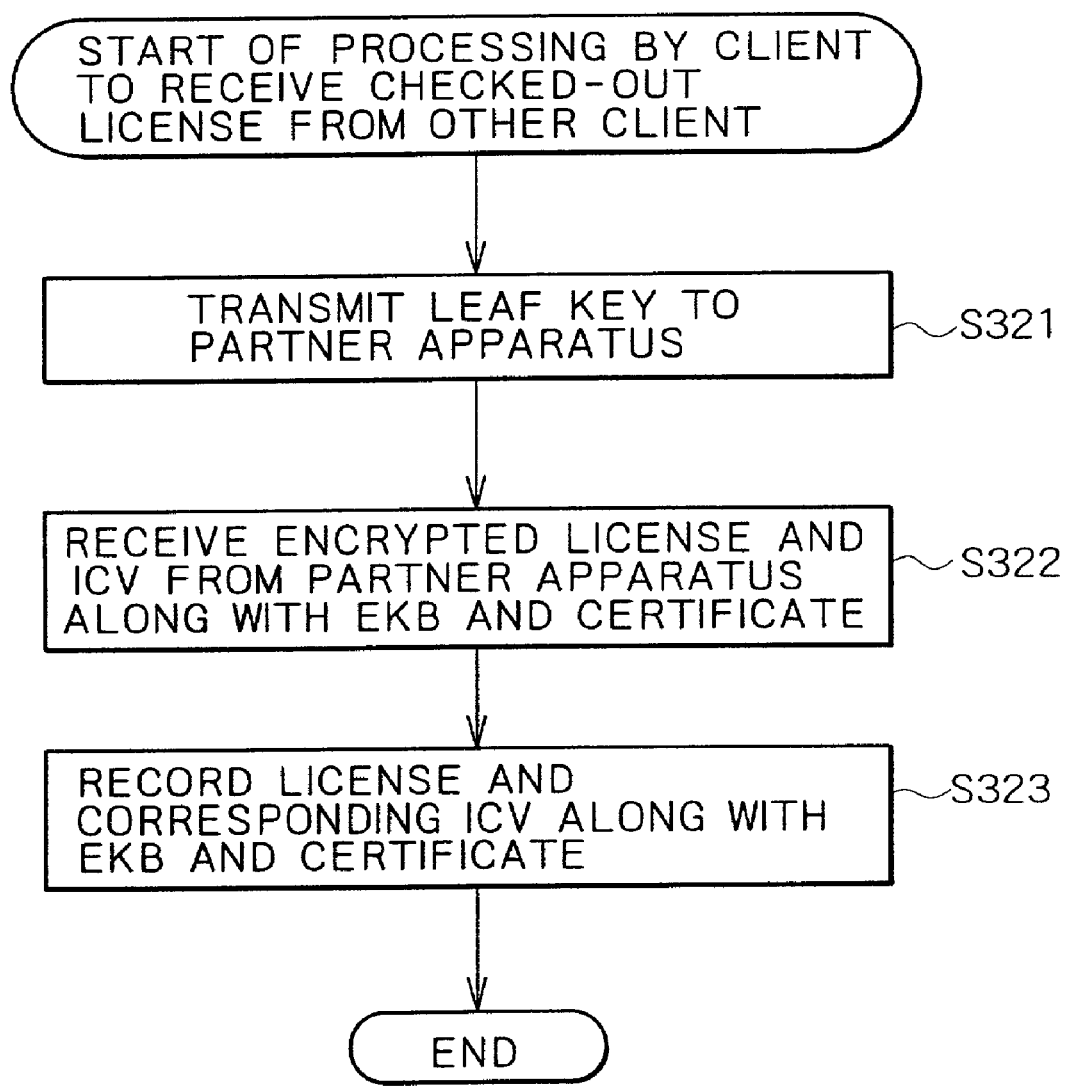
FIG. 42 is a flowchart used for explaining processing carried out by a client to receive a license checked out by another client from the other client.

By referring to the flowcharts shown in FIGS. 41 and 42, the following description explains processing to check out a license using such a client.

The description begins with an explanation of the processing carried out by a client to check out a license to another client with reference to the flowchart shown in FIG. 41. As shown in the figure, the flowchart begins with a step S301 at which the CPU 21 employed in the client 1 reads out the number of check-out operations (N1) which have been conducted for the license. The number of check-out operations (N1) is included in usage conditions shown in FIG. 8. Thus, the number of check-out operations (N1) is read out from the usage conditions.

Then, at the next step S302, the CPU 21 employed in the client 1 reads out the maximum number of check-out operations (N2) permissible for the license. Also in this case, the maximum permissible number of check-out operations (N2) is read out from the usage conditions.

Subsequently, at the next step S303, the CPU 21 compares the number of check-out operations (N1) read out at the step S301 with the maximum permissible number of check-out operations (N2) read out at the step S302 to form a judgment as to whether the number of check-out operations (N1) is greater or smaller than the maximum permissible number of check-out operations (N2).

If the number of check-out operations (N1) is found to be smaller than the maximum permissible number of check-out operations (N2), the flow of the processing goes on to a step S304 at which the CPU 21 acquires the leaf key of a partner apparatus from the partner apparatus, which is a client serving as a check-out destination. The acquired leaf key is cataloged on a check-out list stored in the storage unit 28, being associated with a license ID serving as a check-out object.

Then, at the next step S305, the CPU 21 increments the number of check-out operations (N1) read out at the step S301 by 1. Subsequently, at the next step S306, the CPU 21 finds an ICV based on the message of the license. The ICV will be described later by referring to FIGS. 46 to 50. By using the ICV, it is possible to prevent the license from being falsified.

Then, at the next step S307, the CPU 21 encrypts the license serving as the check-out object and the ICV found at the step S306 using the disclosed key owned by the client 1 itself. The encrypted license and the encrypted ICV are transmitted to the partner apparatus to be copied thereby along with an EKB and a certificate. Subsequently, at the next step S308, the CPU 21 catalogs the ICV found at the step S306 on the check-out list stored in the storage unit 28 by associating the ICV with the license ID and the leaf key of the partner apparatus.

If, on the other hand, the outcome of the judgment formed at the step S303 indicates that the number of check-out operations (N1) is not smaller than (for example, equal to) the maximum permissible number of check-out operations (N2), the flow of the processing goes on to a step S309 at which the CPU 21 carries out an error-handling process. This is because, since the number of check-out operations (N1) is not smaller than the maximum permissible number of check-out operations (N2), indicating that the license has been checked out as many times as the number of allowable check-out operations (N2), the license can no longer be checked out. Thus, in this case, the license is not checked out.

By referring to the flowchart shown in FIG. 42, the following description explains the processing carried out by a client receiving a license checked out in the check-out processing represented by the flowchart shown in FIG. 41.

The flowchart shown in FIG. 42 begins with a step S321 at which the CPU 21 employed in the client transmits the leaf key owned by the client itself to the partner apparatus, that is, the client 1 checking out the license. The leaf key is stored in the partner apparatus at the step S304, being associated with a license ID.

Then, at the next step S322, the CPU 21 receives an encrypted license and an encrypted ICV along with an EKB and a certificate from the partner client 1. As described earlier, the partner client 1 transmits the encrypted license and the encrypted ICV along with the EKB and the certificate at the step S307 of the flowchart shown in FIG. 41.

Subsequently, at the next step S323, the CPU 21 stores the encrypted license, the encrypted ICV, the EKB and the certificate, which were received at the step S322, in the storage unit 28.

Figure 43:
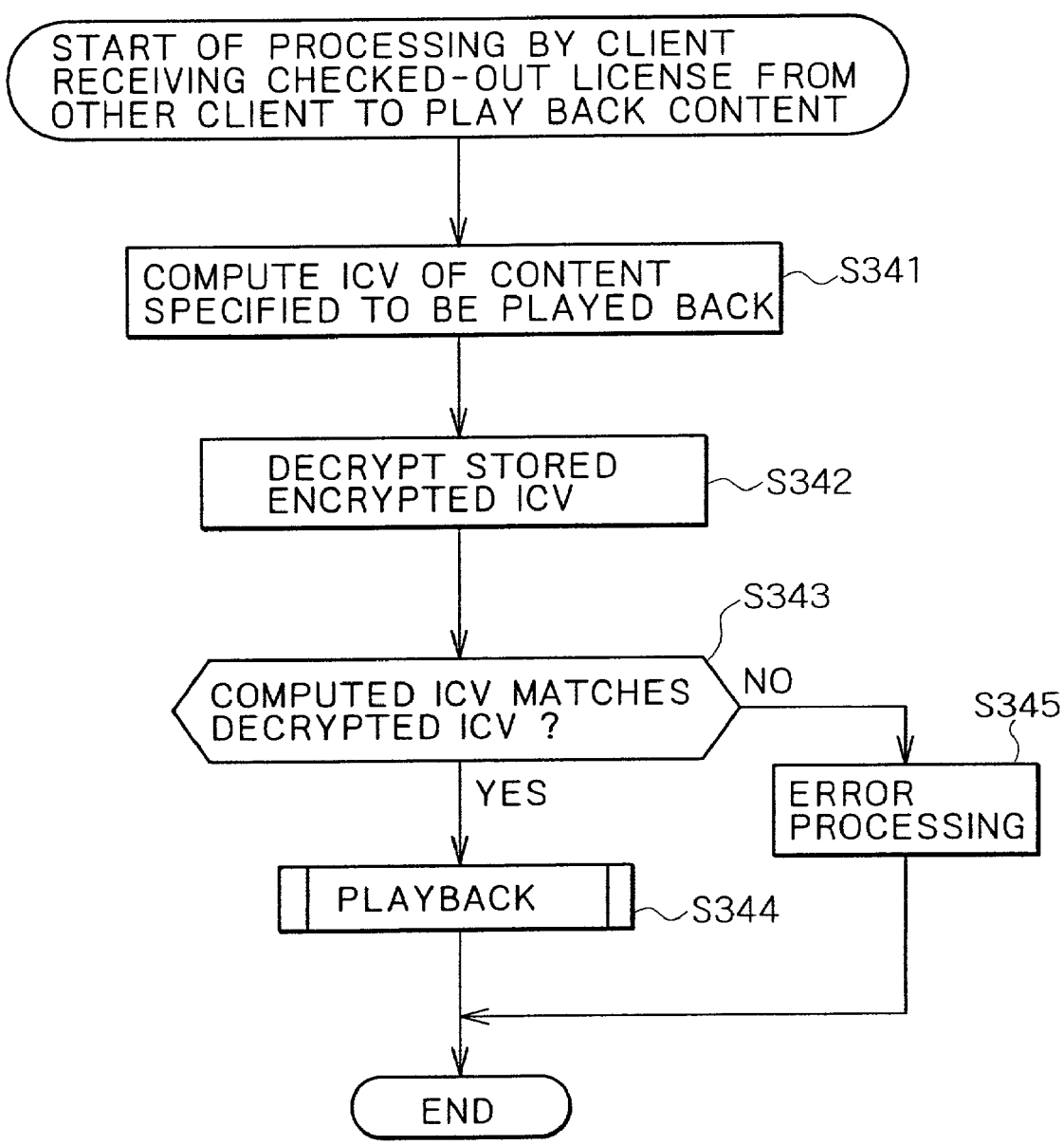
FIG. 43 is a flowchart used for explaining processing carried out by a client to play back a license checked out by another client.

The client 1 receiving a checked-out license as described above uses the checked-out license to play back content in accordance with the processing represented by the flowchart shown in FIG. 43.

As shown in the figure, the flowchart begins with a step S341 at which the CPU 21 employed in the client 1 finds an ICV of content specified by a command entered by the user to the input unit 26 as content to be played back. Subsequently, at the next step S342, the CPU 21 decrypts an encrypted ICV stored in the storage unit 28 using a disclosed key included in the certificate.

Then, at the next step S343, the CPU 21 forms a judgment as to whether the ICV found at the step S341 matches the ICV read out and decrypted in the processing carried out at the step S342. The former matching the latter indicates that the license has not been falsified. In this case, the flow of the processing goes on to a step S344 at which the CPU 21 carries out processing to play back the content.

If, on the other hand, the outcome of the judgment formed at the step S343 indicates that the two ICVs do not match each other, it is feared that the license has been falsified. In this case, the flow of the processing goes on to a step S345 at which the CPU 21 carries out an error-handling process. That is to say, the content cannot be played back by using this license.

Figure 44:
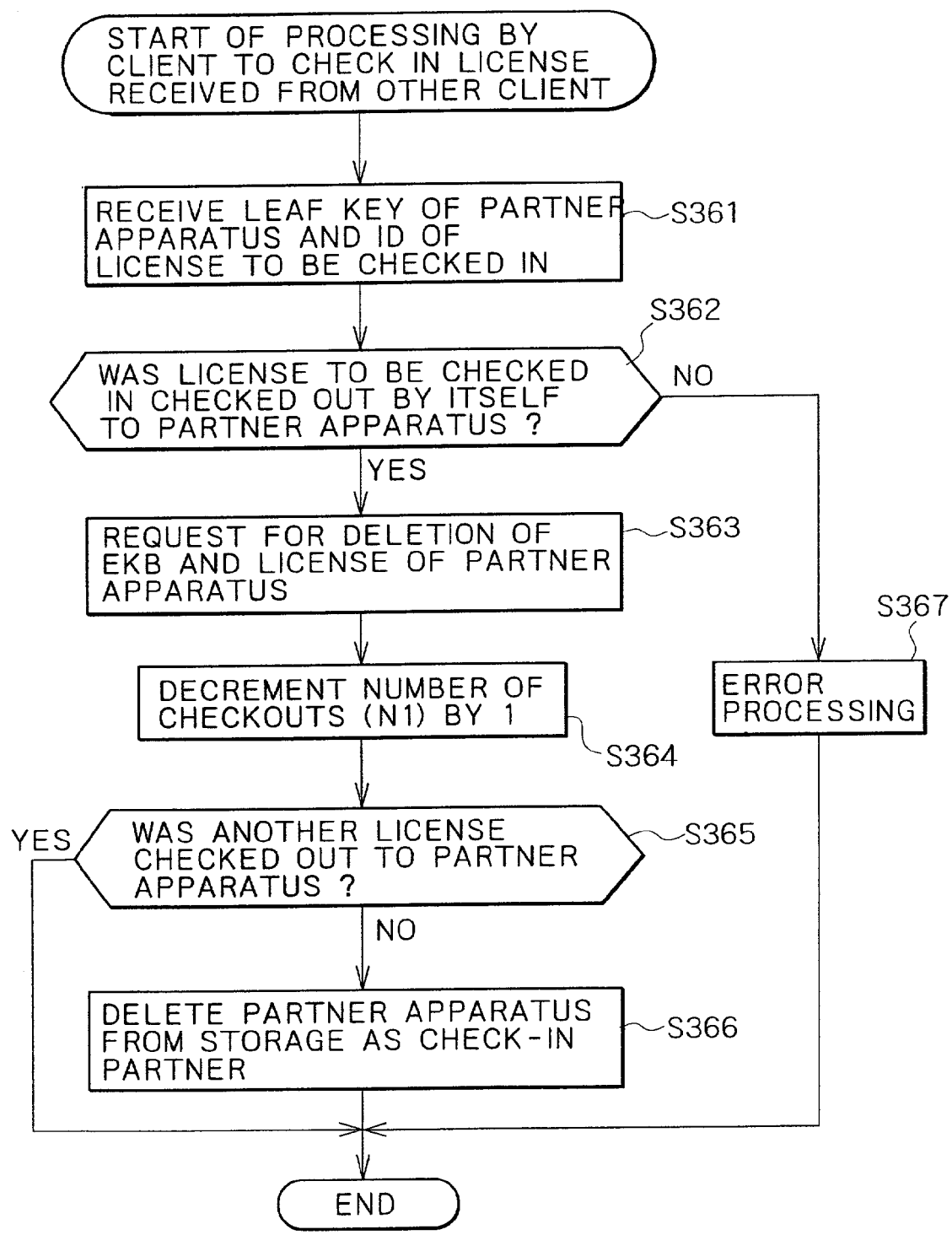
FIG. 44 is a flowchart used for explaining processing carried out by a client to check in a license checked out by another client.

By referring to the flowchart shown in FIG. 44, the following description explains the processing carried out by a client to check in a license which was once checked out to another client 1 as described above.

As shown in the figure, the flowchart begins with a step S361 at which the CPU 21 employed in the client receives the leaf key of a partner apparatus and the ID of a license to be checked in. The partner apparatus is a client 1 which returns or checks in a license. Then, at the next step S362, the CPU 21 forms a judgment as to whether the license to be checked in, which is obtained at the step S361, is a license checked out by the client itself to the partner apparatus. This judgment is based on the ICV, the leaf key and the license ID which were stored in the storage unit 28 in the processing carried out at the step S308 of the flowchart shown in FIG. 41. That is to say, the CPU 21 determines whether the ICV, the leaf key and the license ID, which were received at the step S361, have been cataloged on the check-out list stored in the storage unit 28. If they have been cataloged on the check-out list, the CPU 21 determines that the license to be checked in is a license checked out by the client itself to the partner apparatus.

If the license to be checked in is a license checked out by the client itself to the partner apparatus, the flow of the processing goes on to a step S363 at which the CPU 21 makes a request for deletion of the EKB, the certificate and the license of the partner apparatus. As will be described later, the partner apparatus deletes the license, the EKB and the certificate at a step S383 of the flowchart shown in FIG. 45 in accordance with the request.

Then, at the next step S364, since a check-out license is checked in, the CPU 21 decrements the number of check-out operations (N1) by 1.

Subsequently, at the next step S365, the CPU 21 forms a judgment as to whether another license has been checked out to the partner apparatus. If there is no other license checked out to the partner apparatus, the flow of the processing goes on to a step S366 at which the CPU 21 deletes the partner apparatus from the check-out list for cataloging the partner apparatus as a check-in partner apparatus. If, on the other hand, the outcome of the judgment formed at the step S365 indicates that there is another license checked out to the partner apparatus, the processing of the step S366 is skipped. This is because it is quite within the bound of possibility that the other license is checked in by the partner apparatus.

If the outcome of the judgment formed at the step S362 indicates that the license to be checked in is not a license checked out by the client itself to the partner apparatus, the flow of the processing goes on to a step S367 at which the CPU 21 carries out an error-handling process. That is to say, in this case, the check-in processing is not carried out since the license is not a license managed by the client itself.

In an attempt made by the user to illegally copy the license, the check-in processing cannot be carried out since the stored ICV is not equal to the ICV found on the basis of the license acquired in the processing carried out at the step S361.

Figure 45:
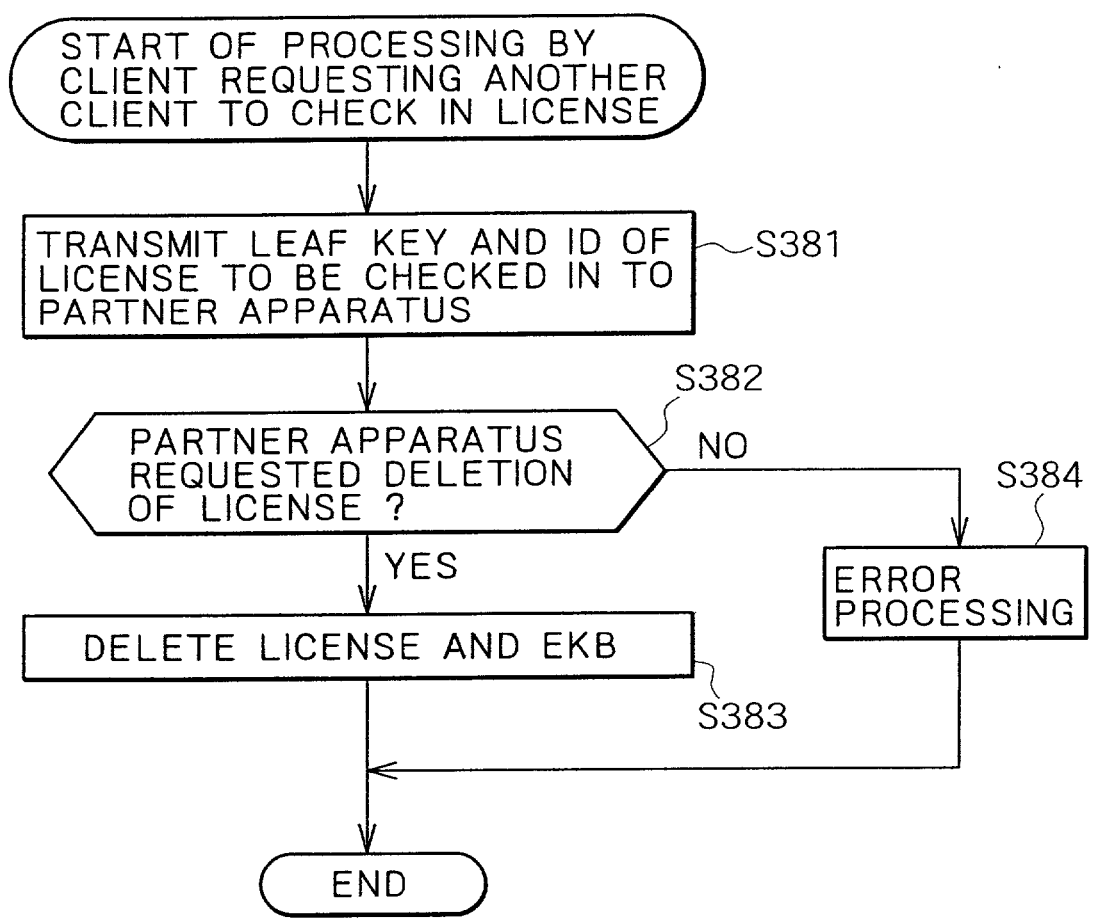
FIG. 45 is a flowchart representing processing carried out by a client issuing a request for the processing to check in a license to another client carrying out the license-check-in processing represented by the flowchart shown in FIG. 44.

FIG. 45 is a flowchart representing the processing carried out by a client 1 issuing a request to check in a license to another client carrying out the license-check-in processing represented by the flowchart shown in FIG. 44.

The flowchart shown in FIG. 45 begins with a step S381 at which the CPU 21 employed in the client 1 transmits a leaf key and the ID of the license to be checked in to a partner apparatus, which is the client carrying out the license-check-in processing represented by the flowchart shown in FIG. 44. As described above, the partner apparatus receives the leaf key and the license ID at the step S361 and carries out processing to authenticate the license to be checked in on the basis of the leaf key and the license ID at the step S362.

Then, at the next step S382, the CPU 21 employed in the client 1 forms a judgment as to whether a request for deletion of the license has been received from the partner apparatus. As described earlier, if the license is a proper license to be checked in, the partner apparatus makes a request for deletion of the license, the EKB and the certificate in the processing carried out at the step S363. If the outcome of the judgment formed at the step S382 indicates that such a request has been received, the flow of the processing goes on to a step S383 at which the CPU 21 deletes the license, the EKB and the certificate. That is to say, the client 1 thus becomes no longer capable of using the license. Since the number of check-out operations (N1) is decremented by 1 by the partner apparatus in the processing carried out at the step S364 of the flowchart shown in FIG. 44, the check-in processing is ended.

If, on the other hand, the outcome of the judgment formed at the step S382 indicates that such a request was not received, the flow of the processing goes on to a step S384 at which the CPU 21 carries out an error-handling process. That is to say, in this case, the check-in processing cannot be carried out due to some reasons such as a discrepancy in ICV.

The check-out processing and the check-in processing have been explained so far. Processing to copy or move a license can also be carried out as well.

The following description explains the processing to generate an ICV (Integrity Check Value) of a license, associate the ICV with the license and form a judgment as to whether the license has been falsified by computation of an ICV in order to prevent the license from being falsified. It should be noted that the same processing can be applied to content.

An ICV (Integrity Check Value) of a license typically is computed by application of a hash function to the license as follows:

$$ICV = \text{hash}(Kicv, L1, L2, \ldots) \quad i.$$

where notation Kicv denotes an ICV generation key whereas symbols L1 and L2 each denote information on the license. A MAC (Message Authentication Code) of important information of the license is used as the information represented by L1 and L2.

Figure 46:
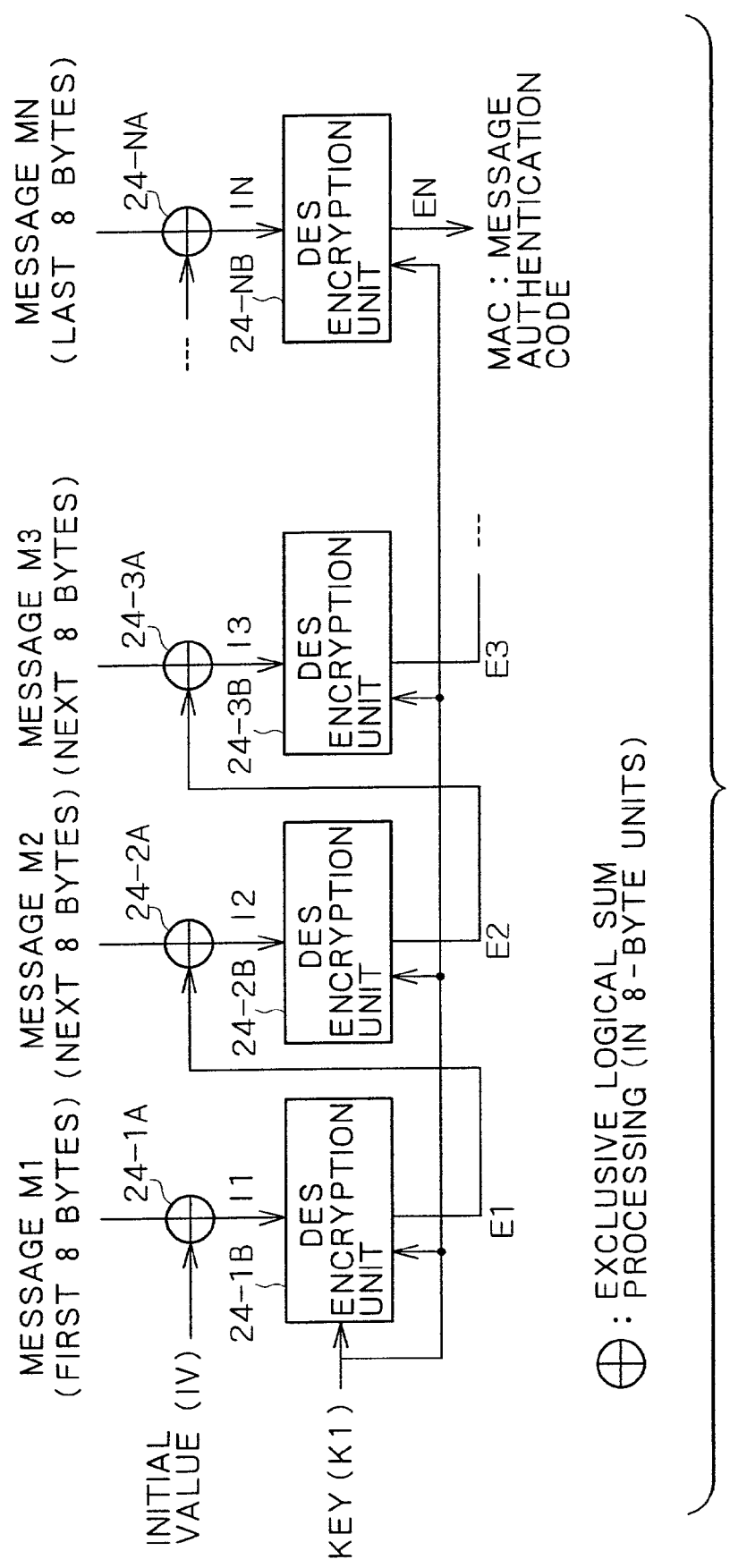
FIG. 46 is an explanatory diagram showing generation of a MAC (Message Authentication Code)

FIG. 46 is a diagram showing the typical generation of a MAC value by using a DES encryption processing configuration. As is obvious from the configuration shown in FIG. 46, a processed message is divided into 8-byte units. In the following description, the divided message is referred to as M1, M2, . . . and MN. First of all, an initial value IV and M1 are supplied to a processing unit 24-1A for carrying out exclusive logical sum processing to result in an exclusive logical sum 11. Then, the exclusive logical sum 11 is supplied to a DES encryption unit 24-2B for encrypting sum 11 by using a key K1 to produce an encryption result E1. Subsequently, E1 and M2 are supplied to a processing unit 24-2A for carrying out exclusive logical sum processing to result in an exclusive logical sum 12. Then, the exclusive logical sum 12 is supplied to a DES encryption unit 24-2B for encrypting sum 12 by using key K1 to produce an encryption result E2. Thereafter, these operations are carried out repeatedly to encrypt all the messages. Eventually, a result EN generated by a DES encryption unit 24-NB is a MAC (Message Authentication Code).

A hash function is then applied to such a license MAC value and an ICV generation key to generate an ICV (Integrity Check Value). For example, an ICV computed at the generation of a license is compared with an ICV newly calculated from a license. If the ICVs match each other, the license is assured not to have been falsified. If the ICVs do not match each other, on the other hand, the license is determined to have been falsified.

The following description explains a configuration to use an EKB (Enabling Key Block) for transmitting a key Kicv for generating the ICV (Integrity Check Value) of a license. In the configuration, message data encrypted using the EKB is used as the key Kicv for generating the ICV (Integrity Check Value) of a license.

Figure 47:
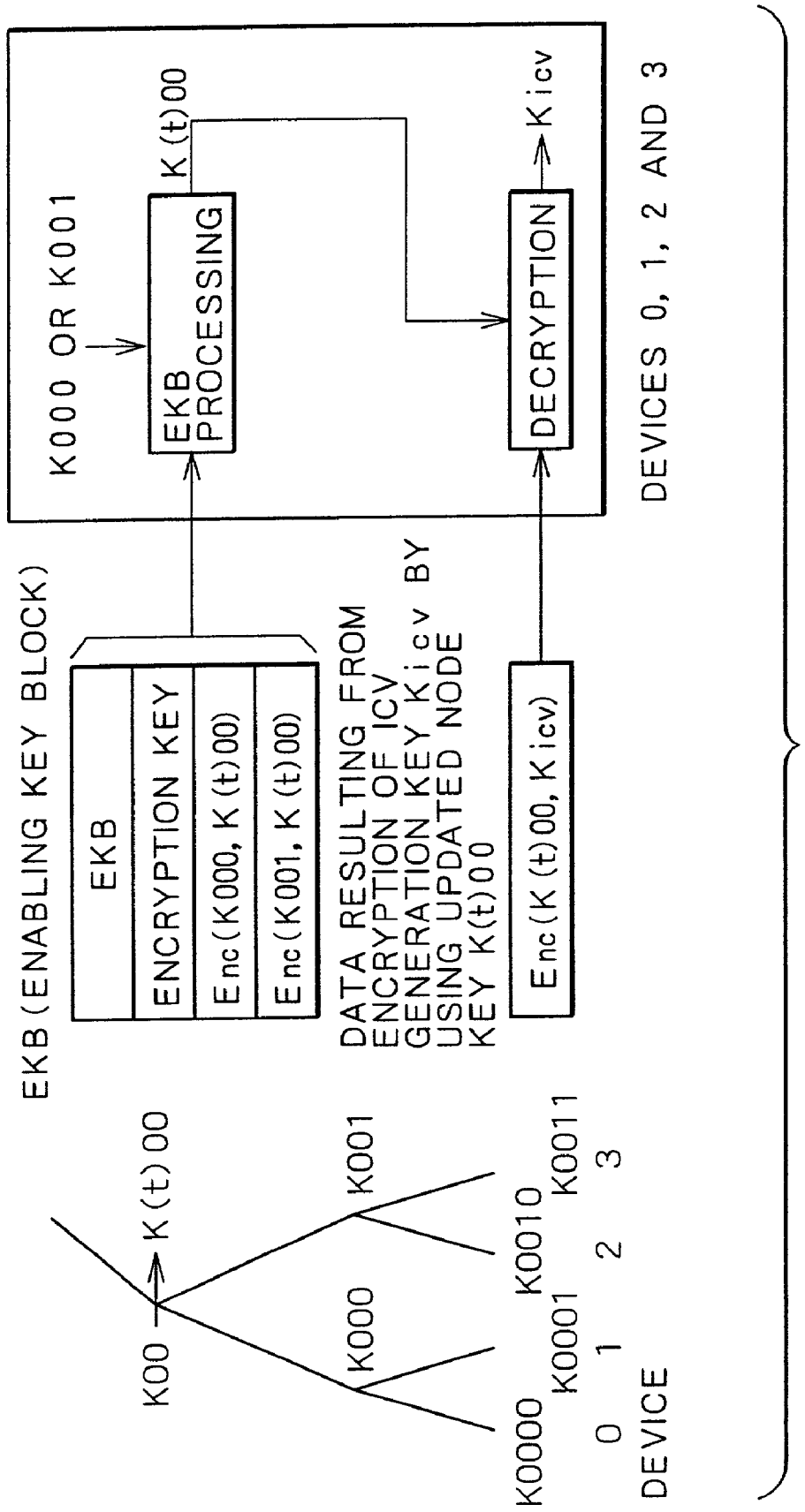
FIG. 47 is a flowchart used for explaining processing to decrypt an ICV (Integrity Check Value) generation key.
Figure 48:
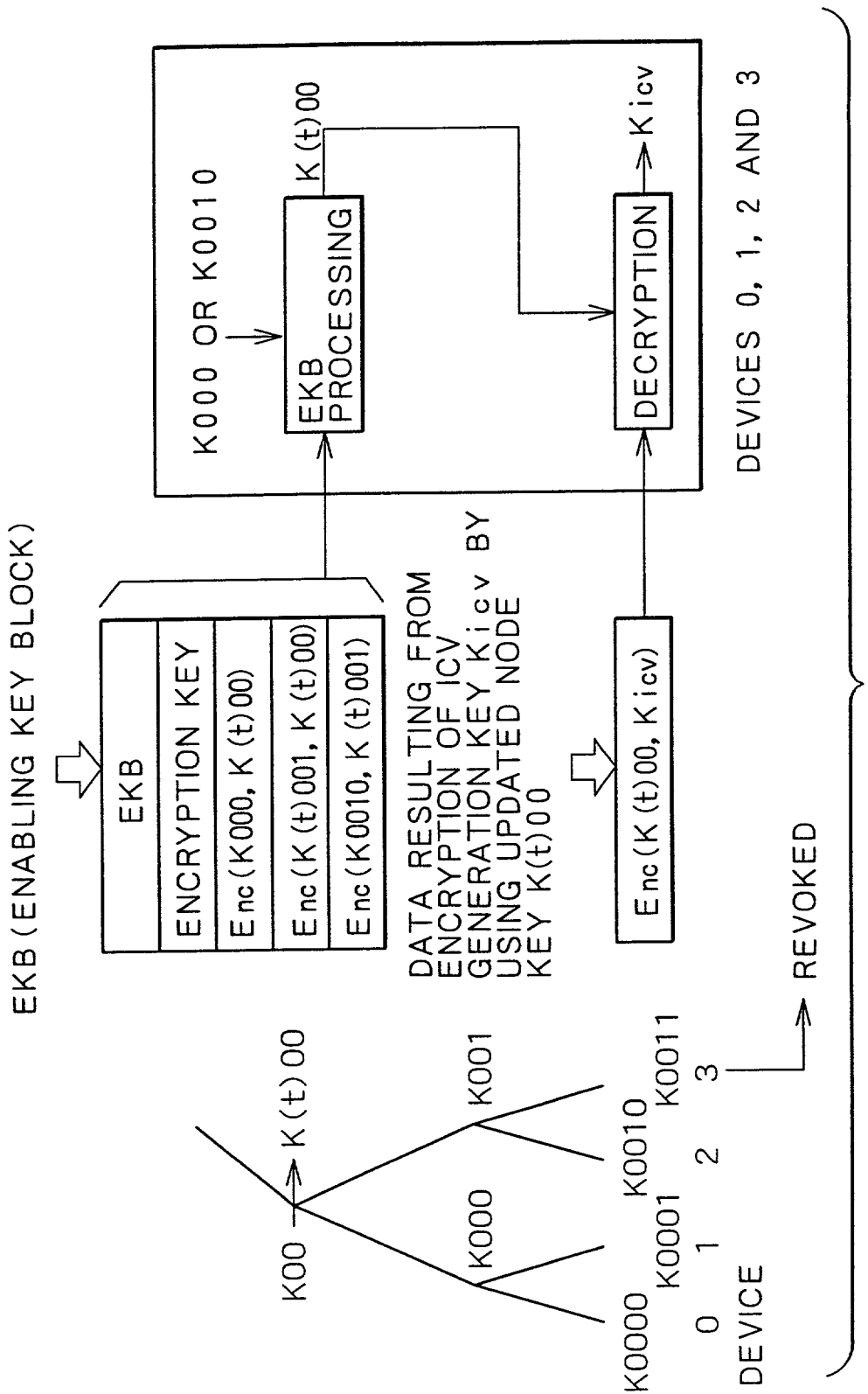
FIG. 48 is a flowchart used for explaining other processing to decrypt the ICV generation key.

More particularly, FIGS. 47 and 48 are each a diagram showing a typical configuration of using an EKB (Enabling Key Block) to distribute a key Kicv for generating the ICV (Integrity Check Value) of a common license for forming a judgment as to whether the license has been falsified when transmitting the license to a plurality of devices. To be more specific, FIG. 47 is a diagram showing the typical distribution of a decryptable key Kicv for generating the ICV (Integrity Check Value) of a license to devices 0, 1, 2 and 3. On the other hand, FIG. 48 is a diagram showing the typical distribution of a decryptable key Kicv for generating the ICV (Integrity Check Value) of a license to devices 0, 1, and 2 only, but not to device 3 which has been revoked.

In the typical distribution shown in FIG. 47, an encrypted EKB (Enabling Key Block), which can be decrypted, is generated. The EKB is used for transmitting data Enc(K(t) 00, Kicv) and an updated node key K(t)00 to devices 0, 1, 2 and 3. The data Enc(K(t)00, Kicv) is a result of encrypting the check-value generation key Kicv using the updated node key K(t)00. The node key K(t)00 has been updated by using a node key and a leaf key which are owned by each of devices 0, 1, 2 and 3. As shown on the right side of FIG. 47, first of all, each of devices 0, 1, 2 and 3 decrypts the EKB to obtain the updated node key K(t)00. Then, the updated node key K(t)00 is used for decrypting the encrypted check-value generation key Enc(K(t)00, Kicv) to obtain the check-value generation key Kicv.

Other devices 4, 5, 6, 7 and so on are each incapable of obtaining the updated node key K(t)00 by processing an EKB (Enabling Key Block) and by using a node key and a leaf key which are owned by each of devices, even if the EKB is received by the devices. Thus, the check-value generation key can be transmitted to only authorized devices with a high degree of safety.

FIG. 48 is a diagram showing a case in which device 3 pertaining to a group enclosed by a dotted line in FIG. 12 has been revoked because, for example, a key has leaked out, so that an EKB (Enabling Key Block) is generated and distributed to only other members of the group, namely, devices 0, 1 and 2. The EKB (Enabling Key Block) can be decrypted only by the devices 0, 1 and 2. The EKB (Enabling Key Block) shown in FIG. 48 and data Enc(K(t)00, Kicv) are distributed. As described earlier, the data Enc(K(t)00, Kicv) is a result of encryption of a check-value generation key Kicv by using a node key K(t)00.

On the right side of FIG. 48, a decryption procedure is shown. As shown in the figure, first of all, devices 0, 1 and 2 each acquire the updated node key K(t)00 by carrying out processing to decrypt the received EKB (Enabling Key Block) by using a leaf key or a node key owned by itself. Then, the check-value generation key Kicv is obtained by decryption based on the updated node key K(t)00.

Other devices 4, 5, 6 and so on of the group shown in FIG. 12 are each incapable of acquiring the updated node key K(t)00 by using their own leaf key and node key even if the same EKB (Enabling Key Block) is distributed to those other devices. By the same token, revoked device 3 is also incapable of acquiring the updated node key K(t)00 by using its own leaf key and node key even if the same EKB (Enabling Key Block) is distributed to this device. Thus, only an authorized device is capable of decrypting and using the check-value generation key Kicv.

In this way, by utilizing distribution of the check-value generation key Kicv through the use of an EKB, the amount of distributed data can be reduced and it is possible to safely distribute the check-value generation key Kicv to only authorized parties capable of decrypting the check-value generation key Kicv.

By using such an ICV (Integrity Check Value) of a license, it is possible to avoid illegal copies of the EKB and the encrypted license. Assume that media 1 is used for storing licenses L1 and L2 along with an EKB (Enabling Key Block) that can be used for acquiring their license keys, as shown in FIG. 49A. Let what is stored in media 1 be copied to media 2. In this case, the EKB and the licenses can be copied. A device capable of decrypting the EKB will also be capable of using the licenses.

In the configuration shown in FIG. 49B, an integrity check value ICV(L1, L2) is stored in each media, being associated with licenses also stored therein. It should be noted that ICV(L1, L2) is an integrity check value of licenses L1 and L2 and is computed by applying a hash function to licenses L1 and L2 as follows:

$$ICV=\text{hash}(Kicv, L1, L2)\qquad\qquad ii.$$

In the configuration shown in FIG. 49B, information stored in media 1 includes licenses 1 and 2 as well as the integrity check value ICV(L1, L2), which is computed by applying a hash function to licenses L1 and L2. On the other hand, information stored in media 2 includes license L1 and an integrity check value ICV(L1), which is computed by applying a hash function to license L1.

In this configuration, assume that (EKB, license 2) is copied from media 1 to media 2. In this case, a new license check value ICV(L1, L2) can be generated in media 2. The new license check value ICV(L1, L2) is different from Kicv(L1) stored in media 2. It is thus obvious that the new license check value ICV(L1, L2) can be used to store a new license in media 2 by falsification or an illegal copy operation. In a device for playing back information stored in media 2, however, generated and stored ICVs can be checked at a step prior to the playback step to form a judgment as to whether the ICVs match each other. If the generated ICV is determined to not match the stored ICV, no playback operation is carried out. In this way, in this configuration, it is possible to prevent the license obtained by falsification or by carrying out an illegal copy operation from being played back.

In addition, in order to further enhance the degree of safety, it is possible to devise a configuration in which the ICV (Integrity Check Value) of a license is generated on the basis of data including the value of a writable counter. More particularly, in the configuration, the ICV (Integrity Check Value) of a license is computed as follows:

$$ICV=\text{hash}(Kicv, \text{counter}+1, L1, L2, \ldots)\qquad\qquad iii.$$

where notation (counter+1) indicates that the value of the counter is incremented by 1 each time the ICV is updated. It should be noted that the value of the counter needs to be stored in a secure memory in this configuration.

Moreover, in a configuration in which the ICV (Integrity Check Value) of a license cannot be stored in the same media as the license, the ICV (Integrity Check Value) of the license may be stored in a media different from the media for storing the license.

Assume that a license is stored in a media with no protection against an illegal copy operation. Examples of such a media are a read-only memory and an ordinary MO disk. In this case, if an ICV (Integrity Check Value) is also stored in the same media, it is quite possible that an unauthorized user is capable of updating the ICV. It is thus feared that the safety of the ICV is not assured. In order to solve this problem, the ICV is stored in a safe media of the host machine and used for controlling operations to copy the license. Examples of the copy operation are operations to check in, check out and move the license. In such a configuration, it is thus possible to execute safety management of the ICV and check falsification of the license.

Figure 50:
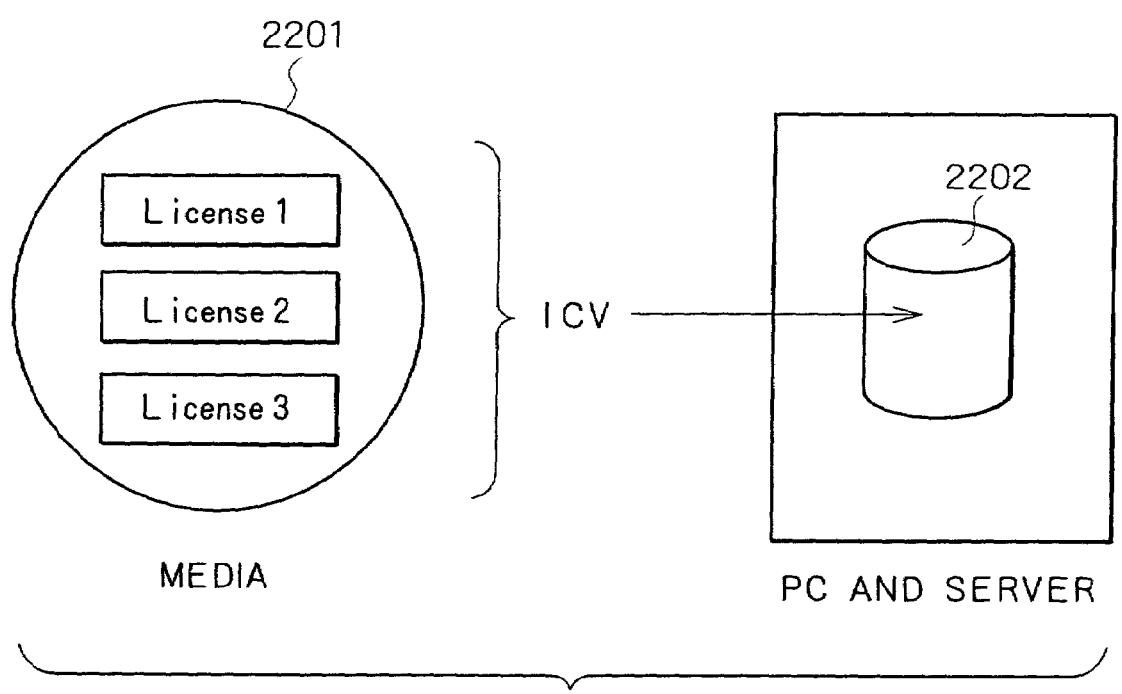
FIG. 50 is an explanatory diagram showing management of licenses.

FIG. 50 is a diagram showing a typical configuration implementing the scheme described above. In the typical configuration shown in FIG. 50, a media 2201 with no protection against an illegal copy operation is used for storing licenses 1 to 3. Examples of the media 2201 are a read-only memory and an ordinary MO disk. On the other hand, an ICV (Integrity Check Value) for these licenses is stored in a safe media 2202 employed in a host machine which the user is not allowed to freely access. Thus, in this typical configuration, the user is prevented from illegally updating the ICV (Integrity Check Value). When a device on which the media 2201 is mounted plays back information from the media 2201, for example, a PC serving as the host machine of the device or a server may be configured to check ICVs for forming a judgment as to whether the media is allowed to play back. In such a configuration, it is thus possible to prevent an operation to play back an illegally copied or falsified license.

In addition, a client provided by the present invention can also be implemented by an apparatus other than a so-called personal computer. Examples of an apparatus other than a so-called personal computer are a PDA (Personal Digital Assistant), a cellular phone and a game terminal.

If the series of pieces of processing is implemented by software, a program composing the software can be installed from a network or a recording medium into a computer including embedded special hardware or into a computer of another type such as a general-purpose personal computer capable of carrying out a variety of functions by executing various programs installed in the personal computer.

A recording medium provided separately from the main unit of the apparatus serving as a client or a server is distributed to users for presenting a program recorded in the medium to users. The recording medium can be a package medium. As shown in FIG. 2, examples of the package medium are the magnetic disk 41 including a floppy disk, the optical disk 42 including a CD-ROM (Compact-Disk Read-Only Memory) and a DVD (Digital Versatile/Video Disk), the magneto-optical disk 43 including an MD (Mini Disk) and the semiconductor memory 44. Instead of installing a program from a network or a recording medium, the program can be presented to a user by storing the program in advance in a recording medium embedded in the main unit of the apparatus. As shown in FIG. 2, examples of the embedded recording medium are the ROM 22 and a hard disk included in the storage unit 28.

In this specification, steps describing a program stored in the recording medium can of course be executed sequentially one step after another in accordance with a written procedure. It should be noted, however, that the steps do not have to be executed sequentially but, instead, the steps may also include pieces of processing to be carried out in parallel or individually.

In addition, it is desirable to also encrypt a program executed to implement processing related to security in order to prevent the processing of the program itself from being analyzed. For example, a program of processing carried out to execute an encryption process can be designed as a tamper resistant module.

Furthermore, the information included in the header of content to specify a license for allowing the use of the content does not have to be a license ID for uniquely identifying the license. In the embodiment described above, a license ID is information for specifying a license required to utilize content, information for specifying content the use of which is allowed by a certain license, and information for identifying a license requested by the client 1. Instead, a list of various kinds of attribute information related to the content may also be included in the content, and conditions of attributes of contents may also be included in a license for specifying the contents allowed to be used. In this case, attribute information included in the content is information for specifying a license for allowing utilization of the content and information for specifying content the use of which is allowed by a license in accordance with a condition equation included in the license. A license ID is information for uniquely identifying a license. In this way, content can be associated with a plurality of licenses so that the content can be issued in a more flexible manner.

In addition, the technical term 'content-exchanging system' used in this specification means the entire system comprising a plurality of apparatuses.

As described above, in accordance with the information processing apparatus and method provided by the present invention and the program for implementing the information processing method, encrypted data can be distributed with a high degree of freedom and, by acquiring a license provided separately from content, the user is capable of utilizing the content. As a result, a copyright can be protected and a proper usage fee can be collected without a hindrance to distribution of the content.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information processing apparatus for allowing usage of content by requiring a license for using said content, said information processing apparatus comprising:
   a content storage unit operable to store license-identification information for specifying said license for using said content, encrypted data of said content and key information required for decrypting said encrypted data of said content;
   a license storage unit operable to store said license for using said content, including content-specifying information for specifying said content and terminal-identification information which identifies the information processing apparatus, the use of which is allowed by said license;
   a judgment unit operable to determine whether said license for using said content has been stored in said license storage unit;
   a decryption unit operable to decrypt said encrypted data of said content if said license for using said content has been stored in said license storage unit;
   a device-node-key storage unit operable to store a device node key which is assigned the information processing apparatus from the license server when registering, wherein said key information includes an EKB (Enabling Key Block); and
   said decryption unit is operable to decrypt said EKB (Enabling Key Block) using said device node key to obtain a root key, and to decrypt said data of said content using said root key.

2. An information processing apparatus according to claim 1, further comprising:
   a transmitter operable to transmit a request for said license to a license server, said license request including said license-identification information based on the received content; and
   a receiver operable to receive said license transmitted by the license server,
   wherein said received license is stored in said license storage unit.

3. An information processing apparatus according to claim 2, further comprising:
   a terminal-ID storage unit operable to store terminal-identification information identifying said information processing apparatus, wherein
   said license request further includes said terminal-identification information;
   said received license includes a terminal ID; and
   said judgment unit compares said terminal ID in said received license with said terminal-identification information stored in said terminal-ID storage unit and determines that said received license is said license for using said content only if said terminal ID in said received license matches said terminal-identification information stored in said terminal-ID storage unit.

4. An information processing apparatus according to claim 1, further comprising:
   a reproducing unit operable to reproduce said data of said content decrypted by said decryption unit, wherein said data of said content is text data, image data, audio data, moving-picture data or combinations thereof.

5. An information processing apparatus according to claim 1, wherein:
   said key information further includes a content key encrypted using said root key;
   said data of said content is encrypted using said content key; and said decryption unit is operable to decrypt said encrypted data of said content using said root key.

6. An information processing apparatus according to claim 1, wherein said license further includes usage-condition information showing a condition for using said content, the use of which is allowed by said license.

7. An information processing apparatus according to claim 1, wherein said license further includes an electronic signature signed by using a secret key of a license server.

8. An information processing method for allowing a user to use content by requiring the user to have a license for using the content, the information processing method comprising:

storing license-identification information for specifying the license for using the content, encrypted data of the content and key information including at least a device node key required for decrypting the encrypted data of the content;

storing the license for using the content in a license storage unit, the license including content-specifying information for specifying the content, the use of which is allowed by the license, and terminal-identification information, the terminal-identification information for identifying an information processing apparatus;

determining whether the license for using the content has been stored in the license storage unit; and decrypting the encrypted data of the content using at least the device node key if the license for using the content has been stored in the license storage unit.

9. A recording medium recorded with a program to be executed by a computer for carrying out processing to allow a user to use content by requiring the user to have a license for using the content, the program comprising:

storing license-identification information for specifying the license for using the content, encrypted data of the content and key information including at least a device node key required for decrypting the encrypted data of the content;

storing the license for using the content in a license storage unit, the license including content-specifying information for specifying the content, the use of which is allowed by the license, and terminal-identification information, the terminal-identification information for identifying an information processing apparatus;

determining whether the license for using the content has been stored in the license storage unit; and decrypting the encrypted data of the content using at least the device node key if the license for using the content has been stored in the license storage unit.

10. A program according to claim 9, wherein the program or a portion of the program is encrypted.

11. A license server for issuing a license for allowing the use of content, said license server comprising:

a license storage unit operable to store said license, said license including content-specifying information for specifying said content, the use of which is allowed by said license, and terminal-identification information for identifying an information processing apparatus;

a receiver operable to receive a request for said license from said information processing apparatus, said license request including license-identification information for identifying said license;

an extraction unit operable to extract said license identified by said license-identification information from said license storage unit;

a processor operable to add said terminal-identification information necessary for identifying an information processing apparatus to said extracted license;

a signature unit operable to put a signature on said extracted license including said terminal-identification information using a secret key of said license server; and a transmitter operable to transmit said extracted license with said signature thereon to said information processing apparatus, wherein comparing of at least one usage rule associated with said license and using a device node key are necessary for decrypting data of said content.

12. A method for issuing a license for allowing the use of content, the method comprising:

storing the license in a license storage unit, the license including content-specifying information for specifying the content, the use of which is allowed by the license, and terminal-identification information for identifying an information processing apparatus;

receiving a request for the license from the information processing apparatus, the license request including license-identification information for identifying the license;

extracting the license stored in the license storage unit and identified by the license-identification information;

adding the terminal-identification information to the extracted license;

putting a signature on the extracted license including the terminal-identification information using a secret key; and transmitting the extracted license with the signature thereon to the information processing apparatus, wherein a comparison of a usage rule associated with said license having the terminal-identification information and a use of a device node key are necessary for decrypting data of said content.

13. A recording medium recorded with a program to be executed by a computer for carrying out processing to issue a license for allowing the use of content, the program comprising:

storing the license in a license storage unit, the license including content-specifying information for specifying the content, the use of which is allowed by the license, and terminal-identification information for identifying an information processing apparatus;

receiving a request for the license from the information processing apparatus, the license request including license-identification information for identifying the license;

extracting the license stored in the license storage unit and identified by the license-identification information;

adding the terminal-identification information to the extracted license;

putting a signature on the extracted license including the terminal-identification information using a secret key of a license server; and transmitting the extracted license with the signature thereon to the information processing apparatus, wherein decryption of data of said content is based on a comparison associated with the license having the terminal identification information and a use of a device node key.

* * * * *